United States Patent
Ishii et al.

(10) Patent No.: US 9,420,740 B2
(45) Date of Patent: Aug. 23, 2016

(54) RIDING LAWN MOWER

(71) Applicant: Kanzaki Kokyukoki Manufacturing Co., Ltd., Hyogo (JP)

(72) Inventors: Norihiro Ishii, Hyogo (JP); Kengo Sasahara, Hyogo (JP); Kazunari Koga, Hyogo (JP); Jun Matsuura, Hyogo (JP); Tomoyuki Ebihara, Hyogo (JP); Katsumoto Mizukawa, Hyogo (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 0 days.

(21) Appl. No.: 14/012,543

(22) Filed: Aug. 28, 2013

(65) Prior Publication Data

US 2014/0059989 A1    Mar. 6, 2014

Related U.S. Application Data

(62) Division of application No. 12/014,579, filed on Jan. 15, 2008, now Pat. No. 8,544,570.

(30) Foreign Application Priority Data

| Jan. 15, 2007 | (JP) | 2007-006219 |
| Jan. 15, 2007 | (JP) | 2007-006220 |
| Jan. 15, 2007 | (JP) | 2007-006221 |

(51) Int. Cl.
*A01D 34/00* (2006.01)
*A01D 34/64* (2006.01)

(52) U.S. Cl.
CPC .............. *A01D 34/006* (2013.01); *A01D 34/43* (2013.01); *A01D 34/64* (2013.01); *B60L 1/003* (2013.01);

(Continued)

(58) Field of Classification Search
CPC ...... A01D 34/006; A01D 34/64; A01D 34/43
USPC ............... 180/236, 6.2, 6.48, 6.5, 410; 477/1; 56/15.4, 10.1, 10.2 R, 14.7, 10.5; 701/50, 41
See application file for complete search history.

(56) References Cited

U.S. PATENT DOCUMENTS

| 3,732,671 A | 5/1973 | Allen et al. |
| 3,800,902 A * | 4/1974 | Keller ........................... 180/167 |

(Continued)

FOREIGN PATENT DOCUMENTS

| EP | 1319577 | 6/2003 |
| EP | 1541446 | 6/2005 |

(Continued)

OTHER PUBLICATIONS

European Search Report for European Patent Application No. 08000570.5-2313/1943894 dated Sep. 1, 2008.

(Continued)

*Primary Examiner* — Tony Winner
(74) *Attorney, Agent, or Firm* — Cantor Colburn LLP

(57) ABSTRACT

A riding lawnmower includes left and right wheels, at least one caster wheel, a lawnmower blade or reel, and a control section. The left and right wheels are independently driven by electric rotary machines to travel. The lawnmower blade or reel is driven for mowing. The control section, in response to turn instruction input by a turn operator, controls the left and right wheels according to preset standard setting conditions, or according to deceleration setting conditions which differ from the standard setting conditions, under which at least one of a vehicle movement speed and vehicle turning speed is decelerated more than under standard setting conditions. The riding lawnmower includes a section designating either standard setting conditions or deceleration setting conditions. In a riding lawnmower, left and right wheels are caused to turn around a turn center position corresponding to a turn instruction according to designated setting conditions.

9 Claims, 39 Drawing Sheets

(51) Int. Cl.

| | | |
|---|---|---|
| *A01D 34/43* | (2006.01) | |
| *B62D 11/00* | (2006.01) | |
| *B62D 11/04* | (2006.01) | |
| *B62D 11/24* | (2006.01) | |
| *B60L 15/20* | (2006.01) | |
| *B60L 1/00* | (2006.01) | |
| *B60L 8/00* | (2006.01) | |
| *B60L 11/00* | (2006.01) | |
| *B60L 11/12* | (2006.01) | |
| *B60L 11/18* | (2006.01) | |
| *B60K 7/00* | (2006.01) | |
| *B60K 17/04* | (2006.01) | |

(52) U.S. Cl.
CPC .............. *B60L 8/003* (2013.01); *B60L 11/005* (2013.01); *B60L 11/126* (2013.01); *B60L 11/1816* (2013.01); *B60L 11/1877* (2013.01); *B60L 11/1887* (2013.01); *B60L 15/2036* (2013.01); *B62D 11/003* (2013.01); *B62D 11/04* (2013.01); *B62D 11/24* (2013.01); *B60K 7/0007* (2013.01); *B60K 17/043* (2013.01); *B60K 2007/0076* (2013.01); *B60L 2200/40* (2013.01); *B60L 2220/44* (2013.01); *B60L 2240/12* (2013.01); *B60L 2240/24* (2013.01); *B60L 2240/461* (2013.01); *B60L 2240/465* (2013.01); *B60L 2240/642* (2013.01); *B60L 2250/22* (2013.01); *B60L 2250/24* (2013.01); *B60L 2250/26* (2013.01); *Y02T 10/6217* (2013.01); *Y02T 10/645* (2013.01); *Y02T 10/705* (2013.01); *Y02T 10/7022* (2013.01); *Y02T 10/7072* (2013.01); *Y02T 10/7077* (2013.01); *Y02T 10/7083* (2013.01); *Y02T 10/72* (2013.01); *Y02T 10/7275* (2013.01); *Y02T 10/7291* (2013.01); *Y02T 90/14* (2013.01); *Y02T 90/16* (2013.01); *Y02T 90/34* (2013.01)

(56) References Cited

U.S. PATENT DOCUMENTS

| | | | | |
|---|---|---|---|---|
| 4,162,605 | A * | 7/1979 | Olin et al. | 56/7 |
| 4,520,299 | A | 5/1985 | Konrad | |
| 4,953,645 | A * | 9/1990 | Korber et al. | 180/6.5 |
| 5,022,476 | A | 6/1991 | Weege | |
| 5,154,437 | A | 10/1992 | Inagaki et al. | |
| 5,163,273 | A | 11/1992 | Wojtkowski et al. | |
| 5,295,553 | A | 3/1994 | Morita et al. | |
| 5,487,437 | A * | 1/1996 | Avitan | 180/6.5 |
| 5,502,957 | A | 4/1996 | Robertson | |
| 5,507,138 | A * | 4/1996 | Wright et al. | 56/14.7 |
| 5,794,422 | A | 8/1998 | Reimers et al. | |
| 5,906,645 | A | 5/1999 | Kagawa et al. | |
| 5,934,051 | A | 8/1999 | Hahn | |
| 5,947,221 | A | 9/1999 | Taniguchi et al. | |
| 5,983,614 | A * | 11/1999 | Hancock et al. | 56/16.7 |
| 6,148,939 | A | 11/2000 | Brookhart et al. | |
| 6,591,593 | B1 | 7/2003 | Brandon et al. | |
| 6,615,937 | B2 | 9/2003 | Richey, II et al. | |
| 6,668,965 | B2 * | 12/2003 | Strong | 180/411 |
| 6,808,032 | B2 | 10/2004 | Wuertz et al. | |
| 6,951,259 | B2 | 10/2005 | Irikura | |
| 6,988,570 | B2 | 1/2006 | Takeuchi | |
| 7,004,268 | B2 * | 2/2006 | Irikura | 180/6.3 |
| 7,017,327 | B2 * | 3/2006 | Hunt et al. | 56/14.7 |
| 7,302,789 | B2 * | 12/2007 | Eavenson et al. | 56/11.8 |
| 7,347,293 | B1 | 3/2008 | Hidaka | |
| 7,360,614 | B2 * | 4/2008 | Yokote | 180/6.24 |
| 7,957,866 | B2 | 6/2011 | Oba et al. | |
| 7,992,659 | B2 | 8/2011 | Schaedler et al. | |
| 8,844,658 | B2 * | 9/2014 | Wyatt et al. | 180/6.48 |
| 8,950,520 | B2 * | 2/2015 | Hauser et al. | 180/6.24 |
| 2003/0010545 | A1 * | 1/2003 | Takeuchi | 180/6.28 |
| 2005/0023049 | A1 | 2/2005 | Ferree et al. | |
| 2006/0042839 | A1 * | 3/2006 | Iwaki | B60K 17/356 180/6.3 |
| 2007/0240928 | A1 * | 10/2007 | Coltson et al. | 180/411 |

FOREIGN PATENT DOCUMENTS

| | | |
|---|---|---|
| JP | 56131462 A | 10/1981 |
| JP | 4-166475 A | 6/1992 |
| JP | 7-125647 A | 5/1995 |
| JP | 7-277020 A | 10/1995 |
| JP | 2000-175547 A | 4/2000 |
| JP | 2001-63393 A | 3/2001 |
| JP | 2001-163241 A | 6/2001 |
| JP | 2002-340182 A | 11/2002 |
| JP | 2005-343283 A | 12/2005 |
| JP | 2006-507789 A | 3/2006 |
| JP | 2009-502605 A | 1/2009 |
| WO | 97-28681 | 8/1997 |
| WO | 2006-086412 A2 | 8/2006 |

OTHER PUBLICATIONS

European Search Report for European Patent Application No. 08000570.5-2313 dated Apr. 23, 2008.
Final Rejection for Japanese Patent Application No. 2007-006219; mailed Feb. 26, 2013, with English translation.
Notice of Grounds for Rejection for Japanese Patent Application No. 2007-006220, mailed Oct. 23, 2012.
Notice of Grounds for Rejection for Japanese Patent Application No. 2007-006219, mailed Oct. 23, 2012, with English translation.
Notice of Grounds for Rejection for Japanese Patent Application No. 2007-006219, mailed Jun. 26, 2012, with English translation.
Notice of Grounds for Rejection for Japanese Patent Application No. 2007-006220, mailed Jun. 26, 2012, with English translation.
Notice of Grounds for Rejection for Japanese Patent Application No. 2007-006221, mailed Jun. 26, 2012, with English translation.
United States Patent and Trademark Office, Final Rejection for U.S. Appl. No. 12/014,579, notification date Oct. 19, 2011.
United States Patent and Trademark Office Communication, Non-Final Rejection for U.S. Appl. No. 12/014,579, notification date Mar. 29, 2011.
United States Patent and Trademark Office Communication, Requirement for Restriction/Election for U.S. Appl. No. 12/014,579, notification dated Dec. 14, 2010.
Non-Final Office Action issued in U.S. Appl. No. 13/414,984, notification date of Nov. 7, 2014.

* cited by examiner $$R : V_M = T : \frac{V_o - V_i}{2}$$

$$V_M = \frac{V_o + V_i}{2}$$

$$\therefore R = T \times \frac{(V_o + V_i)/2}{(V_o - V_i)/2} = T \times \frac{V_o + V_i}{V_o - V_i}$$

$$V_o = 2\pi r_r \times \frac{N_o}{60}$$

$$V_i = 2\pi r_r \times \frac{N_i}{60}$$

$$\therefore R = T \times \frac{N_o + N_i}{N_o - N_i}$$

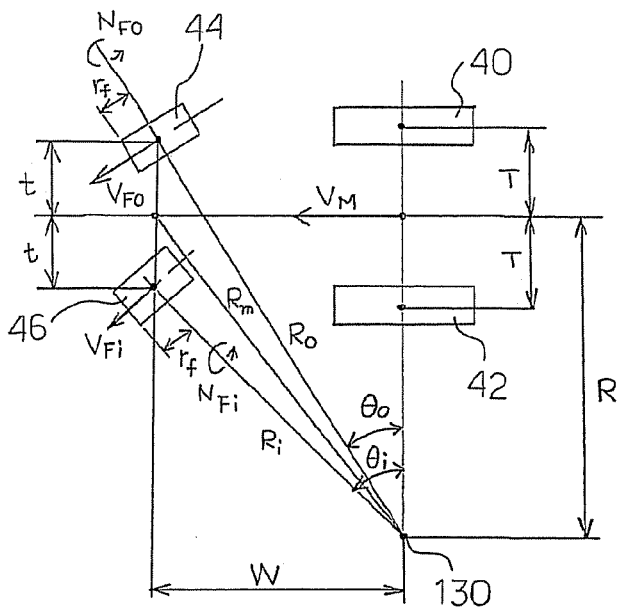

Fig. 13a $$R_o = \sqrt{(R+t)^2 + W^2} = \sqrt{\left(T \times \frac{N_o+N_i}{N_o-N_i} + t\right)^2 + w^2}$$

$$R_i = \sqrt{(R-t)^2 + W^2} = \sqrt{\left(T \times \frac{N_o+N_i}{N_o-N_i} - t\right)^2 + w^2}$$

$$\theta_o = \cos^{-1}(R/R_o)$$
$$= \cos^{-1}\left(T \times \frac{N_o+N_i}{N_o-N_i} \Big/ \sqrt{\left(T \times \frac{N_o+N_i}{N_o-N_i} + t\right)^2 + w^2}\right)$$

$$\theta_i = \cos^{-1}(R/R_i)$$
$$= \cos^{-1}\left(T \times \frac{N_o+N_i}{N_o-N_i} \Big/ \sqrt{\left(T \times \frac{N_o+N_i}{N_o-N_i} + t\right)^2 + w^2}\right)$$

Fig. 13b $$R : R_O = V_M : V_{FO}$$

$$\therefore V_{FO} = V_M \times (R_O/R)$$

$$V_{FO} = 2\pi r_f \times N_{FO}/60$$

$$V_M = 2\pi r_r \times N_M/60 = 2\pi r_r \times \left(\frac{N_O + N_i}{2}\right)/60$$

$$\therefore 2\pi r_f \times N_{FO}/60 = \left[2\pi r_r \times \left(\frac{N_O + N_i}{2}\right)/60\right] \times (R_O/R)$$

$$\therefore N_{FO} = \frac{N_O + N_i}{2} \times \frac{r_r \times R_O}{r_f \times R}$$

$$= \frac{N_O + N_i}{2} \times \frac{r_r \times R_O}{r_f \times T \times \frac{N_O + N_i}{N_O - N_i}}$$

$$= \frac{r_r \times \sqrt{\left(T \times \frac{N_O + N_i}{N_O - N_i} + t\right)^2 + W^2} \times (N_O - N_i)}{2 r_f \times T}$$

SIMILARLY, SINCE $R : R_i = V_M : V_{Fi}$ $$N_{Fi} = \frac{r_r \times \sqrt{\left(T \times \frac{N_O + N_i}{N_O - N_i} - t\right)^2 + W^2} \times (N_O - N_i)}{2 r_f \times T}$$

Fig. 14

| W | T | t | $r_r$ | $r_f$ |
|---|---|---|---|---|
| 900 | 450 | 300 | 0.23 | 0.19 |
| mm | mm | mm | m | m |

Fig. 15

| No | Ni | Δ=No−Ni | R | $N_M$ | $N_{FO}$ | $N_{Fi}$ |
|---|---|---|---|---|---|---|
| 100 | 100 | 0 | 10000 | 100 | 121 | 121 |
| 110 | 90 | 20 | 4500 | 100 | 131 | 116 |
| 120 | 80 | 40 | 2250 | 100 | 145 | 116 |
| 130 | 70 | 60 | 1500 | 100 | 162 | 121 |
| 140 | 60 | 80 | 1125 | 100 | 181 | 131 |
| 150 | 50 | 100 | 900 | 100 | 202 | 145 |
| 160 | 40 | 120 | 750 | 100 | 223 | 162 |
| 170 | 30 | 140 | 643 | 100 | 245 | 181 |
| 180 | 20 | 160 | 563 | 100 | 268 | 202 |
| 190 | 10 | 180 | 500 | 100 | 292 | 223 |
| 200 | 0 | 200 | 450 | 100 | 315 | 245 |
| 210 | −10 | 220 | 409 | 100 | 339 | 268 |
| 220 | −20 | 240 | 375 | 100 | 363 | 292 |
| 230 | −30 | 260 | 346 | 100 | 387 | 315 |
| 240 | −40 | 280 | 321 | 100 | 412 | 339 |
| 250 | −50 | 300 | 300 | 100 | 436 | 363 |
| rpm | rpm | rpm | mm | rpm | rpm | rpm |

Fig. 16

$$R : V_M = T : \frac{V_o - V_i}{2}$$

$$V_M = \frac{V_o + V_i}{2}$$

$$\therefore R = T \times \frac{(V_o + V_i)/2}{(V_o - V_i)/2} = T \times \frac{V_o + V_i}{V_o - V_i}$$

$$V_o = 2\pi r_r \times \frac{N_o}{60}$$

$$V_i = 2\pi r_r \times \frac{N_i}{60}$$

$$\therefore R = T \times \frac{N_o + N_i}{N_o - N_i}$$

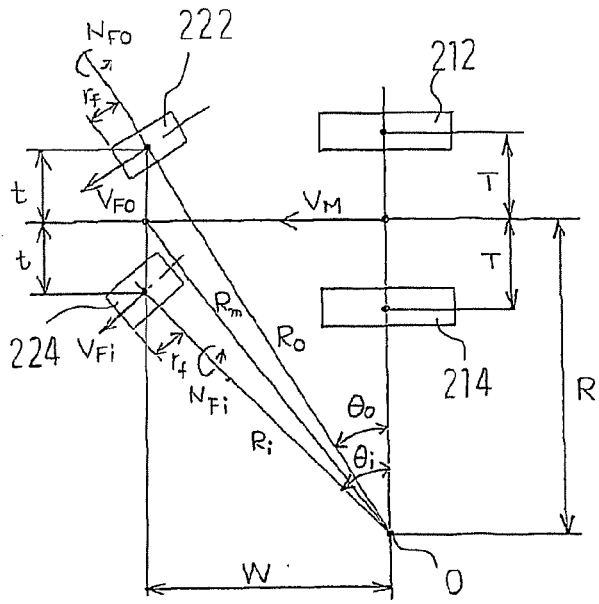

Fig. 38a $$R_o = \sqrt{(R+t)^2 + W^2} = \sqrt{\left(T \times \frac{N_o+N_i}{N_o-N_i} + t\right)^2 + W^2}$$

$$R_i = \sqrt{(R-t)^2 + W^2} = \sqrt{\left(T \times \frac{N_o+N_i}{N_o-N_i} - t\right)^2 + W^2}$$

$$\theta_o = \cos^{-1}(R/R_o)$$
$$= \cos^{-1}\left(T \times \frac{N_o+N_i}{N_o-N_i} \bigg/ \sqrt{\left(T \times \frac{N_o+N_i}{N_o-N_i} + t\right)^2 + W^2}\right)$$

$$\theta_i = \cos^{-1}(R/R_i)$$
$$= \cos^{-1}\left(T \times \frac{N_o+N_i}{N_o-N_i} \bigg/ \sqrt{\left(T \times \frac{N_o+N_i}{N_o-N_i} + t\right)^2 + W^2}\right)$$

Fig. 38b $$R : R_o = V_M : V_{FO}$$

$$\therefore V_{FO} = V_M \times (R_o/R)$$

$$V_{FO} = 2\pi r_f \times N_{FO}/60$$

$$V_M = 2\pi r_r \times N_M/60 = 2\pi r_r \times \left(\frac{N_o+N_i}{2}\right)/60$$

$$\therefore 2\pi r_f \times N_{FO}/60 = \left[2\pi r_r \times \left(\frac{N_o+N_i}{2}\right)/60\right] \times (R_o/R)$$

$$\therefore N_{FO} = \frac{N_o+N_i}{2} \times \frac{r_r \times R_o}{r_f \times R}$$

$$= \frac{N_o+N_i}{2} \times \frac{r_r \times R_o}{r_f \times T \times \frac{N_o+N_i}{N_o-N_i}}$$

$$= \frac{r_r \times \sqrt{\left(T \times \frac{N_o+N_i}{N_o-N_i}+t\right)^2 + W^2} \times (N_o-N_i)}{2 r_f \times T}$$

SIMILARLY, SINCE $R:R_i = V_M:V_{Fi}$ $$N_{Fi} = \frac{r_r \times \sqrt{\left(T \times \frac{N_o+N_i}{N_o-N_i}-t\right)^2 + W^2} \times (N_o-N_i)}{2 r_f \times T}$$

Fig. 39

RIDING LAWN MOWER

CROSS REFERENCE TO RELATED APPLICATIONS

The present application is a divisional application of U.S. patent application Ser. No. 12/014,579, filed on Jan. 15, 2008, the entire contents of which are incorporated herein by reference. The 12/014,579 application claimed the benefit of the date of the earlier filed Japanese Patent Application No. 2007-006219, Japanese Patent Application No. 2007-006220, and Japanese Patent Application No. 2007-006221, all filed Jan. 15, 2007, priority to which is also claimed herein, and the contents of which are also incorporated by reference herein.

BACKGROUND

1. Technical Field

The present invention relates to first and second aspect of an invention relating to a riding lawnmower, and more particularly to a riding lawnmower having a lawnmower blade or lawn mower reel mounted thereon, that an operator rides on and steers. The present invention relating to a third aspect relates to a riding lawnmower comprising two main drive wheels and a caster wheel as a steering control wheel, in which at least the two main drive wheels are driven by a traction power source.

2. Related Art

With regard to the present invention relating to the first aspect and the second aspect, an apparatus for mowing grass such as lawn grass that is planted on the ground surface of a garden or the like is generally referred to as a "lawnmower", although naturally such apparatuses are also used to mow grasses other than lawn grass. Types of lawnmowers include handheld lawnmowers and wheel movement-type lawnmowers. A handheld lawnmower is a lawn mowing tool comprising a blade for mowing a lawn or the like which an operator carries in their hands in order to mow a lawn while walking around a garden or the like. A wheel movement-type lawnmower is a device that can move over the surface of a garden or the like using wheels. The kinds of wheel movement-type lawnmowers include a lawnmower that an operator moves around a garden or the like while pushing the lawnmower by hand. This type of lawnmower is generally referred to as a "walk behind lawnmower". A still larger kind of lawnmower apparatus is one in which a lawnmower rotary tool is mounted on a vehicle capable of self-powered travel. In this case, an operator rides on the vehicle and performs traveling and cutting operations. These apparatuses can be referred to as "riding lawnmowers".

Although a riding lawnmower is a type of vehicle, it is generally not used to travel on roads and is used almost exclusively for so-called "off-road" usage in a garden or the like. A riding lawnmower moves over the surface of ground for lawn mowing work and has a driving source mounted thereon for driving the wheels and driving a lawnmower rotary tool. Commonly, an internal combustion engine, an oil hydraulic motor driven by an internal combustion engine, an electric motor or the like is used as a driving source.

For example, Japanese patent publication No. 2006-507789 discloses a hybrid power apparatus that has mounted thereon a device that integrates an engine and an electricity generator which connects a rotor to an engine shaft of an internal combustion engine. In a lawnmower that is exemplified as a power apparatus, respectively independent electric motors are linked to a plurality of drive wheels so that each drive wheel can be controlled at independently variable speeds. It is noted that as a result, starting, stopping, speed changing, direction changing, and turning of the lawnmower can be smoothly performed. As an example of turning executed by independent speed changes of the drive wheels, an apparatus is mentioned in which both the left and right rear wheels are linked with respective electric motors.

U.S. Pat. No. 7,017,327 B2 discloses, as a hybrid lawnmower, a configuration in which electric power produced by an alternator connected to an engine disposed at the front is used to drive a deck motor for lawnmower blade driving, left and right wheel motors for driving independently-controlled left and right rear wheels, and steering motors that steer left and right front wheels over a range of approximately 180 degrees around an axle. In this case, to turn the lawnmower, the speed difference between the left and right rear wheels is calculated based on input from a steering control section to control the wheel motors, and a steering signal is supplied to the steering motors to control the positions of the left and right front wheels. It is note that, as a result, the lawnmower can be turned without steering the left and right rear wheels. In this connection, it is described as a feature of this configuration that, because the left and right wheel motors are provided inside the rims of the left and right wheels and there is no differential gear mechanism, a space can be secured between the left and right wheels under the frame in which tilting chute that conveys cut grass can be disposed.

Regarding the first invention, as a method for executing a turn in a riding lawnmower, Japanese Patent Publication No. 2006-507789 discloses a method in which the rotational speed of the left rear wheel and the rotational speed of the right rear wheel are caused to differ by electric motors that are independently provided in the left and right rear wheels, respectively. Further, U.S. Pat. No. 7,017,327 B2 discloses applying a speed difference to the left and right rear wheels using left and right wheel motors and controlling the positions of the left and right front wheels with steering motors to execute steering.

In lawn mowing work, there are cases in which some degree of traveling driving force is necessary depending on the state of the ground surface such as the garden surface or the like. For example, when the ground surface is uneven or when the surface is sloped, there are cases when the traveling driving force of the left and right rear wheels as main drive wheels is insufficient. Although the related art as disclosed in Japanese Patent Publication No. 2006-507789 and U.S. Pat. No. 7,017,327 B2 mention a riding lawnmower of a four-wheel type or a three-wheel type a having a front wheel or wheels, in both of these apparatuses a driving source for traveling driving is not connected to the front wheel(s). A steering motor described in U.S. Pat. No. 7,017,327 B2 is a motor for steering the front wheels, that is, a motor for changing the steering angle of the front wheels, and is not a motor that applies a traveling driving force to the front wheels. Thus, in a riding lawnmower according to the related art, depending on the ground surface conditions such as a sloping surface, a case may arise in which the traveling driving force is insufficient.

According to the related art, because the front wheels can freely roll over the ground surface because a traveling driving force is not applied to the front wheels, there are few problems with respect to turning when traveling over a flat surface. In contrast, however, in the case of turning while traveling over a sloping surface, if the aforementioned traveling driving force is insufficient, a case may arise in which the rear wheels and the front wheels slip with respect to the ground surface and the turn itself can not be executed adequately. Further, if a turn is executed while slipping on the ground surface, there is a risk that the planting condition of the lawn or the ground surface state will be damaged.

Even when it can be assumed that a traveling driving force is applied to the front wheels to drive the front wheels and rear wheels at a uniform speed, for example, when executing a turn, a difference will arise between the turning speed of the front wheels and the turning speed of the rear wheels due to the turn center position, and it will not be possible to turn smoothly. As a result of the turn not being performed smoothly, there is a risk that the front wheels or the rear wheels will slip on the lawn and damage the planting condition of the lawn or the ground surface condition. This situation is particularly likely to occur when traveling on a sloping surface. Accordingly, it is necessary to give consideration to executing suitable control between the rotational speeds of the rear wheels and the rotational speeds of the front wheels when turning.

With regard to the second aspect, as a method for executing a turn in a riding lawnmower, Japanese Patent Publication No. 2006-507789 discloses a method in which the rotational speed of the left rear wheel and the rotational speed of the right rear wheel are caused to differ by electric motors that are independently provided in the left and right rear wheels, respectively. Further, U.S. Pat. No. 7,017,327 B2 additionally discloses applying a speed difference to the left and right rear wheels using left and right wheel motors and controlling the positions of the left and right front wheels with steering motors to perform steering.

In lawn mowing work, depending on the level of skill of the operator or the state of the ground surface such as the garden surface or the like, there are cases when particular care is required when traveling or turning. For example, when performing a turning maneuver, although in the case of a skilled operator the turning maneuver can be freely executed even under a comparatively fast traveling speed, in the case of a novice operator in some cases lowering the traveling speed is necessary to correctly execute the turning maneuver. Further, when the turning radius is small there are cases in which the turn is executed using a wheel on one side as the turn center position. However, depending on the state of the wheel on one side, the planting condition of the lawn may be damaged by the turning of the wheel on one side as the turn center position. Further, on sloping ground, if the turning radius is too small the vehicle itself may enter an unstable state due to a shift in the center of gravity of the riding lawnmower.

Thus, depending on the nature of the lawn mowing task, there are times when delicate control is required when traveling or turning. This type of delicate control is not adequately provided for according to the related art.

Regarding a third aspect, as lawnmower vehicles that comprise a lawnmower, a walk behind lawnmower vehicle which a person operates from the rear and a riding lawnmower which a person rides and operates are known. With respect to riding lawnmowers, a riding lawnmower is also known that comprises two main drive wheels and a caster wheel as a steering control wheel, in which the two main drive wheels are driven by a traction power source such as an electric motor.

This type of riding lawnmower is used to cut lawn grass to a predetermined length while a person rides on and drives the riding lawnmower. When turning, by changing the rotational speeds of traction power sources, such as two electric motors provided on both the left and right side of the vehicle, turning is executed such that the wheel corresponding to the traction power source on the side on which the rotational speed is made higher is positioned on the outside. Furthermore, the caster wheel enables free steering in which the direction thereof can freely change, and the direction thereof changes to the turning direction that is determined in accordance with the speed difference between the main drive wheels.

Further, U.S. Pat. No. 7,017,327 discloses an electrically-driven riding lawnmower comprising two steering control wheels on the front side and two drive wheels on the rear side, in which two electric motors for steering are used to make the two steering control wheels face in a predetermined direction.

Related art literature that relates to the present invention according to the third aspects includes, in addition to the above-noted U.S. Pat. No. 7,017,327, International Patent Publication No. 2006/086412, U.S. Pat. No. 5,794,422, U.S. Pat. No. 3,732,671, International Patent Publication No. 97/28681, and Japanese Patent Publication No. 2006-507789.

In a conventional riding lawnmower comprising caster wheels and main drive wheels in which the caster wheels are allowed to steer freely, there is a possibility that trouble will occur on a sloping surface. For example, as a first kind of trouble, when the operator attempts to turn the vehicle while traveling over a sloping surface, there is a possibility that a force acting on the caster wheels in a downward direction produced as a result of gravity acting on the vehicle will cause the caster wheels to have a greater downward direction than the direction to which the driver it attempting to turn. There is therefore a possibility that the driver will be unable to make the riding lawnmower accurately proceed in the desired direction. In this respect, in the case of the electrically-driven lawnmower vehicle described in U.S. Pat. No. 7,017,327, the two steering control wheels are configured to be caused to face in a predetermined direction by two electric motors for steering. However, in a case in which steering is performed by continuously orienting the two steering control wheels in response to the drive wheels, because the direction of the two steering control wheels is also determined by the electric motors during high-speed turning that would be unthinkable when traveling on a sloping surface, the size of the electric motors for steering for the steering control wheels tends to become larger. More specifically, in the case of a conventionally configured riding lawnmower, there is a disadvantage that it is difficult to accurately turn the riding lawnmower in a direction desired by the driver when traveling on a sloping surface without increasing the size of a traction power source such as an electric motor.

A second disadvantage is that, if a riding lawnmower is stopped on a sloping surface, when the driver attempts to make the vehicle start moving again by, for example, releasing each of the activated braking devices by stepping on the accelerator pedal and the parking brake that is a mechanical brake, before the vehicle starts to move forward under the power of a traction power source such as the electric motor for driving, there is the possibility that the vehicle will slip downward on the slope; even a small slip can cause the driver to feel a sense of discomfort.

A third disadvantage is that when the riding lawnmower is climbing up a sloping surface there is the possibility that the driving power will be insufficient when the driver attempts to make the riding lawnmower climb the slope with two drive wheels and the drive wheels may slip. This is undesirable because the drive wheels will damage the lawn if they slip on the surface.

A fourth disadvantage is that due to a weight transfer acting on the vehicle when a riding lawnmower is descending on a sloping surface, there is the possibility that the vehicle will tend to descend at a higher speed than the speed desired by the driver. This case is also undesirable because the lawn may be damaged, similarly to the foregoing case.

In the electrically-driven riding lawnmower disclosed in U.S. Pat. No. 7,017,327, no consideration whatsoever is given to the above-described second to fourth disadvantages. Thus, in the case of the conventionally considered riding lawnmower, there is the possibility that a disadvantage will arise when the vehicle is on a sloping surface.

SUMMARY

The present invention relating to a first aspect advantageously provides a riding lawnmower that has sufficient traveling driving force. It is another advantage that a riding lawnmower is provided that can perform appropriate control between the rotational speeds of rear wheels and the rotational speeds of front wheels for turning. The means hereunder that relate to the first aspect contribute to at least one of these advantages.

The present invention relating to a second aspect advantageously provides a riding lawnmower that enables delicate control with respect to traveling and turning that conforms to the circumstances of the lawn mowing work.

The present invention relating to a third aspect advantageously improves a riding lawnmower by eliminating or lessening disadvantages that arise when the vehicle is on a sloping surface.

A feature of a riding lawnmower according to the present invention that relates to a first aspect is that a riding lawnmower comprises left and right wheels as main drive wheels that are each independently driven, at least one caster wheel as a steering control wheel that is driven to travel independently from the driving of the left and right wheels, and a lawnmower blade or a lawnmower reel that is driven for lawn mowing.

Preferably, a riding lawnmower according to the present invention relating to the first aspect comprises a control section that controls the respective traveling driving of the left and right wheels and the traveling driving of the caster wheel in accordance with a turn instruction input by a turn operator, and the left and right wheels and caster wheel are caused to turn around a turn center position that corresponds with the turn instruction.

Further, in a riding lawnmower according to the present invention relating to the first aspect, preferably the turn operator is a handle-type or monolever-type steering operator that takes a steering angle as a turn instruction input, and the control section includes unit that determines and acquires a turn center position corresponding to a turn instruction input of the steering operator and determine and acquire left and right wheel speeds as respective traveling speeds of the left and right wheels corresponding to the turn center position; unit that determines and acquires a caster wheel speed as a traveling speed of the caster wheel based on the acquired turn center position and the left and right wheel speeds; and drive unit that drives the left and right wheels in accordance with the left and right wheel speeds that are acquired, drive the caster wheel in accordance with the caster wheel speed that is acquired, and cause each thereof to turn around a turn center position.

Further, in a riding lawnmower according to the present invention relating to the first aspect, preferably the turn operator is a two lever-type operator that takes the left and right wheel speeds as a turn instruction input, and the control section includes unit that determines and acquires a turn center position corresponding with a turn instruction input of the two lever-type operator and determine and acquire left and right wheel speeds as respective traveling speeds of the left and right wheels corresponding to the turn center position; unit that determines and acquires a caster wheel speed as a traveling speed of the caster wheel based on the acquired turn center position and the left and right wheel speeds; and drive unit that drives the left and right wheels in accordance with left and right wheel speeds that are instructed by input, drive the caster wheel to travel in accordance with the caster wheel speed that is acquired, and cause each thereof to turn around a turn center position.

Further, in a riding lawnmower according to the present invention relating to the first aspect, preferably the control section includes unit that determines and acquires a mean traveling speed in an intermediate position between the left and right wheels based on left and right wheel speeds, and cause the left and right wheels and the caster wheel to turn around the turn center position that is acquired while causing the vehicle to travel at the mean traveling speed that is acquired.

Furthermore, in a riding lawnmower according to the present invention relating to the first aspect, with respect to the left and right wheel speeds, when a speed of a wheel on one side is zero, preferably the control section takes a ground-contact position of the wheel on the one side as a turn center position and causes the caster wheel and the wheel on the other side to turn around that position.

Further, in a riding lawnmower according to the present invention relating to the first aspect, in a case in which, with respect to the left and right wheel speeds, a wheel speed on one side and a wheel speed on another side represent rotations in opposite directions to each other, preferably the control section takes a position between the left and right wheels as a turn center position and causes the left and right wheels and the caster wheel to turn around that turn center position.

Further, in a riding lawnmower according to the present invention relating to the first aspect, preferably the caster wheel is freely rotatable with respect to a steering angle and the steering angle is decided in correspondence with traveling of the left and right wheels.

Further, a riding lawnmower according to the present invention relating to the first aspect preferably comprises a rotating axle electric rotary machine that drives the left and right wheels, and a steering control wheel electric rotary machine that drives a caster wheel.

According to at least one of the above described configurations relating to the first aspect, in a riding lawnmower the main drive wheels and the steering control wheel are each independently driven. As a result, in comparison with a case in which only the main drive wheels are driven, the riding lawnmower can more easily and reliably provided with sufficient traveling driving force.

Further, according to at least one of the above described configurations relating to the first aspect, in a riding lawnmower the respective traveling driving of the left and right wheels and the traveling driving of the caster wheel is controlled in accordance with a turn instruction input by a turn operator, and the left and right wheels and the caster wheel are caused to turn around a turn center position corresponding to the turn instruction. As a result, appropriate control can be performed between the rotational speeds of the rear wheels and the rotational speed of the front wheel for a turn.

Further, according to at least one of the above described configurations relating to the first aspect, in correspondence with a turn instruction input according to a steering angle of a turn operator or left and right wheel speeds, the control section acquires a turn center position and left and right wheel speeds as respective traveling speeds of the left and right wheels corresponding to the turn center position, and based on the turn center position and the left and right wheel speeds that are acquired, determines and acquires a caster wheel speed that is a traveling speed of a caster wheel. The control section then drives the left and right wheels in accordance with the left and right wheel speeds that are acquired, drives the caster wheel in accordance with the caster wheel speed that is acquired, and causes each thereof to turn around the turn center position. As a result, appropriate control can be performed between the rotational speeds of the rear wheels and the rotational speed of the front wheel when turning. When the turn operator is either a handle type, a monolever type, or a two-lever type, appropriate control can be performed in the same manner between the rotational speeds of the rear wheels and the rotational speed of the front wheel when turning.

Further, according to at least one of the above described configurations relating to the first aspect, the caster wheel is freely rotatable with respect to a steering angle and the steering angle is decided in correspondence with traveling of the left and right wheels. Accordingly, when turning, it is possible to suppress the risk of damage to the planting condition of a lawn or to a ground surface state.

Further, according to at least one of the above described configurations relating to the first aspect, in a riding lawnmower the left and right wheels and the caster wheel are driven by an electric rotary machine. As a result, it is possible to make the riding lawnmower small and lightweight in comparison to a case of using an engine or an oil hydraulic motor driven by an engine or the like as a driving source.

A riding lawnmower according to the present invention that relates to a second aspect comprises left and right wheels as main drive wheels that are each independently driven by an electric rotary machine; at least one caster wheel as a steering control wheel; a lawnmower blade or a lawnmower reel that is driven for lawn mowing; a control section that, in response to a turn instruction input by a turn operator, controls the respective traveling driving of the left and right wheels in accordance with preset standard setting conditions or in accordance with special setting conditions that are different from the standard setting conditions; and unit that designates either the standard setting conditions or the special setting conditions; wherein the left and right wheels are caused to turn around a turn center position corresponding to a turn instruction in accordance with the designated setting conditions.

Further, a riding lawnmower according to the present invention that relates to a second aspect comprises left and right wheels as main drive wheels that are each independently driven by an electric rotary machine; at least one caster wheel as a steering control wheel; a lawnmower blade or a lawnmower reel that is driven for lawn mowing; a control section that, in response to a turn instruction input by a turn operator, controls the respective traveling driving of the left and right wheels in accordance with preset standard setting conditions or in accordance with deceleration setting conditions under which at least one of a vehicle movement speed and a vehicle turning speed is decelerated more than under the standard setting conditions, as special setting conditions that are different from the standard setting conditions; and unit that designates either the standard setting conditions or the deceleration setting conditions; wherein the left and right wheels are caused to turn around a turn center position corresponding to a turn instruction in accordance with the designated setting conditions.

Further, in a riding lawnmower according to the present invention relating to the second aspect, preferably the turn operator is a handle-type or a monolever-type steering operator that obtains a steering angle as a turn instruction input, and the control section includes: unit that determines and acquires a turn center position corresponding to a turn instruction input of a steering operator and determines and acquires left and right wheel speeds that are respective traveling speeds of the left and right wheels corresponding to the turn center position; and drive unit that drives the left and right wheels in accordance with the acquired left and right wheel speeds to cause the left and right wheels to turn around the turn center position.

Furthermore, in a riding lawnmower according to the present invention relating to the second aspect, preferably the turn operator is a two lever-type operator that obtains the left and right wheel speeds as a turn instruction input, and the control section includes unit that determines and acquires a turn center position corresponding with a turn instruction input of the two lever-type operator and determines and acquires left and right wheel speeds as respective traveling speeds of the left and right wheels corresponding to the turn center position; and drive unit that drives the left and right wheels in accordance with left and right wheel speeds that are instructed by input and cause the left and right wheels to turn around a turn center position.

Further, in a riding lawnmower according to the present invention relating to the second aspect, preferably the control section, when executing standard setting conditions, maintains a mean traveling speed that is for an intermediate position between the left and right wheels at a constant speed while proceeding with a turn, and when executing deceleration setting conditions, gradually decelerates the mean traveling speed from the constant speed of the standard setting conditions in accordance with a progress of a turn.

Further, in a riding lawnmower according to the present invention relating to the second aspect, preferably the control section, when executing standard setting conditions in a case where a turn center position is at an area on an inner side of the left and right wheels and a speed of a wheel on one side and a speed of a wheel on another side represent rotation in opposite directions to each other, maintains a mean traveling speed at a constant speed until a turn center position enters an area on the inner side of the left and right wheels, and after the turn center position enters the area on the inner side of the left and right wheels the control section decelerates the mean traveling speed under predetermined conditions as the turn center position approaches an intermediate position between the left and right of the vehicle, and when executing deceleration setting conditions, while taking the mean traveling speed as being the same as under the standard setting conditions, decelerates a speed of a wheel on one side more than the speed thereof under the standard setting conditions.

A riding lawnmower according to the present invention that relates to the second aspect comprises left and right wheels as main drive wheels that are each independently driven by an electric rotary machine; at least one caster wheel as a steering control wheel; a lawnmower blade or a lawnmower reel that is driven for lawn mowing; a control section that, in response to a turn instruction input by a turn operator, controls each traveling driving of the left and right wheels in accordance with preset standard setting conditions or in accordance with setting conditions for free control of a wheel on one side as special setting conditions that are different from the standard setting conditions that, when a turn center position is either a ground-contact position of a left wheel or a ground-contact position of a right wheel, places a wheel on one side that corresponds to the turn center position in a freely rotating state around an axle and does not execute traveling driving and braking; and unit that designates either the standard setting conditions or the setting conditions for free control of a wheel on one side; wherein the left and right wheels are caused to turn around a turn center position in correspondence with a turn instruction according to the designated setting conditions.

Further, in a riding lawnmower according to the present invention relating to the second aspect, preferably the turn operator is a two lever-type operator that obtains left and right wheel speeds as a turn instruction input, and the control section performs free control of a wheel on one side when a turn instruction input of an operator with respect to the wheel on one side that corresponds to a turn center position is an instruction to enter a state in which a connection between an electric rotary machine and the wheel on one side is released.

Further, a riding lawnmower according to the present invention that relates to the second aspect comprises left and right wheels as main drive wheels that are each independently driven by an electric rotary machine; at least one caster wheel as a steering control wheel; a lawnmower blade or a lawnmower reel that is driven for lawn mowing; a control section that, in response to a turn instruction input by a turn operator, controls each traveling driving of the left and right wheels in accordance with preset standard setting conditions or in accordance with turn restriction setting conditions as special setting conditions that are different from the standard setting conditions that, when a turn center position enters a region on an inner side of the left and right wheels, return the turn center position at least as far as a wheel-to-ground position of either the left or right wheel; and unit that designates either the standard setting conditions or the turn restriction setting conditions, wherein the left and right wheels are caused to turn around a turn center position in correspondence with a turn instruction in accordance with the designated setting conditions.

Preferably a riding lawnmower according to the present invention relating to the second aspect comprises a slope sensor that detects a slope-to-horizontal plane angle of the riding lawnmower, and the control section obtains a time when a detection value of the slope sensor exceeds a predetermined threshold slope angle as designation of the turn restriction setting conditions, and controls traveling driving of the left and right wheels under the turn restriction conditions.

According to at least one of the above described configurations relating to the second aspect, a riding lawnmower comprises left and right wheels as main drive wheels that are each independently driven by an electric rotary machine, and at least one caster wheel as a steering control wheel, and, in response to a turn instruction input by a turn operator, controls the driving of the left and right wheels in accordance with preset standard setting conditions or in accordance with special setting conditions that are different from the standard setting conditions. Accordingly, it is possible to perform delicate control with respect to traveling and turning to conform with circumstances that differ from a standard case.

Further, according to at least one of the above described configurations relating to the second aspect, a riding lawnmower comprises left and right wheels as main drive wheels that are each independently driven by an electric rotary machine, and at least one caster wheel as a steering control wheel, and in response to a turn instruction input by a turn operator, controls each traveling driving of the left and right wheels in accordance with preset standard setting conditions or in accordance with deceleration setting conditions under which a traveling speed is decelerated more than under the standard setting conditions. Accordingly, it is possible to perform delicate control that executes traveling and turning movements gently and at a low speed in consideration of circumstances beyond the ordinary.

Further, according to at least one of the above described configurations relating to the second aspect, a riding lawnmower comprises left and right wheels as main drive wheels that are each independently driven by an electric rotary machine, and at least one caster wheel as a steering control wheel, and in response to a turn instruction input by a turn operator, controls each traveling driving of the left and right wheels in accordance with preset standard setting conditions or in accordance with setting conditions for free control of a wheel on one side as special setting conditions that are different from the standard setting conditions that, when a turn center position is either a ground-contact position of a left wheel or a ground-contact position of a right wheel, places a wheel on one side that corresponds to the turn center position in a freely rotating state around an axle and does not execute traveling driving and braking. That is, in special circumstances in which a turn center position is a ground-contact position of a wheel on one side, that wheel on one side is placed in a free state without applying a driving force or applying a brake thereto. For example, it is therefore possible to suppress the occurrence of damage and the like to the condition of a lawn.

Further, according to at least one of the above described configurations relating to the second aspect, a riding lawnmower comprises left and right wheels as main drive wheels that are each independently driven to travel by an electric rotary machine, and at least one caster wheel as a steering control wheel, and in response to a turn instruction input by a turn operator, controls each traveling driving of the left and right wheels in accordance with preset standard setting conditions or in accordance with turn restriction setting conditions as special setting conditions that are different from the standard setting conditions that, when a turn center position enters a region on the inner side of the left and right wheels, return the turn center position at least as far as a wheel-to-ground position of either the left or right wheel. It is therefore possible to prevent the turning radius becoming too small to, for example, prevent a situation in which the riding lawnmower enters an unstable state on sloping ground or the like due to a execution of a turning movement with a small turn radius.

A riding lawnmower according to the present invention that relates to a third aspect comprises two main drive wheels and a caster wheel as a steering control wheel, in which at least the two main drive wheels are driven by a traction power source, further comprising switching unit, wherein the switching unit executes switching to either a forced steering mode that forcefully steers the caster wheel using a steering power source or a free steering mode that enables free steering of the caster wheel by stopping power generation of the steering power source or cutting off the transmission of power for steering to the caster wheel from the steering power source.

Preferably, the switching unit receives detection signals that are respectively input from an operation amount detection section that detects an operation amount of a steering operation section that is operated by a driver and a caster wheel direction detection section that detects a direction of the caster wheel, and, when a caster wheel direction corresponding to a detection signal from the operation amount detection section is different from a caster wheel direction corresponding to a detection signal from the caster wheel direction detection section, the switching unit switches from the free steering mode to the forced steering mode.

More preferably, at least in the forced steering mode, the caster wheel is driven by a power source for caster wheel traveling.

Further, a riding lawnmower according to the present invention relating to the third aspect comprises two main drive wheels and a caster wheel as a steering control wheel, in which at least the two main drive wheels are driven by a traction power source, the traction power source being an electric motor, and further comprises electric motor control unit, wherein the electric motor control unit controls backward slipping of the vehicle when the vehicle is stopped on a sloping surface by controlling the electric motor so as to generate torque when the rotational speed of the electric motor is zero.

Preferably, in order to control downward slipping of the vehicle on a sloping surface, the electric motor control unit controls torque generated when the rotational speed of the electric motor is zero by using a voltage applied to the electric motor as a parameter.

Further, a riding lawnmower according to the present invention relating to the third aspect comprises two main drive wheels and a caster wheel as a steering control wheel, in which at least the two main drive wheels are driven by a traction power source, the traction power source being an electric motor, and further comprises brake section control unit, wherein the brake section control unit controls a braking state of the brake section so as to release braking by the brake section only in a case in which a torque of the electric motor exceeds a predetermined torque corresponding to an angle of a sloping surface even when a braking operation section is turned off when starting to move the vehicle while on a sloping surface.

Furthermore, a riding lawnmower according to the present invention relating to the third aspect comprises two main drive wheels and a caster wheel as a steering control wheel, in which at least the two main drive wheels are driven by a traction power source, further comprising switching unit, wherein, when a slip ratio of the main drive wheels is a predetermined value or more the switching unit switches from a first drive mode that drives only the main drive wheels to a second drive mode that drives both the main drive wheels and the caster wheel.

Preferably, when the slip ratio of the main drive wheels is 5% or more and 15% or less, the switching unit switches from the first drive mode that drives only the main drive wheels to a second drive mode that drives both the main drive wheels and the caster wheel. Further preferably, when the slip ratio of the main drive wheels is approximately 10% the switching unit switches from the first drive mode that drives only the main drive wheels to a second drive mode that drives both the main drive wheels and the caster wheel.

Preferably, when the slip ratio of the main drive wheels is less than a predetermined value (preferably, less than 5%), power generation of the power source for caster wheel traveling is stopped or transmission of power to the caster wheel from the power source for caster wheel traveling is cut off.

In a riding lawnmower according to the present invention relating to the third aspect, preferably, after switching from the first drive mode that drives only the main drive wheels to the second drive mode that drives both the main drive wheels and the caster wheel, the switching unit switches from the second drive mode to the first drive mode when a size of an assist torque that is a torque that drives the caster wheel or the proportion of the assist torque relative to the torque that drives the main drive wheels falls below a predetermined value due to the assist torque decreasing in accordance with an increase in the torque that drives the main drive wheels.

Further, a riding lawnmower according to the present invention relating to the third aspect comprises two main drive wheels and a caster wheel as a steering control wheel, in which at least the two main drive wheels are driven by a traction power source, further comprising speed control unit, wherein, when an overrun ratio of the vehicle is greater than or equal to a predetermined value when the vehicle descends over a sloping surface, the speed control unit controls a traction power source for main drive wheel traveling or for caster wheel traveling so as to suppress the vehicle speed.

Furthermore, a riding lawnmower according to the present invention relating to the third aspect comprises two main drive wheels and a caster wheel as a steering control wheel, in which at least the two main drive wheels are driven by a traction power source, further comprising switching unit, wherein, when the riding lawnmower is descending over a sloping surface, the switching unit switches from a first drive mode that drives only the main drive wheels to a second drive mode that drives both the main drive wheels and the caster wheel.

In each riding lawnmower according to the present invention relating to the third aspect described above, preferably a power supply source that supplies power to an electric motor for driving a lawnmower is at least one member of the group consisting of an electricity generator that is driven by an internal combustion engine, a fuel cell, and an accumulator section that is a secondary battery or a capacitor.

Further, in each riding lawnmower according to the present invention relating to the third aspect described above, preferably an operation section for vehicle steering is any one member of the group consisting of a steering wheel, a joy stick, a foot pedal, and an operating lever, or is any one member selectable from that group.

Further, each riding lawnmower according to the present invention relating to the third aspect described above preferably comprises a steering traveling control section that controls a driving state for steering and traveling of the caster wheel, wherein, when a steering angle of the caster wheel is greater than or equal to a predetermined steering angle, the steering traveling control section executes control to cut off transmission of power to the caster wheel from the power source for caster wheel traveling or to stop power generation of the power source for caster wheel traveling so that the caster wheel enters a free traveling state.

Further, in each riding lawnmower according to the present invention relating to the third aspect described above, preferably two caster wheels are provided, one on the left side and one on the right sides, and in the forced steering mode in which at least the two caster wheels are forcefully steered by a steering power source, in response to an operation of the operation section for vehicle steering, the two caster wheels can be forcefully steered by mutually independent steering power sources.

According to at least one of the above described riding lawnmowers relating to the third aspect, because switching unit is provided that executes switching to either a forced steering mode that forcefully steers a caster wheel using a steering power source or a free steering mode that enables free steering of a caster wheel by stopping power generation of the steering power source or by cutting off transmission of power for steering to the caster wheel from the steering power source, by switching to the forced steering mode when traveling on a sloping surface the occurrence of a disadvantage such as the caster wheel facing more in a downward direction than in the direction desired by the driver can be prevented. More specifically, a riding lawnmower can be made to advance accurately in the direction desired by the driver. Further, because the mode can be switched to a free traveling mode by the switching unit when the forced steering mode is unnecessary, such as when traveling at a high speed, downsizing of the steering power source is facilitated. Also, by making the caster wheel a steering control wheel, the degree of freedom of the vehicle when turning can be enhanced. For example, a sharp turn that advantageously decreases the turning radius when turning can be more easily executed.

Further, according to at least one of the above described riding lawnmowers relating to the third aspect, because electric motor control unit is provided that controls downward slipping of the vehicle when the vehicle is stopped on a sloping surface by controlling the electric motor so as to generate torque with the rotational speed of the electric motor at zero, it is possible to prevent situations in which the driver feels a sense of discomfort after releasing a mechanical brake when the vehicle is stopped on a sloping surface by controlling downward slipping of the vehicle on the sloping surface even before the vehicle starts to move under the power of the electric motor for vehicle driving.

Further, according to at least one of the above described riding lawnmowers relating to the third aspect, because brake section control unit is provided that controls a braking state of the brake section so as to release braking by the brake section only in a case in which a torque of the electric motor for vehicle driving exceeds a predetermined torque that corresponds to an angle of a sloping surface even when a braking operation section is turned off when starting to move the vehicle while on a sloping surface, it is possible to prevent situations in which the driver feels a sense of discomfort after releasing a mechanical brake when the vehicle is stopped on a sloping surface by controlling downward slipping of the vehicle on the sloping surface even before the vehicle starts to move under the power of the electric motor for vehicle driving.

Furthermore, according to at least one of the above described riding lawnmowers relating to the third aspect, because switching unit is provided that switches from the first drive mode that drives only the main drive wheels to the second drive mode that drives both the main drive wheels and the caster wheel in a case in which the slip ratio of the main drive wheels is greater than or equal to a predetermined value, when the main drive wheels slip on a lawn at a ratio that is greater than or equal to a predetermined slip ratio in a case where the vehicle is climbing up a sloping surface, both the main drive wheels and the caster wheels are driven. Consequently, because the driving force increases and the main drive wheels do not slip, it is possible to suppress the occurrence of damage to the lawn by the main drive wheels.

Further, according to at least one of the above described riding lawnmowers relating to the third aspect, because speed control unit is provided that, when an overrun ratio of the vehicle is greater than or equal to a predetermined value when the vehicle descends over a sloping surface, control a traction power source for main drive wheel traveling or for caster wheel traveling so as to suppress the vehicle speed, in a case in which the vehicle is descending on a sloping surface, even if the main drive wheels slip on the surface, by curbing the vehicle speed it is possible to prevent excessive slipping and thereby suppress the occurrence of damage to a lawn by the main drive wheels.

Further, according to at least one of the above described riding lawnmowers relating to the third aspect, because switching unit is provided that, when the vehicle is descending on a sloping surface, switch from the first drive mode that drives only the main drive wheels to the second drive mode that drives both the main drive wheels and the caster wheel, because a gripping power with respect to the sloping surface of the main drive wheels and the caster wheel increases when the vehicle is descending on a sloping surface, it is possible to prevent the main drive wheels from slipping excessively and thereby suppress the occurrence of damage to the lawn by the main drive wheels.

Thus, in the case of any on the inventions according to the present invention relating to the third aspect, the disadvantages for a riding lawnmower when the vehicle is on a sloping surface can be ameliorated.

BRIEF DESCRIPTION OF THE DRAWINGS

FIG. 13a is a view illustrating a state in which a steering angle or the like of a caster wheel is determined using a turn center position, according to the first embodiment of the present invention;

FIG. 13b is a view that describes the manner in which a steering angle or the like of a caster wheel is determined using a turn center position, according to the first embodiment of the present invention;

FIG. 14 is a view that describes the manner in which a speed of a caster wheel or the like is determined using a turn center position, according to the first embodiment of the present invention;

FIG. 15 is a view showing examples of W, T, t, $r_r$, and $r_f$ determined in accordance with the configuration of a riding lawnmower according to the first embodiment of the present invention;

FIG. 16 is a view showing results obtained for difference in number of revolutions, turn center position, and number of caster wheel revolutions by changing the number of wheel revolutions according to the first embodiment of the present invention;

FIG. 38a is a view illustrating a state in which a steering angle of a caster wheel or the like is determined using a turn center position according to the second embodiment;

FIG. 38b is a view illustrating the manner in which a steering angle of a caster wheel or the like is determined using a turn center position according to the second embodiment;

FIG. 39 is a view illustrating the manner in which a speed of a caster wheel or the like is determined using a turn center position according to the second embodiment;

FIG. 44 is viewed from the right side to the left side according to the sixth embodiment;

DESCRIPTION OF EXEMPLARY EMBODIMENTS

[First Embodiment]

Figure 1:
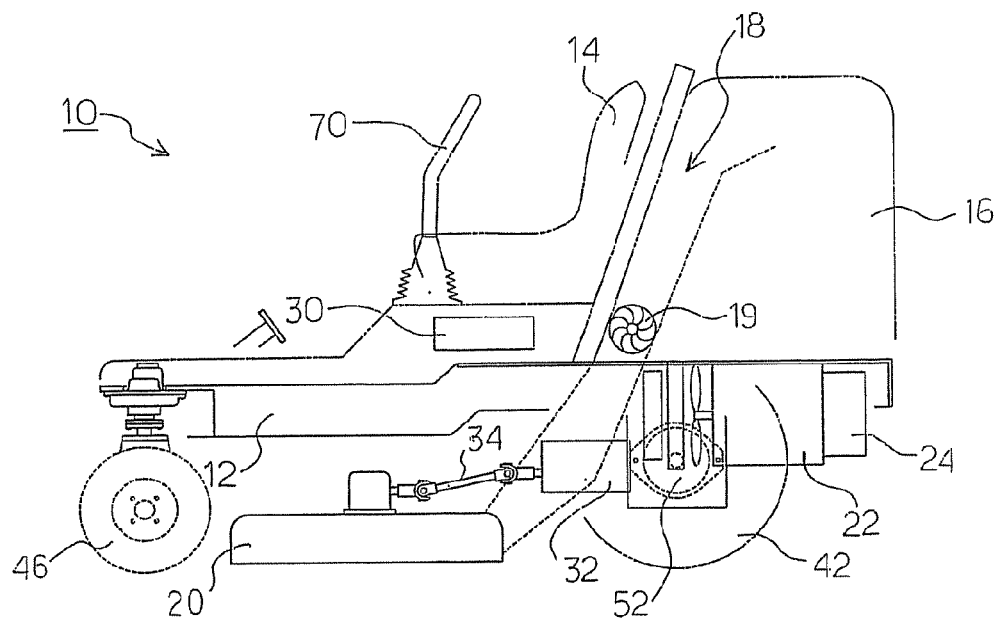
FIG. 1 is a side view of a riding lawnmower according to a first embodiment of the present invention.

Hereunder, a first embodiment of the present invention relating to a first aspect and a second aspect of the present invention is described in detail while referencing the drawings. Although in the following description a four-wheel drive type apparatus having left and right rear wheels as main drive wheels and left and right front wheels as steering control wheels that are each independently provided with an electric rotary machine is described as an example riding lawnmower, this embodiment may also be applied to riding lawnmower of a three-wheel drive type having one wheel as a steering control wheel, or the like.

Further, although in the following an example is described wherein an electric rotary machine is used as a driving source of the riding lawnmower, as a driving source of the left and right rear wheels, a driving source of the steering control wheels, and as a driving source of a lawnmower blade, a driving source other than an electric rotary machine may be used for one part of or all of these driving sources. For example, an oil hydraulic motor may be used as a driving source of the left and right rear wheels. In some cases, naturally, an oil hydraulic motor may be used as a driving source of the steering control wheels or as a driving source of the lawnmower blade. Further, an internal combustion engine may be used, via a suitable power transmission device, as the driving source of the left and right rear wheels, the steering control wheels, and the lawnmower blade.

Although an apparatus having a function as an electric motor that is supplied with power and outputs a rotational driving force to a wheel and also having a function as an electricity generator that recovers regenerative energy when braking is applied to a wheel is used as an electric rotary machine in the following description, an apparatus having a function simply as an electric motor can also be used. An electricity generator may also be provided separately.

Further, although in the following example an electric energy supply source for an electric rotary machine or the like is provided as a power supply unit, and a so-called hybrid riding lawnmower that uses an engine and an electricity generator as a power supply source for the power supply unit is described, the configuration may be one that uses only a power supply unit, wherein no engine or electrical generator is provided. In that case, the space required for the engine and the like can be eliminated. The power supply unit may be a secondary battery that receives a supply of charged energy from outside, or may be a unit having a self-electricity generating function such as a fuel cell or a solar cell.

Further, although a lawnmower blade-type device having a rotary shaft perpendicular to the ground surface that cuts and mows a lawn or the like by rotating blades in which a plurality of blades are disposed around the rotation axis is described as a rotary tool for lawn mowing, a lawnmower reel-type device in which, for example, a helical blade is disposed in a cylinder having a rotary shaft parallel with the ground surface and which clips and mows a lawn or the like may also be used.

The arrangement of each component in the riding lawnmower described below is one example for describing a configuration suited to storing weeds and the like that are mowed by the lawnmower blade, and appropriate changes can be made according to the specifications of the riding lawnmower and the like.

EXAMPLE 1

Figure 2:
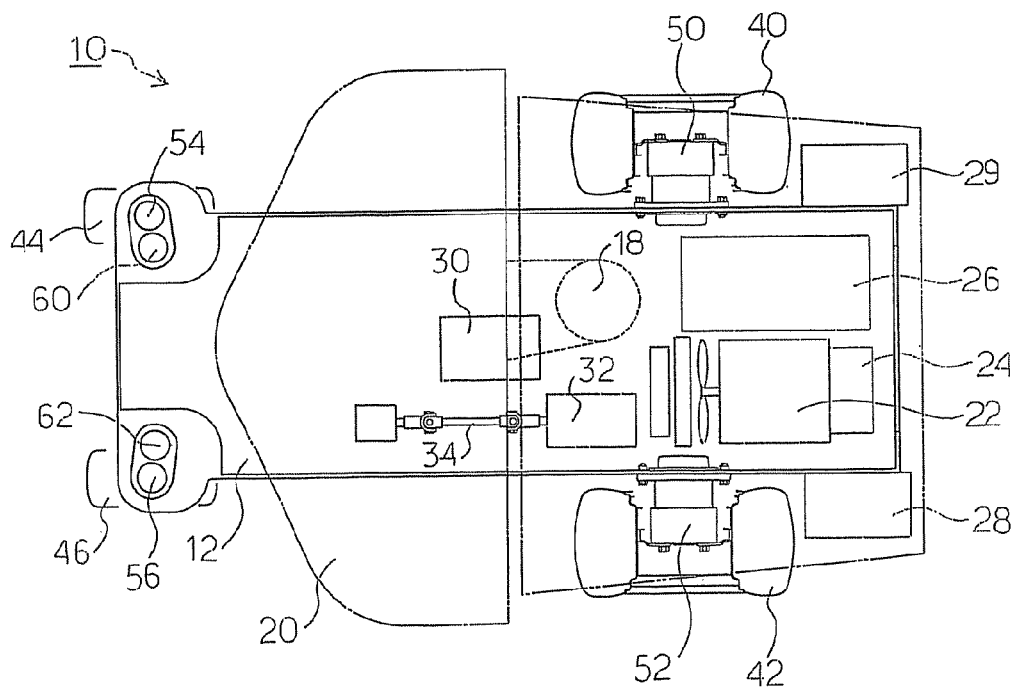
FIG. 2 is an abbreviated top view that illustrates components on a main frame in a riding lawnmower according to the first embodiment of the present invention.
Figure 3:
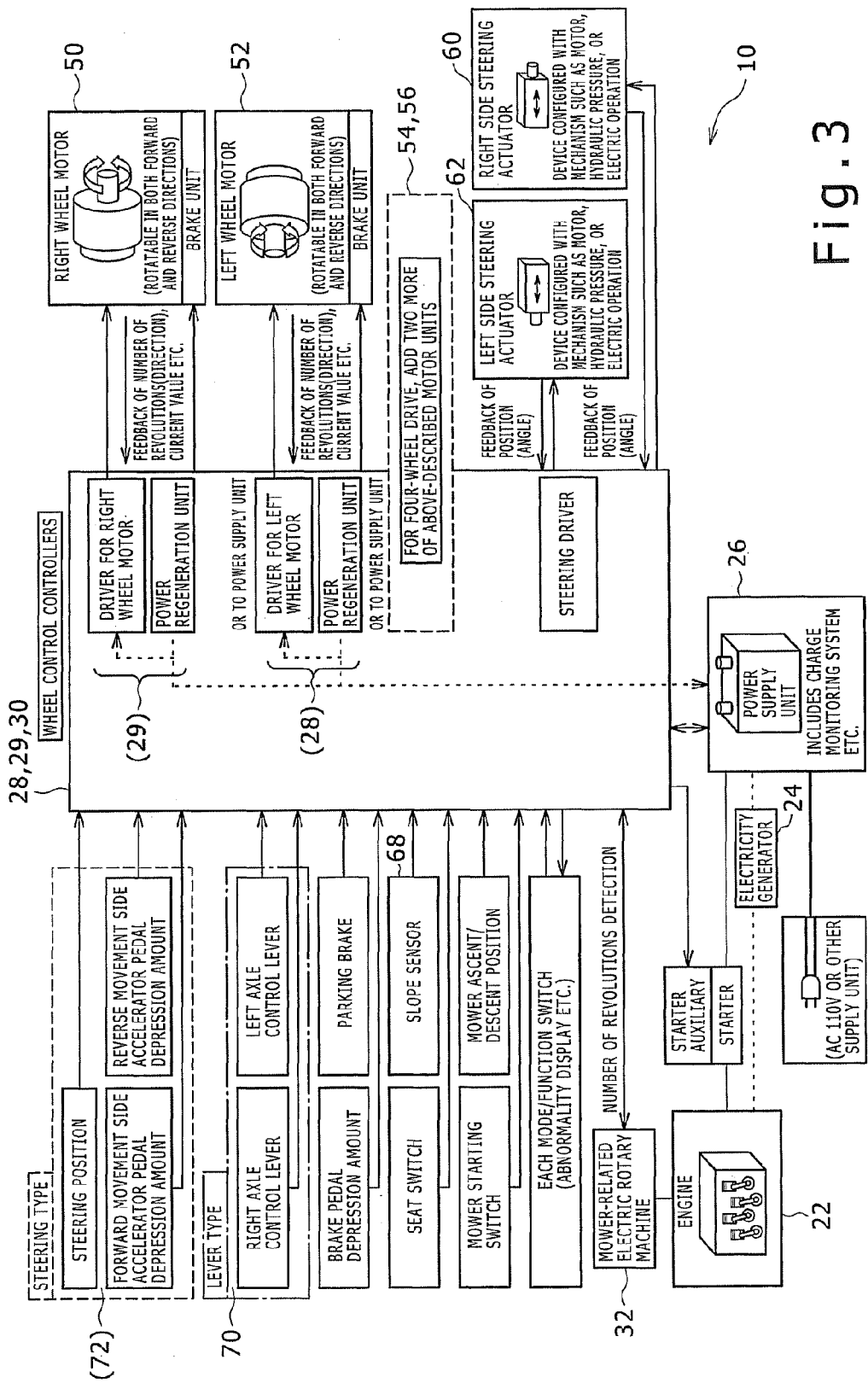
FIG. 3 is a block diagram that relates to electrical system components in a riding lawnmower according to the first embodiment of the present invention.

FIG. 1 is a side view of a riding lawnmower 10, and FIG. 2 is an abbreviated top view that illustrates components on a main frame 12 in the riding lawnmower 10. FIG. 3 is a block diagram that relates to electrical system components in the riding lawnmower 10. First, the disposition of each component is described centering on the main frame 12 using FIG. 1 and FIG. 2. Thereafter, the details of each component are described using FIG. 3.

As shown in FIG. 1 and FIG. 2, the riding lawnmower 10 is a self-propelled off-road vehicle suited to lawn mowing in which components such as left and right wheels 40 and 42 as main drive wheels, left and right caster wheels 44 and 46 as steering control wheels, a mower deck 20 provided with a lawnmower blade as a lawnmower rotary tool, and a seat 14 on which an operator sits and performs steering for lawn mowing work are attached to the main frame 12.

The main frame 12 forms the skeleton of the riding lawnmower 10, and is configured as a component having a substantially rectangular plane shape on which components can be mounted. On the main frame 12, the left and right caster wheels 44 and 46 are attached in a moveable condition at the bottom surface side of the front end thereof, the seat 14 is provided on the upper surface side in a substantially center part, and the left and right wheels 40 and 42 are attached in a moveable condition at the bottom side in a position between the seat 14 and the rear end. The mower deck 20 is disposed between the left and right caster wheels 44 and 46 and the left and right wheels 40 and 42 on the bottom surface side of the main frame 12. That is, the main frame 12 is also a skeleton member having a function of configuring the riding lawnmower 10 as an apparatus in which the rear wheels are the main driving wheels and the steering control wheels are the caster wheels that are disposed to the front of the mower deck. For the main frame 12, a metallic material having a suitable strength, such as steel, is used, and a member formed in a beam structure or the like can be used.

On the bottom surface side of the main frame 12 are disposed an engine 22 that is an internal combustion engine, an electricity generator 24 that extracts power from the engine 22, a power supply unit 26 that is an electricity storage device that is charged by power from the electricity generator 24 or the like. Further, electric-motor axle rotating machines 50 and 52 that are driving sources of the left and right wheels 40 and 42, steering control wheel electric rotary machines 54 and 56 that are driving sources of the left and right caster wheels 44 and 46, steering actuators 60 and 62, a mower-related electric rotary machine 32 that is a driving source of a lawnmower blade of the mower deck 20, and a power transmission shaft mechanism 34 are each disposed on the bottom surface side of the main frame 12. Thus, the principal components used for traveling driving and mowing driving of the riding lawnmower 10 are disposed on the bottom surface side of the main frame 12.

Controllers 28, 29, and 30 that perform overall control of the operation of each component such as the power supply unit 26, the electric-motor axle rotating machines 50 and 52, the steering control wheel electric rotary machines 54 and 56, the steering actuators 60 and 62, and the mower-related electric rotary machine 32 are disposed at suitable positions on the top surface side or bottom surface side of the main frame 12. Because the controllers 28, 29, and 30 are electrical circuits, a distributed arrangement of these components is much more easily achievable than with the mechanical components. In the example shown in FIG. 1 and FIG. 2, the controllers 28, 29, and 30 are arranged in a manner in which they are distributed among a total of three locations consisting of one position on the underside of the seat 14 that is on the top surface side of the main frame 12 and two positions near the electric-motor axle rotating machines 50 and 52 that are on the bottom surface side of the main frame 12. These controllers 28, 29, and 30 are connected to each other with a suitable signal cable or the like. In such a case, a driver circuit such as an inverter circuit that is used for the electric-motor axle rotating machines 50 and 52 is principally disposed in the controllers 28 and 29 that are disposed at positions close to the electric-motor axle rotating machines 50 and 52, and a control logic circuit such as a CPU is principally disposed in the controller 30 that is disposed at a position close to the seat 14.

A two lever-type operator 70 for traveling and turning is disposed on the top surface side of the main frame 12, in addition to the seat 14. A grass storage tank 16 that stores grass such as lawn grass that has been mowed by the lawnmower blade of the mower deck 20 is disposed to the rear of the seat 14. A tilting chute referred to as a "mower duct" 18 is provided between the mower deck 20 and the grass storage tank 16. A grass blower fan 19 for blowing grass such as lawn grass that has been mowed is provided in the mower duct 18. One end of the mower duct 18 opens to the mower deck 20 side and the other end opens to the grass storage tank 16 side. Thus, apart from the space provided for steering, the top surface side of the main frame 12 is used as space for loading clippings, such as lawn grass that has been mowed. As a result, a relatively large capacity can be set as the storage capacity of the grass storage tank 16.

The mower duct 18 is disposed in approximately the center part of the main frame 12, at an intermediate portion between the left and right wheels 40 and 42. The reason this arrangement is possible is that the electric-motor axle rotating machines 50 and 52 that are the driving sources of the left and right wheels 40 and 42 are disposed in each wheel rim of the left and right wheels 40 and 42, respectively, and not in the center part of the main frame 12.

Next, the details of each component and their relationship to each other are described using the block diagram shown in FIG. 3. In FIG. 3, the same reference numerals are assigned to components that are the same as components described in FIG. 1 and FIG. 2. Description is made below using the symbols of FIG. 1 and FIG. 2, as needed.

The output shaft of the engine 22 is connected to the electricity generator 24. By causing the electricity generator 24 to rotate, the engine 22 acts as a driving source having a function that generates the electric power required for operation of the riding lawnmower 10. As one example, because output of the engine 22 of approximately 11,172 Nm/sec (approximately 15 horse power) corresponds to electric power of approximately 11.19 kW, it is sufficient to mount an engine 22 with appropriate output capability in correspondence with the required electric power taking into account the conversion efficiency. As the engine 22, for example, an internal combustion engine that uses gasoline, diesel fuel, liquid propane, natural gas or the like as fuel can be used.

The electricity generator 24 is a device that has a function that converts mechanical energy of the engine 22 into electrical energy, and is commonly referred to as an "alternator". In this connection, the electricity generator 24 can function as a motor when it is supplied with electric power and, as a result of this function, the electricity generator 24 can be used as a starter of the engine 22. The "starter" shown in FIG. 3 indicates another function of the electricity generator 24. Naturally, a starter device independent of the electricity generator 24 can be separately provided.

The power supply unit 26 is a secondary battery that has functions of storing electrical energy that is generated by the electricity generator 24, and, as necessary, supplying electrical power to the load of the electric-motor axle rotating machines 50 and 52 and the like. A lead storage battery, a lithium ion battery pack, a nickel hydrogen battery pack, a capacitor or the like can be used as the power supply unit 26.

The power supply unit 26 can also receive a supply of charging energy from an external power supply separately to the electric power supply system from the engine 22 and the electricity generator 24. In FIG. 3, the phrase "AC 110 V or other supply unit" indicates a system that receives a charged energy supply from an external power supply by a so-called "plug-in method". Therefore, when the riding lawnmower 10 is not operating, the power supply unit 26 can be adequately charged using an external power supply, so that when performing lawn mowing work the riding lawnmower 10 can be operated using only the electric power of the power supply unit 26, without operating the engine 22.

The mower-related electric rotary machine 32 is connected to the power supply unit 26 and has a function of rotationally driving a lawnmower blade of the mower deck 20. The operation of the mower-related electric rotary machine 32 is controlled by turning a mower starting switch provided near the seat 14 (see FIG. 3) on or off. More specifically, the controllers 28, 29, and 30 detect the on/off state of the mower starting switch and based on that detection they control the operations of a mower-related electric rotary machine driver to activate or stop the mower-related electric rotary machine 32.

In FIG. 3, although the two lever-type operator 70 and a handle-type or monolever-type steering operator 72 are shown, these are shown together to facilitate the description, and in fact the riding lawnmower 10 only comprises either one of these. In the example shown in FIG. 1 and FIG. 2, the two lever-type operator 70 is illustrated.

The two lever-type operator 70 is an operator that has a function of regulating the rotational speeds of the left and right wheels 40 and 42 using two levers. For example, a left wheel axle control lever that regulates the number of revolutions per unit time of the left wheel 42 is disposed on the left side of the seat 14 and a right wheel axle control lever that regulates the number of revolutions per unit time of the right wheel 40 is disposed on the right side of the seat 14. Each lever can be moved in the front and rear direction with respect to the seat 14. The operation amount of each lever is transmitted to the controllers 28, 29, and 30 using a suitable sensor, to thereby control the operation of the electric-motor axle rotating machines 50 and 52 that are connected to the left and right wheels 40 and 42. As described below, the operations of the steering control wheel electric rotary machines 54 and 56 can also be controlled in combination with the operations of the electric-motor axle rotating machines 50 and 52.

For example, when a lever is tilted forward the wheel is caused to rotate to the forward travel side. In this case, as the lever is tilted more forward, the number of revolutions per unit time of the wheel increases and the forward travel speed increases. In contrast, when the lever is tilted backward the wheel is caused to rotate to the reverse travel side. In this case, as the lever is tilted more backward, the number of revolutions per unit of the wheel increases and the reverse travel speed increases. When the lever is in an intermediate position, the rotational speed (number of revolutions per unit time) of the wheel is zero. This state is a so-called "neutral state" in which the vehicle is in a stopped state. Thus, the two lever-type operator 70 has a function that can independently regulate the respective rotational speed of the left and right electric-motor axle rotating machines 50 and 52 by operation of the two levers. In this connection, as described below, when also controlling the operations of the steering control wheel electric rotary machines 54 and 56 in combination with the operations of the electric-motor axle rotating machines 50 and 52, the two lever-type operator 70 has a function that, by operation of the two levers, can independently regulate the respective rotational speeds of the left and right electric-motor axle rotating machines 50 and 52, and regulate the rotational speeds of the steering control wheel electric rotary machines 54 and 56 in accordance with the rotational speeds of the electric-motor axle rotating machines 50 and 52.

Although the representative example of the configuration of the steering operator 72 is a round steering wheel, accelerator pedals are also used along with the steering wheel. Hereunder, the term "steering operator" includes both a steering wheel or other hand controls and accelerator pedals. In this case, accelerator pedals are separately provided for the forward travel side and the reverse travel side. In some cases, a single accelerator pedal can be used for both the forward travel side and the reverse travel side. For example, the steering wheel is disposed in front of the seat 14 and a forward-travel side accelerator pedal and a reverse-travel side accelerator pedal are disposed on the left and right sides on the underside of the seat 14. The steering wheel can rotate at an arbitrary angle in a clockwise direction or counter-clockwise direction around the rotation axis, and each accelerator pedal can be depressed by an arbitrary depression amount. The operation amount of the steering wheel, that is, the steering position, is transmitted to the controllers 28, 29, and 30 using a suitable sensor, and, likewise, the depression amount of each accelerator pedal is transmitted to the controllers 28, 29, and 30 using a suitable sensor to thereby control the operations of the electric-motor axle rotating machines 50 and 52 that are connected to the left and right wheels 40 and 42. As described below, the operations of the steering control wheel electric rotary machines 54 and 56 can also be controlled in combination with the operations of the electric-motor axle rotating machines 50 and 52.

For example, when the forward-travel side accelerator pedal is depressed with the steering wheel in a middle position, the wheel is rotated toward the forward travel side, and, as the depression amount increases, the rotational speed of the wheel grows and the speed of forward travel increases. In contrast, when the reverse-travel side accelerator pedal is depressed the wheel is rotated toward the reverse travel side, and, as the depression amount increases, the rotational speed of the wheel grows and the speed of reverse travel increases. It is thereby possible to cause the riding lawnmower 10 to move forward or in reverse at an arbitrary speed.

When the steering wheel is rotated in the clockwise direction with the forward-travel side accelerator pedal kept in a state in which it is depressed by an appropriate amount, the rotational speed of the left wheel becomes higher than that of the right wheel and the riding lawnmower 10 can be made to turn right while traveling. When the rotation amount of the steering wheel is increased, the difference between the number of left wheel revolutions and the number of right wheel revolutions per unit time increases. Conversely, by decreasing the rotation amount of the steering wheel the difference between the number of left wheel revolutions and the number of right wheel revolutions per unit time can be reduced. In this manner, the turning radius can be adjusted. When the steering wheel is rotated in the counter-clockwise direction, the rotational speed of the right wheel becomes higher than the rotational speed of the left wheel and the riding lawnmower 10 can be caused to turn left while traveling.

By adjusting the amount of depression of the forward-travel side accelerator pedal, the riding lawnmower 10 can also be caused to turn while changing the traveling speed. By depressing the reverse-travel side accelerator pedal and operating the steering wheel, a turn can be executed when reversing.

Thus, the steering operator 72 has a function that can independently regulate the respective rotational speed of the left and right electric-motor axle rotating machines 50 and 52 to perform traveling and turn steering by means of rotational operations of the steering wheel and depression operations of the accelerator pedals. As described below, when also controlling the operations of the steering control wheel electric rotary machines 54 and 56 in combination with the operations of the electric-motor axle rotating machines 50 and 52, the steering operator 72 has a function that, by operation of the steering wheel and the accelerator pedals, can independently regulate the respective rotational speed of the left and right electric-motor axle rotating machines 50 and 52, and regulate the number of revolutions per time of the steering control wheel electric rotary machines 54 and 56 in accordance with the number of revolutions per time of the electric-motor axle rotating machines 50 and 52.

The electric-motor axle rotating machines 50 and 52 are motor/generators for driving the left and right wheels 40 and 42 that are the main drive wheels to travel as described above. More specifically, the respective output shafts of the electric-motor axle rotating machines 50 and 52 are independently connected to the respective axles of the left and right wheels 40 and 42, and they function as motors upon the supply thereto of electric power from the power supply unit 26 and rotate to drive the left and right wheels 40 and 42 to travel. When a braking force is applied to the left and right wheels 40 and 42 by a brake unit or the like, the electric-motor axle rotating machines 50 and 52 function as electricity generators to recover regenerative energy and charge the power supply unit 26. Brushless DC rotating machines can be used as the electric-motor axle rotating machines 50 and 52.

The steering control wheel electric rotary machines 54 and 56 are motor/generators for driving the left and right caster wheels 44 and 46 that are steering control wheels. More specifically, the respective output shafts of the steering control wheel electric rotary machines 54 and 56 are independently connected to the respective axles of the left and right caster wheels 44 and 46, and they function as motors upon the supply thereto of electric power from the power supply unit 26 and rotate to drive the left and right caster wheels 44 and 46 to propel the vehicle. When a braking force is applied to the left and right caster wheels 44 and 46 by a brake unit or the like, the steering control wheel electric rotary machines 54 and 56 function as electricity generators to recover regenerative energy and charge the power supply unit 26. Brushless DC rotating machines can be used as the steering control wheel electric rotary machines 54 and 56. In the example illustrated in FIG. 3, the functions of the electric rotary machines are divided between a motor and a brake unit.

As illustrated in FIG. 3, in some cases it is possible to not provide steering control wheel electric rotary machines for the caster wheels 44 and 46. For example, the riding lawnmower 10 may be configured as a two-wheel drive device.

The left and right steering actuators 60 and 62 are driving devices for rotating the left and right caster wheels 44 and 46, which are the steering control wheels, to an arbitrary steering angle with respect to the travel direction. Here, "rotate" refers not to rotation around the axles of the caster wheels 44 and 46, i.e. not to rotation for traveling, but to rotation about the steering axis in a direction perpendicular to the axels and ground surface. The respective output shafts of the left and right steering actuators 60 and 62 are independently connected to the respective steering axis of the left and right caster wheels 44 and 46, and they function as motors upon the supply thereto of electric power from the power supply unit 26 and rotate to cause the left and right caster wheels 44 and 46 to rotate around the steering axis. Where necessary, a suitable power transmission device such as a gear mechanism can be provided between the motor and the steering axis. Brushless DC rotating machines can be used as the left and right steering actuators 60 and 62. As shown in FIG. 3, a hydraulic actuator or an electrically-driven actuator such as an electrically-driven plunger or the like may also be used.

It is desirable to adopt a configuration in which the connection relationship between the left and right steering actuators 60 and 62 and the steering axis can be switched between coupled and disengaged. For example, by disengaging the connection between the left and right steering actuators 60 and 62 and the steering axis, the caster wheels 44 and 46 become freely rotatable around the steering axis and the steering angle can be determined in accordance with the traveling of the left and right wheels. As described below, when also controlling the operation of the steering control wheel electric rotary machines 54 and 56 in combination with the electric-motor axle rotating machines 50 and 52, it is desirable to make the caster wheels 44 and 46 freely rotatable around the steering axis to determine the steering angle in accordance with the traveling of the left and right wheels.

Further, by placing the left and right steering actuators 60 and 62 and the steering axis in a coupled state, the caster wheels 44 and 46 can be pointed at an arbitrary steering angle under the control of the controllers 28, 29, and 30. For example, when the left and right steering actuators 60 and 62 and the steering axis are in a disengaged state, in some cases, on sloping ground or on an uneven ground surface or the like, the steering angle of the caster wheels 44 and 46 may become unsuitable. In such a case, by monitoring the steering angle using appropriate steering angle detection means, when a divergence from the appropriate steering angle occurs, it is possible to return to the appropriate steering angle by having the controllers 28, 29, and 30 send a command to the left and right steering actuators 60 and 62. After returning to the appropriate steering angle, the connection between the left and right steering actuators 60 and 62 and the steering axis can be again disengaged.

Because the steering control wheel electric rotary machines 54 and 56 and the steering actuators 60 and 62 are provided in this manner in the caster wheels 44 and 46, it is necessary to devise a configuration whereby there is no interference with respect to the mechanism when these are operated simultaneously. FIG. 4 to FIG. 7 are cross sectional views that show examples of dispositional relationships between the steering actuators and the steering control wheel electric rotary machines for the caster wheels. Hereunder, the same reference numerals are assigned to components that are the same as in FIG. 1 and FIG. 2, and a detailed description of this components will not be repeated.

These figures relate to the caster wheel 44, and they both show a steering control wheel electric rotary machine 54, a rotary gear 59 that is connected to the steering actuator and can rotate around the steering axis, and a steering frame 61 that is fixed to the rotary gear 59 and to which the axle of the caster wheel 44 is attached. In these figures, the ground surface is the left-to-right direction on the page, the direction of the axle of the caster wheel 44 is the left-to-right direction on the page, and the direction of the steering axis is a direction along the vertical direction on the page. In this case, when the rotary gear 59 is rotated by a steering actuator (not shown), the steering frame 61, and the caster wheel 44, rotate about the steering axis.

Figure 4:
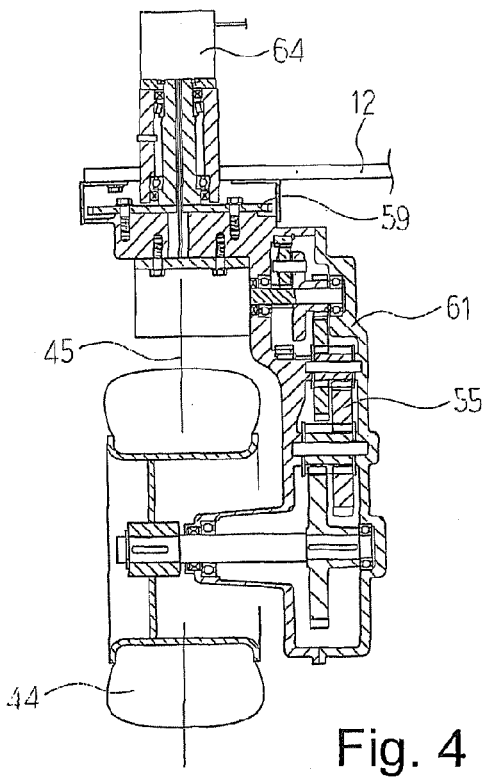
FIG. 4 is a cross sectional view that shows one example of the dispositional relationship between a steering actuator and a steering control wheel electric rotary machine for a caster wheel according to the first embodiment of the present invention.
Figure 5:
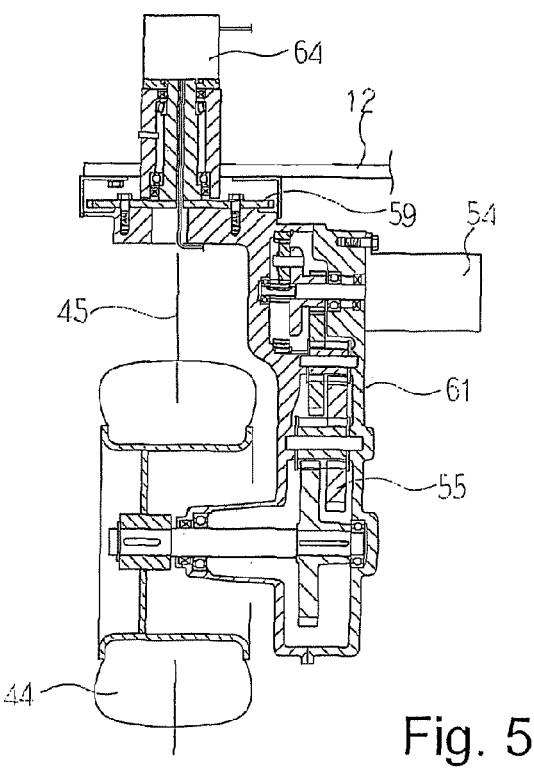
FIG. 5 is a cross sectional view that shows one example of the dispositional relationship between a steering actuator and a steering control wheel electric rotary machine for a caster wheel according to the first embodiment of the present invention.

FIGS. 4, 5, 6a, and 6b show a configuration in which the steering control wheel electric rotary machine 54 is attached to the steering frame 61, and the steering control wheel electric rotary machine 54 rotates around the steering axis when the steering frame 61 rotates around the steering axis. A slip ring 64 is provided so that a cable of the steering control wheel electric rotary machine 54 is not twisted at this time. A power transmission mechanism 55 that is provided between the axle of the caster wheel 44 and the steering control wheel electric rotary machine 54 is housed inside the steering frame 61. FIG. 4 and FIG. 5 illustrate a case in which the power transmission mechanism 55 is a spur gear train mechanism. In the configurations shown FIG. 4 and FIG. 5, the orientation of the attachment of the steering control wheel electric rotary machine 54 to the steering frame 61 differ. In this connection, both FIG. 4 and FIG. 5 show configurations in which the steering axis 45 and the tire center of the caster wheel 44 match. By adopting this configuration, steering resistance can be decreased.

Figure 6A:
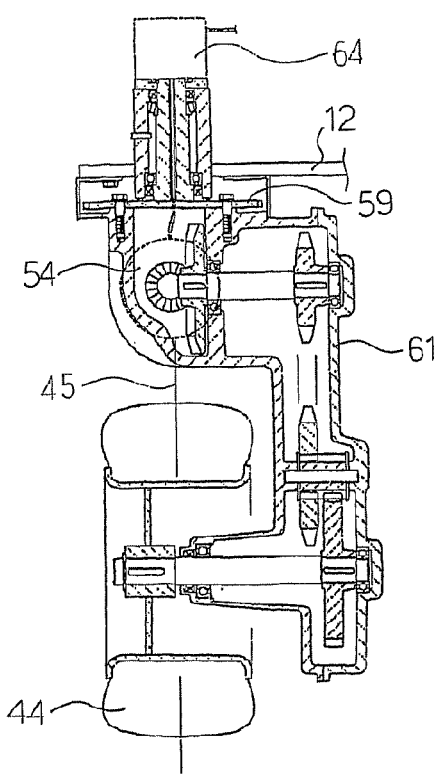
FIG. 6a is a cross sectional view that shows one example of the dispositional relationship between a steering actuator and a steering control wheel electric rotary machine for a caster wheel according to the first embodiment of the present invention.
Figure 6B:
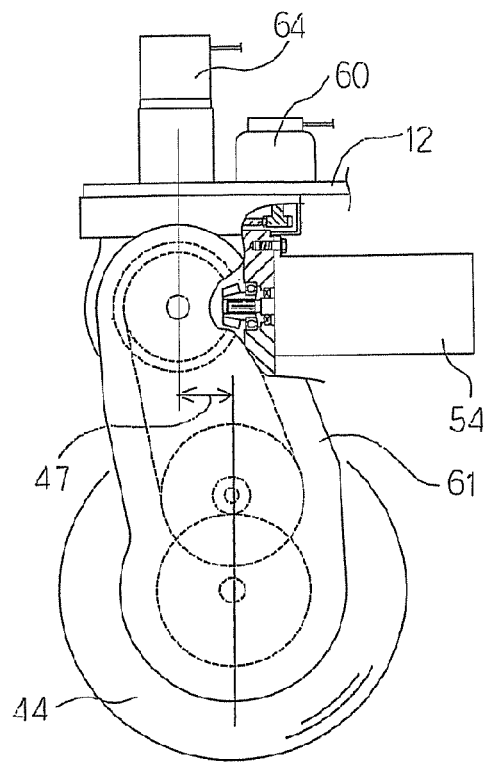
FIG. 6b is a cross sectional view that shows one example of the dispositional relationship between a steering actuator and a steering control wheel electric rotary machine for a caster wheel according to the first embodiment of the present invention.

FIG. 6a and FIG. 6b illustrate a case in which the power transmission mechanism 55 is a mechanism that includes a bevel gear. FIG. 6a is a front view, similar to FIG. 4 and FIG. 5, and FIG. 6b is a side view. The steering actuator 60 is shown in this side view. Further, also similar to FIG. 4 and FIG. 5, although the front view shows that the tire center of the caster wheel 44 and the steering axis 45 match, in the side view it is shown that there is an offset between the steering axis 45 and the tire center of the caster wheel 44. This offset is referred to as a caster trail 47, and provision of this caster trail 47 facilitates determination of a steering angle corresponding to the traveling of the left and right wheels when the steering is in a free rotating state.

Figure 7:
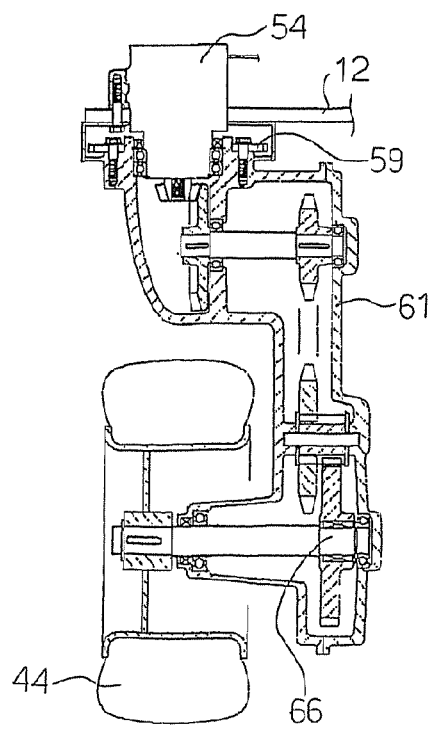
FIG. 7 is a cross sectional view that shows one example of the dispositional relationship between a steering actuator and a steering control wheel electric rotary machine for a caster wheel according the first embodiment of the present invention.

FIG. 7 shows a configuration in which the steering control wheel electric rotary machine 54 is attached to the main frame 12 and the direction of the output shaft thereof is the same as the direction of the steering axis and is also the same as the direction of the central axis of the rotary gear 59. A bevel gear may also be used with this configuration. With this configuration, the cable of the steering control wheel electric rotary machine 54 will not be twisted even if the steering frame 61 rotates. In FIG. 7, an example is illustrated in which a one-way clutch 66 is provided between the power transmission mechanism 55 and the axle of the caster wheel 44. This one-way clutch 66 has a function that cuts off transmission of the power of the steering control wheel electric rotary machine 54 to the axle of the caster wheel 44 when the rotational speed of the steering control wheel electric rotary machine 54 is slower than the rotational speed corresponding to the traveling speed of the riding lawnmower 10. As a result, it is possible to prevent a case in which, during four-wheel driving, the steering control wheel electric rotary machine 54 becomes, contrary to expectation, a load for traveling.

The description will now return again to FIG. 3. In FIG. 3, the controllers 28, 29, and 30 are circuits having a function to perform overall control of the operations of the riding lawnmower 10. In particular, the controllers 28, 29, and 30 have a function that controls the operations of the electric-motor axle rotating machines 50 and 52, and the steering control wheel electric rotary machines 54 and 56 and the like in accordance with the state of the two lever-type operator 70 or the steering operator 72. In addition, the controllers 28, 29, and 30 have a function that controls the operation of the mower-related electric rotary machine 32, the operation of the steering actuators 60 and 62, ascending and descending of the mower deck 20, and starting and stopping of the engine 22 and the like. Therefore, various signals that detect the vehicular state of the riding lawnmower 10, such as a signal of a sensor that detects the state of the two lever-type operator 70 as described above and a signal indicating the on/off state of the mower starting switch are input to the controllers 28, 29, and 30. A signal of a slope sensor 68 that detects the slopeto-horizontal plane angle of the riding lawnmower 10 and the like are included in these signals.

The controllers 28, 29, and 30 include a portion with a memory and a control logic circuit such as a CPU that processes vehicle state detection signals of the riding lawnmower 10 and creates control signals for the respective components, and a portion with a driver circuit the drives the electric-motor axle rotating machines 50 and 52, the steering control wheel electric rotary machines 54 and 56, the steering actuators 60 and 62, the mower-related electric rotary machine 32 and the like. The driver circuit in this example includes an inverter circuit. In FIG. 3, in conformity with the content of FIG. 2, a driver circuit for the electric-motor axle rotating machine 50 is exemplified as the controllers 28 and 29. As described above, the controllers 28, 29, and 30 can be configured with a plurality of circuit blocks. In particular, the control logic circuit such as a CPU and memory portion can be configured with a computer or the like suitable for vehicle mounting.

As the control of the electric-motor axle rotating machines 50 and 52 and the steering control wheel electric rotary machines 54 and 56, basically the rotational speed is controlled in order to achieve a target traveling speed. In particular, when turning, because the traveling speed is determined by the average rotational speed, which is the average values of the left and right wheels, as well as the turning radius and the like, are determined by the difference between the number of revolutions per unit time of the left and right wheels, control is performed with respect to mutually different rotational speed targets while correlating the operations of the respective electric rotary machines. In this case, during linear travel without turning, because the traveling speed is determined by the relationship with the ground load, torque control is performed with output torque as a target value. Vector control can be used for torque control. In such a case, the vector control uses the magnetic flux direction of the motor as a reference, and independently adjusts a current flowing in a reference axis direction and a current flowing in an orthogonal axis direction that is orthogonal thereto in order to control the magnetic flux and the torque. Preferably, the vector control is sensorless vector control.

Although the riding lawnmower 10 may have various functions, the descriptions hereunder relate to turn functions. Turn functions include a coordinate operation control function that is used when driving both the left and right wheels and the caster wheels to travel, and control functions used under various kinds of special setting conditions. These functions are described hereunder using a number of Examples.

EXAMPLE 2

Figure 8:
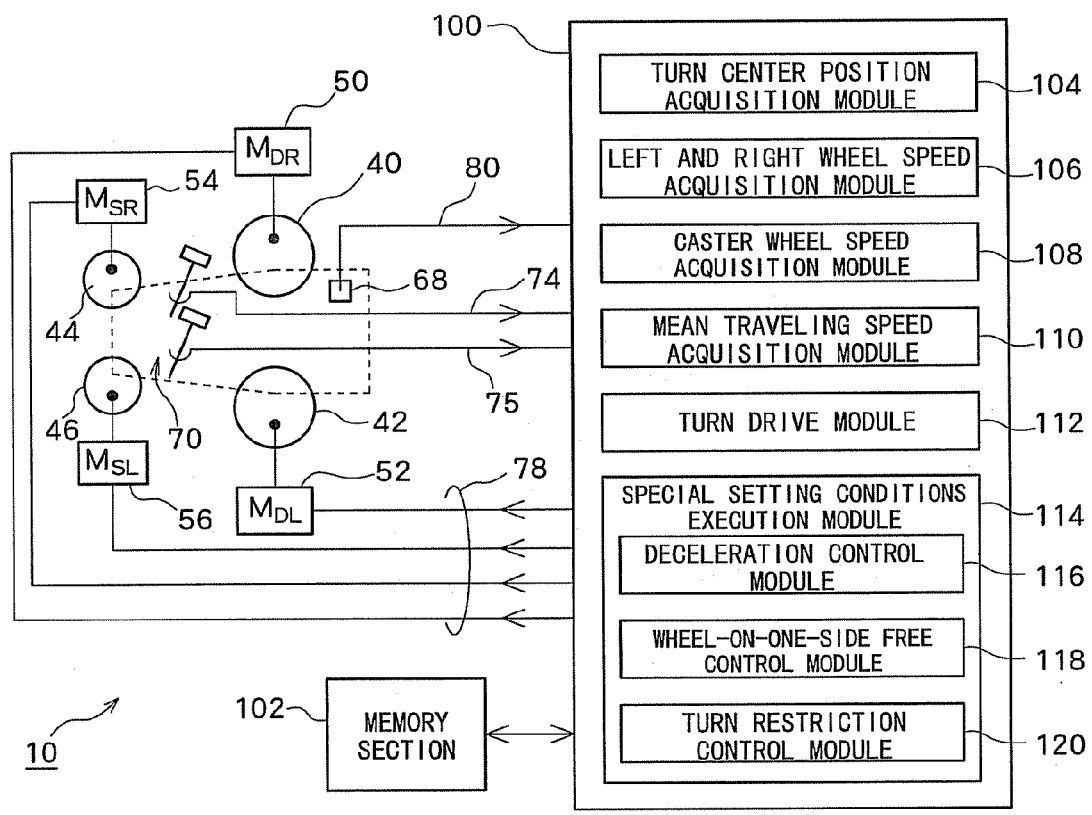
FIG. 8 is a block diagram of a portion relating to a turn function in a two lever-type operator according to the first embodiment of the present invention.

FIG. 8 is a block diagram regarding a portion relating to a turn function in a case in which the riding lawnmower 10 comprises a two lever-type operator. In this connection, the example section will be described again with respect to a case in which the riding lawnmower comprises a steering operator. Hereunder, the same reference numerals are assigned to components that are the same as components described in FIG. 1 to FIG. 3 and a detailed description thereof will not be repeated. In the following description the reference numerals shown in FIG. 1 to FIG. 3 are used. The portion corresponding to the controllers 28, 29, and 30 in FIG. 3 is represented as a control section 100 in FIG. 8. In the control section 100, the turn drive module 112 corresponds to controllers 28 and 29 including a driver circuit portion for each electric rotary machine, and the other portions and a memory section 102 connected to the control section 100 correspond to the controller 30 including the control logic circuit portion.

As shown in FIG. 8, respective electric-motor axle rotating machines ($M_{DR}$, $M_{DL}$) 50 and 52 are connected to the wheels 40 and 42, and respective steering control wheel electric rotary machines ($M_{SR}$, $M_{SL}$) 54 and 56 are connected to the caster wheels 44 and 46. Operation amount signals 74 and 75 of the left and right wheel axle control levers are transmitted to the control section 100 from the two lever-type operator 70. Respective drive signals 78 are transmitted from the control section 100 to the electric-motor axle rotating machines 50 and 52 and the steering control wheel electric rotary machines 54 and 56.

The control section 100 has, in particular, a function that causes the wheels 40 and 42 and the caster wheels 44 and 46 to turn around a turn center position corresponding to a turn instruction of the two lever-type operator 70 by generating drive signals 78 with respect to the electric-motor axle rotating machines 50 and 52 and the steering control wheel electric rotary machines 54 and 56 based on operation amount signals 74 and 75 of the left and right wheel axle control levers.

The control section 100 includes a left and right wheel speed acquisition module 106 that acquires a turn instruction input that corresponds to the operation amount of the two lever-type operator 70 to acquire left and right wheel speed instructions based on those instruction contents, a turn center position acquisition module 104 that determines and acquires a turn center position based on the acquired left and right wheel speeds, a caster wheel speed acquisition module 108 that determines and acquires caster wheel speeds based on the turn center position and the left and right wheel speeds, a mean traveling speed acquisition module 110 that determines and acquires a mean traveling speed based on the left and right wheel speeds, and a turn drive module 112 that generates control signals for each electric rotary machine based on the left and right wheel speeds and the caster wheel speeds and causes the wheels 40 and 42 and the caster wheels 44 and 46 to turn around a turn center position.

As described above, because the control section 100 is one part of the controllers 28, 29, and 30, it can be configured by a plurality of circuit blocks, and in particular portions other than the driver portion of the turn drive module 112 can be configured with a computer for vehicle use. Each of the above described functions can be implemented with software. More specifically, each function can be implemented by executing a lawnmower vehicle control program. Naturally, it is also possible to realize a portion of the above described functions with hardware.

A lawnmower vehicle control program is stored in the memory section 102 connected to the control section 100. In particular, maps or formulas or the like showing the relationship between left and right wheel speeds and turn center positions or maps or formulas or the like showing the relationship between left and right wheel speeds, turn center positions, and caster wheel speeds are stored therein. For example, at the above described turn center position acquisition module 104, a turn center position can be determined and acquired by reading out maps or formulas or the like showing the relation between left and right wheel speeds and turn center positions from the memory section 102, and inputting the left and right wheel speeds into the formulas or maps or the like that are read out to output a turn center position. Likewise, at the caster wheel speed acquisition module 108, caster wheel speeds can also be determined and acquired by reading out maps or formulas or the like showing the relation between left and right wheel speeds, turn center positions, and caster wheel speeds from the memory section 102, and inputting the left and right wheel speeds and the turn center position into the formulas or maps or the like that are read out to output the caster wheel speeds.

Details regarding the special setting conditions execution module 114 shown in FIG. 8 and details of the slope sensor 68 and a detection signal for the slope-to-horizontal plane angle thereof and the like are described in a different example section.

The action of the above described configuration, particularly each function of the control section 100, will be described in detail below. However, first linear traveling and turn traveling will be explained using FIG. 9, FIG. 10*a*, FIG. 10*b*, and FIG. 10*c*. The reference numerals used in FIG. 1 to FIG. 8 are used for the following description. In these drawings, a state with respect to a top view of the wheels 40 and 42 and the caster wheels 44 and 46 of the riding lawnmower 10 is schematically shown. In this case, the wheels 40 and 42 and the caster wheels 44 and 46 are each independently driven to travel.

Figure 9:
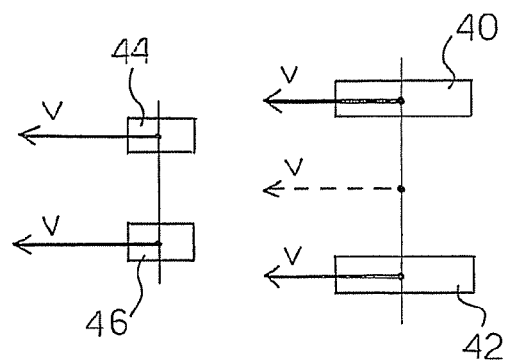
FIG. 9 is a view illustrating a linear traveling according to the first embodiment of the present invention.

FIG. 9 is a view illustrating an example of linear traveling in which all of the wheels 40 and 42 and the caster wheels 44 and 46 travel in the same direction at the same speed. In this case, the term "same speed" refers to ground speed, and, due to a difference between the diameter of the wheels 40 and 42 and the diameter of the caster wheels 44 and 46, even if the wheels 40 and 42 and the caster wheels 44 and 46 travel at the same speed the rotational speed of the wheels 40 and 42 and the rotational speed of the caster wheels 44 and 46 differ.

Figure 10A:
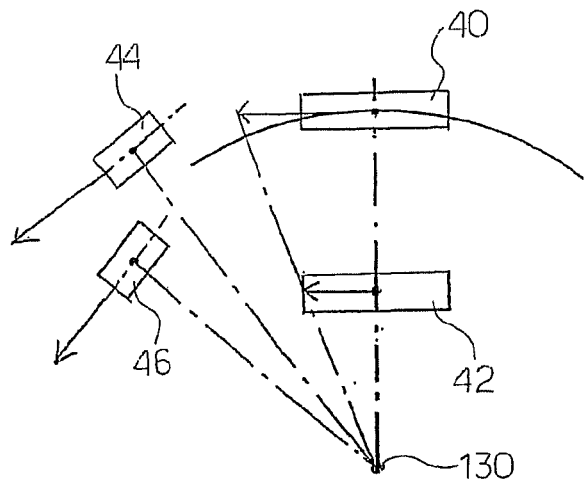
FIG. 10a is a view illustrating an example wherein a turn center position is outside the wheels on an extension in the axle direction of the wheels in a case of turn traveling according to the first embodiment of the present invention.
Figure 10B:
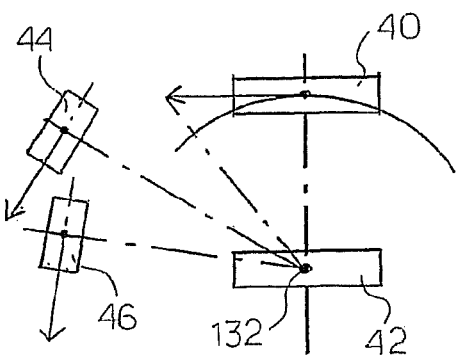
FIG. 10b is a view illustrating an example in which a turn center position is at a ground-contact position of either one of the wheels during turning, according to the first embodiment of the present invention.
Figure 10C:
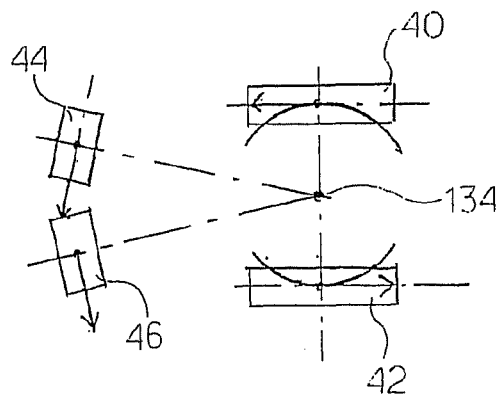
FIG. 10c is a view illustrating an example wherein a turn center position is on the axle of the wheels at exactly the intermediate position between both wheels during turning, according to the first embodiment of the present invention.

FIG. 10*a*, FIG. 10*b*, and FIG. 10*c* illustrate an example related to turning. FIG. 10*a* is a view illustrating an example wherein a turn center position 130 is on the outside of the wheels 40 and 42 on an extension in the axle direction of the wheels 40 and 42. FIG. 10*b* is a view illustrating an example wherein a turn center position 132 is at a ground-contact position of either one of the wheels 40 and 42. A turn that is performed by taking a ground-contact position of a wheel on one side as a center in which manner is called a "pivot turn". FIG. 10*c* is a view illustrating an example wherein a turn center position 134 is exactly at an intermediate position between the two wheels 40 and 42 on the axle of these wheels, and, although the absolute values for the speeds of the wheels 40 and 42 are the same, the speed direction of the wheel 40 on one side and the speed direction of the wheel 42 on the other side are opposite directions to each other. In this case, the riding lawnmower 10 turns by employing the turn center position 134 as the center. This kind of turn is referred to as a "stationary turn" or a "spin turn".

FIG. 10*a*, FIG. 10*b*, and FIG. 10*c* illustrate typical examples of turning, and there are also cases wherein a turn is executed between these typical cases. For example, there are cases in which, although the turn center position is on the axle of the wheels 40 and 42 and on the inside of the wheels 40 and 42, the turn center position is not at the intermediate position between the wheels 40 and 42, but instead is positioned closer to the side of one of the wheels. In any of these cases, the wheels 40 and 42 and the caster wheels 44 and 46 turn around the turn center position without changing the planar disposition relationship in the riding lawnmower 10.

Accordingly, in a four-wheel drive case, it is necessary to control the speed of the wheels 40 and 42 and the speed of the caster wheels 44 and 46 so as to satisfy the speed relationship that is decided by the planar disposition relationship in the riding lawnmower 10. When suitable speed control is not performed, for example, in some cases the mean traveling speed of the wheels 40 and 42 and the mean traveling speeds of the caster wheels 44 and 46 will differ, the turn center position will deviate, and it will not be possible to adequately perform a desired turn. Alternatively, there is a risk that the caster wheels 44 and 46 will slip with respect to the ground surface and damage the planting condition of the lawn or damage the state of the ground surface.

Figure 11:
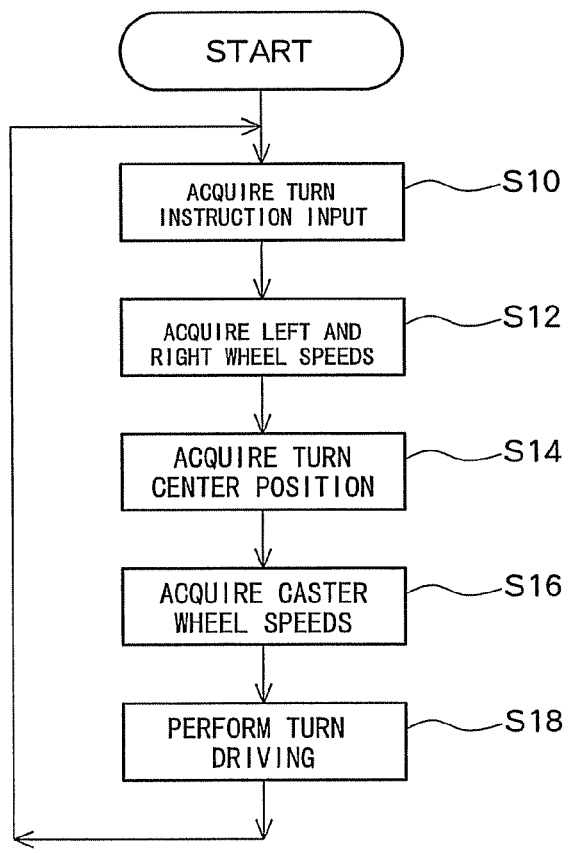
FIG. 11 is a flowchart illustrating turn control according to the first embodiment of the present invention.

Next, the action of the configuration illustrated in FIG. 8 will be described using the flowchart shown in FIG. 11. The flowchart shown in FIG. 11 illustrates turn control that coordinately controls the speeds of the left and right wheels that are the main drive wheels and the speeds of the caster wheels that are the steering control wheels at the time of a turn by a riding lawnmower in which the caster wheels that are the steering control wheels are driven to travel. In the flowchart shown in FIG. 11, each procedure corresponds to respective processing procedures for turn control processing in the lawnmower vehicle control program. The reference numerals from FIG. 1 to FIG. 10*a*, FIG. 10*b*, and FIG. 10*c* are used for the following description.

The lawnmower vehicle control program starts up when operation of the riding lawnmower 10 starts. Thereafter, when the two lever-type operator 70 is actually operated, that turn instruction input is acquired (S10). More specifically, operation amount signals 74 and 75 of the two lever-type operator 70 are transmitted as turn instruction input signals to the control section 100.

The control section 100 acquires these operation amount signals 74 and 75 and determines and acquires the left and right wheel speeds indicated by the operation of the two lever-type operator 70 from that signal data (S12). This function is executed by the left and right wheel speed acquisition module 106 of the control section 100. As described above with reference to FIG. 3, the operation amount signals 74 and 75 indicate the operation amounts of the left and right control levers, and a speed instruction for the left wheel 42 is provided using the operation amount of the left control lever and a speed instruction for the right wheel 40 is provided using the operation amount of the right control lever. Accordingly, because the correlation between the speeds of the left and right wheels 40 and 42 and the size of the operation amount signals 74 and 75 is predetermined for the two lever-type operator 70 of the riding lawnmower 10, the instructed speeds for the left and right wheels 40 and 42 can be determined and acquired by applying this correlation to the size of the operation amount signals 74 and 75 that are acquired at S10.

Preferably, the correlation between the speeds of the left and right wheels 40 and 42 and the size of the operation amount signals 74 and 75 is pre-stored in the memory section 102 as a formula, a map, or the like. In such cases, when a formula is read out and an operation amount is input, the left and right wheel speeds are determined by calculation, while, in a case of reading out a map or the like and applying the operation amount to the map or the like, the left and right wheel speeds are acquired by processing, such as reading out the correlation, without depending on calculations.

Next, the turn center position indicated by the operation of the two lever-type operator 70 is determined and acquired based on the left and right wheel speeds (S14). This function is executed by the turn center position acquisition module 104 of the control section 100.

Figures 12A, 12B:
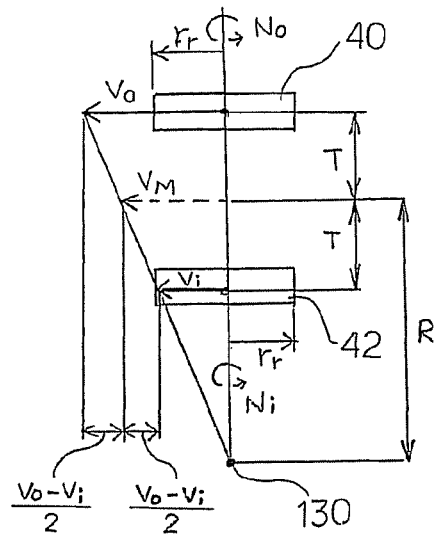
FIG. 12a is a view that illustrating a turn center position determination when left and right wheel speeds are given, according to the first embodiment of the present invention.
FIG. 12b is a view that describes the manner in which a turn center position is determined when left and right wheel speeds are given, according to the first embodiment of the present invention.

FIG. 12*a* and FIG. 12*b* are views describing a situation in which a turn center position is determined when left and right wheel speeds are provided. This situation is described hereunder using the reference numerals shown in FIG. 8. FIG. 12*a* is a view that corresponds to FIG. 10*a* that shows the disposition of the wheel 40 and the wheel 42 and the turn center position 130 that is to be determined. In this case, the wheel 40 is shown as the outside wheel with respect to the turning motion and the ground speed thereof is indicated as $V_o$, while the wheel 42 is shown as the inside wheel and the ground speed thereof is indicated as $V_i$. Further, a ground speed $V_M$ at exactly an intermediate position between the wheel 40 and the wheel 42 on the axle of the wheel 40 and the wheel 42 corresponds to the mean traveling speed, and is given by $V_M=(V_o+V_i)/2$. Here, although a function that determines and acquires the mean traveling speed is executed by the turn center position acquisition module 104, because there are cases in which only this portion in particular is extracted and utilized, in FIG. 8 the mean traveling speed acquisition module 110 is illustrated as one function of the control section 100.

Further, a main drive wheel tread that is the space between the wheels 40 and 42 is denoted as 2T, and the radius of the wheels 40 and 42 is denoted as $r_r$. Accordingly, a rotational speed $N_o$ around the axis of the wheel 40 is given by $V_o/r_r$, and a rotational speed $N_i$ around the axle of the wheel 42 is given by $V_i/r_r$.

FIG. 12b is a view showing the calculation process that determines the turn center position 130 using the above described symbols. In this case, the turn center position 130 is represented by a distance R from exactly an intermediate position between the wheel 40 and the wheel 42 on the axle of the wheel 40 and wheel 42. As shown in FIG. 12b, the turn center position can be represented by $R=T\times\{(N_o+N_i)/(N_o-N_i)\}$. Accordingly, if T is decided based on the configuration of the riding lawnmower 10, the turn center position R can be determined based on the rotational speeds $N_o$ and $N_i$ corresponding to the speeds $V_o$ and $V_i$ of the wheels 40 and 42.

Returning again to FIG. 11, next the speeds of the caster wheels are determined and acquired based on the left and right wheel speeds and the turn center position (S16). This function is executed by the caster wheel speed acquisition module 108 of the control section 100.

FIG. 13a, FIG. 13b, and FIG. 14 are views illustrating a situation in which speeds of caster wheels are determined using the turn center position R that is determined in FIG. 12a and FIG. 12b. The reference numerals used in FIG. 8, FIG. 12a, and FIG. 12b are also used in the following description. FIG. 13a is a view that corresponds to FIG. 10a and FIG. 12a, which shows the disposition of the wheels 40 and 42, the disposition of the caster wheels 44 and 46, and the turn center position 130. In this case, with respect to the speeds of the caster wheels 44 and 46 that are to be determined, a ground speed of the caster wheel 44 that is on the outer side when viewed from the turn center position 130 is denoted by $V_{Fo}$, and the ground speed of the caster wheel 46 on the inner side is denoted by $V_{Fi}$.

Further, a caster wheel tread that is the space between the caster wheels 44 and 46 is denoted as 2t, a wheel base length that is the distance between the intermediate position of the wheels 40 and 42 and the intermediate position of the caster wheels 44 and 46 is denoted as W, and the radius of the caster wheels 44 and 46 is denoted as $r_f$. Accordingly, a rotational speed $N_{Fo}$ around the axle of the caster wheel 44 is given by $V_{Fo}/r_f$ and a rotational speed $N_{Fi}$ around the axle of the caster wheel 46 is given by $V_{Fi}/r_f$.

In this connection, the caster wheels 44 and 46 are in a state in which they are freely rotatable around the steering axis, and the state is one in which the steering angle is decided in correspondence with traveling of the wheels 40 and 42. More specifically, the axle direction of the respective caster wheels 44 and 46 is the direction of a straight line joining the ground-contact position of each of the caster wheels 44 and 46 with the turn center position 130. Accordingly, angles between these straight line directions and the axle directions of the wheels 40 and 42 are the steering angles of the caster wheels 44 and 46, respectively, and in FIG. 13a these angles are denoted as $\theta_o$ and $\theta_i$, respectively. Further, the distances between the ground-contact positions of the respective caster wheels 44 and 46 and the turn center position 130 are denoted as $R_o$ and $R_i$, respectively.

FIG. 13b is a view illustrating a calculation process that determines the steering angles $\theta_o$ and $\theta_i$ of the respective caster wheels 44 and 46 using the above described symbols. In this case, $R_o$ and $R_i$ that correspond to the turn center positions of the respective caster wheels 44 and 46 are determined based on R that is determined as described in FIG. 12, the wheel base length W, and the t that is ½ of the caster wheel tread, and FIG. 13B illustrates the method of determining the steering angles $\theta_o$ and $\theta_i$ based on the relationship of these values and R. In this case, $R_o$ and $R_i$ are given by the distance between the turn center position 130 and the ground-contact position of the respective caster wheel.

FIG. 14 is a view illustrating the process for determining the speeds $V_{Fo}$ and $V_{Fi}$ of the caster wheels 44 and 46 that correspond to the mean traveling speed $V_M$ of the wheels 40 and 42. Because each component of the riding lawnmower 10 turns at the same angular speed around the turn center position 130, the ground speeds differ in proportion to the distance from the turn center position 130. Accordingly, the ratio between the speed $V_{Fo}$ of the caster wheel 44 and the mean traveling speed $V_M$ of the wheels 40 and 42 is the ratio between the distance $R_o$ from the turn center position 130 to the ground-contact position of the caster wheel 44 and the distance R from the turn center position 130 to the intermediate position between the wheels 40 and 42. Because R can be determined based on FIG. 12a and FIG. 12b and $R_o$ can be determined with FIG. 13b, the speed $V_{Fo}$ of the caster wheel 44 and a number of revolutions per unit time $N_{Fo}$ corresponding thereto can be determined as shown in FIG. 14.

In FIG. 14, because R which indicates the turn center position 130 is rewritten with the numbers of revolutions per unit time $N_o$ and $N_i$ of the left and right wheels, ultimately the number of revolutions per unit time $N_{Fo}$ of the caster wheel 44 can be determined based on the numbers of revolutions per unit time $N_o$ and $N_i$ of the left and right wheels and the wheel base length W, the main drive wheel tread 2T, the caster wheel tread 2t, the main drive wheel radius $r_r$, and the caster wheel radius $r_f$ that are decided by the configuration of the riding lawnmower 10. Likewise, the rotational speed $N_{Fi}$ of the caster wheel 46 can be determined based on the number of revolutions per unit time (rotational speeds) $N_o$ and $N_i$ of the left and right wheels and W, T, t, $r_r$, and $r_f$ that are decided by the configuration of the riding lawnmower 10.

As described using FIG. 12a and FIG. 12b to FIG. 14, if the speeds or number of revolutions of the left and right wheels are provided, the turn center position R and the speeds or number of revolutions of the caster wheels can be determined using W, T, t, $r_r$, and $r_f$, which are in turn determined by the configuration of the riding lawnmower 10. Accordingly, by storing W, T, t, $r_r$, and $r_f$, which are already known and the formulas described using FIG. 12a and FIG. 12b to FIG. 14 in the memory section 102 and then applying the rotational speed of the left and right wheels, the above described turn center position acquisition process of S14 and caster wheel speed acquisition process of S16 can be easily executed.

FIG. 15 to FIG. 18 are views that illustrate a situation in which, actually, W, T, t, $r_r$, and $r_f$ that are decided by the configuration of the riding lawnmower 10 are provided and the rotational speeds $N_o$ and $N_i$ are input to determine the turn center position R and the number of caster wheel revolutions $N_{Fo}$ and $N_{Fi}$. FIG. 15 is a view showing examples of W, T, t, $r_r$, and $r_f$ that are determined by the configuration of the riding lawnmower 10. FIG. 16 is a view showing results obtained for a difference in the number of revolutions per unit time Δ, the turn center position R, and the number of caster wheel revolutions $N_{Fo}$ and $N_{Fi}$ with changing the rotational speeds $N_o$ and $N_i$ using the values shown in FIG. 15 and the formulas described in FIG. 12a and FIG. 12b to FIG. 14 when the mean rotational speed $N_M$ corresponding to the mean traveling speed $V_M$ is taken as 100 rpm.

Figure 17:
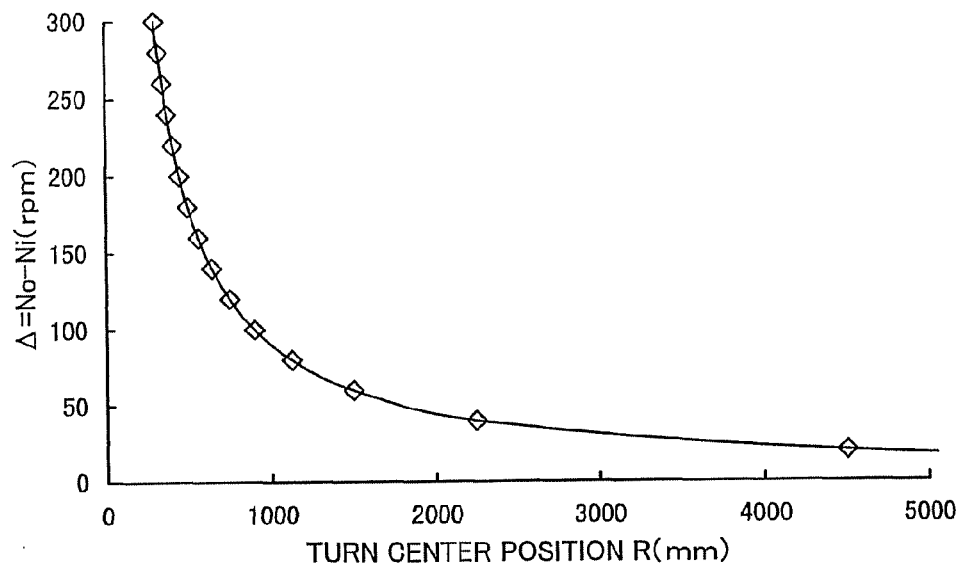
FIG. 17 is a view illustrating a state when the relationship between differences in number of revolutions and the turn center position is mapped based on the results shown in FIG. 16.
Figure 18:
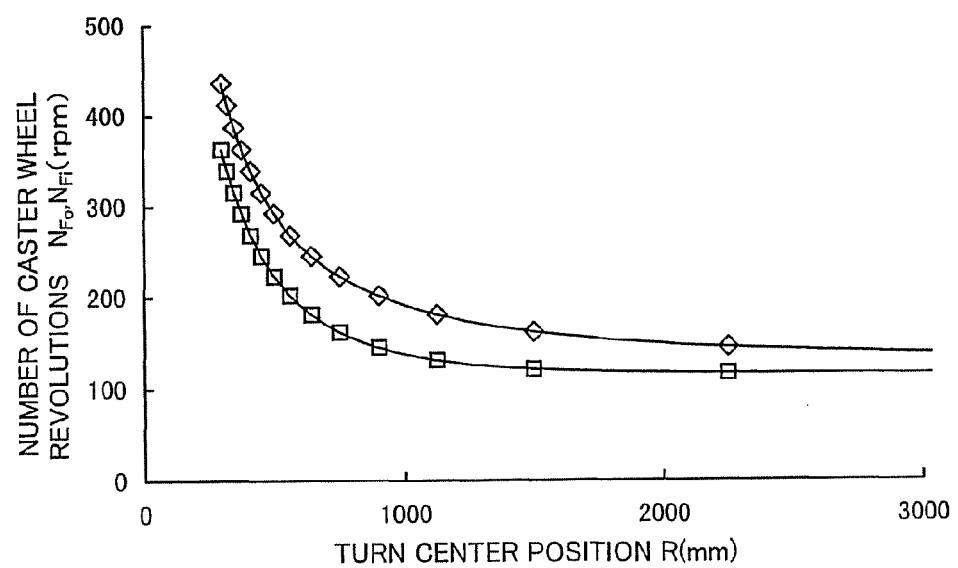
FIG. 18 is a view showing the state when the relationship between the turn center position and the number of caster wheel revolutions is mapped based on the results shown in FIG. 16.

FIG. 17 and FIG. 18 are graphs that map the results shown in FIG. 16. FIG. 17 is a view showing a map for determining the turn center position R when the difference in the number of revolutions Δ is provided. FIG. 18 is a view showing a map that determines the number of caster wheel revolutions per unit time $N_{Fo}$ and $N_{Fi}$ when the turn center position R is provided. Maps showing various other correlations can be created in addition to these maps. For example, maps of the correlation between the wheel rotational speeds $N_o$ and $N_i$ and the turn center position R, between the wheel rotational speeds $N_o$ and $N_i$ and the number of caster wheel revolutions $N_{Fo}$ and $N_{Fi}$, and between the number of wheel revolutions $N_o$ and $N_i$ and the mean number of revolutions (average rotational speed) $N_M$ can be created.

Other than the formulas in FIG. 12A and FIG. 12B to FIG. 14 as described above, in place of these formulas correlation tables as shown in FIG. 16, correlation maps as shown in FIG. 17 and FIG. 18 and other correlation maps and the like can be stored in the memory section 102. For example, although FIG. 16 to FIG. 18 represent a correlation table and a group of maps for a case in which the mean number of revolutions $N_M$ is taken as 100 rpm, the mean number of revolutions $N_M$ may be taken as a parameter and correlation tables and a group of maps relating to turn center positions and the number of caster wheel revolutions for each value can be previously created and stored in the memory section 102. In this case, without performing a calculation using the formulas described with FIG. 12 to FIG. 14, the required correlation table or group of correlation maps can be read out from the memory section 102 and the rotational speeds of the left and right wheels or the like can be applied to easily acquire the turn center position and number of caster wheel revolutions or the like.

Data for formulas, correlation tables, and correlation maps and the like relating to turn center positions and number of caster wheel revolutions and the like is stored in the memory section 102 using a hierarchical structure. As an example of the hierarchical structure, geometrical dimensions relating to the wheels and caster wheels such as W, T, t, $r_r$, and $r_f$ are stored on the first layer, using the model of the riding lawnmower as a retrieval key. On the second layer, data relating to operation amounts of the operator and parameters in the third layer are stored, using the type of operator as a retrieval key. On the third layer, formulas, correlation tables, correlation maps and the like that are associated with retrieval keys are stored, using as a retrieval key the turn center position R, the caster wheel speeds $V_{Fo}$ and $V_{Fi}$, or the number of caster wheel revolutions $N_{Fo}$ and $N_{Fi}$, $R_o$ and $R_i$ corresponding to turn center positions of the caster wheels, the caster wheel steering angles $\theta_o$ and $\theta_i$, the wheel speeds $V_o$ and $V_i$ or the number of wheel revolutions $N_o$ and $N_i$, or the mean traveling speed $V_M$ or the mean number of revolutions $N_M$.

For example, first "XXX" is input as the riding lawnmower model, next "two-lever type" is input as the type of operator, and then, when "turn center position" is subsequently input, a formula is output that relates to two-lever type turn center positions in which the actual values for W, T, t, $r_r$, and $r_f$ or the like of model "XXX" are applied. A calculation condition such as wheel speed can be input into the formula that is output, and, by performing such input, a turn center position can be calculated under that calculation condition and the result can be output.

In the above described example, a hierarchical structure can also be adopted that enables selection of "formula, correlation table, correlation map" after input of "turn center position". For example, by inputting "correlation table" and thereafter inputting "mean wheel speed=YYY", a correlation table for turn center positions relating to mean wheel speed=YYY is output. Input of a calculation condition such as wheel speed is also possible with respect to the correlation table that is output, and by performing such inputs the turn center positions under that calculation condition can be calculated and the result output.

Referring again to FIG. 11, next, driving of the electric-motor axle rotating machines and the steering control wheel electric rotary machines is controlled based on the wheel speeds and the caster wheel speeds or the number of wheel revolutions $N_o$ and $N_i$ and the number of caster wheel revolutions $N_{Fo}$ and $N_{Fi}$ to perform turn driving of the riding lawnmower (S18). This function is executed by the turn drive module 112 of the control section 100. More specifically, the wheel speeds or the number of wheel revolutions $N_o$ and $N_i$ that are acquired at S12 are independently applied to the electric-motor axle rotating machines 50 and 52, respectively, and the caster wheel speeds or number of caster wheel revolutions $N_{Fo}$ and $N_{Fi}$ that are acquired at S16 are independently applied to the steering control wheel electric rotary machines 54 and 56, respectively. As a result, the wheels 40 and 42 and the caster wheels 44 and 46 are independently caused to rotate around their own axle while respectively associating the wheels 40 and 42 and the caster wheels 44 and 46, to cause the riding lawnmower 10 to turn around the turn center position while traveling. At this time, as described above, because the riding lawnmower 10 has a mean traveling speed corresponding to the mean value of the respective speeds of the left and right wheels, the riding lawnmower 10 turns while traveling at the mean traveling speed.

As can be understood from the descriptions of FIG. 13a, FIG. 13b, and FIG. 14, the number of caster wheel revolutions $N_{Fo}$ and $N_{Fi}$ that are determined here are the number of revolutions that the caster wheels rotate depending on the geometrical dimensions of the riding lawnmower when the steering angle is decided in accordance with the traveling state of the main drive wheels with the caster wheels in a freely rotating state around the steering axis. That is, they are the number of revolutions that the caster wheels rotate when traveling and turning is performed by the main drive wheels in a state in which a driving source is not connected to the caster wheels. At this time, because the rotation of the caster wheels around the axles conforms to the geometrical dimensions of the riding lawnmower and the caster wheels therefore do not rotate under any undue stress or strain, the turn is executed as desired without excessive damage to the lawn or the like. However, in this case, because the traveling and turning of the riding lawnmower is performed with only the main drive wheels, there are cases in which the torque is insufficient under conditions such as a sloping surface.

With the riding lawnmower 10 having the configuration shown in FIG. 8, a driving force can be applied to the caster wheels 44 and 46 by the steering control wheel electric rotary machines 54 and 56 while maintaining this condition of the number of revolutions of the caster wheels. Accordingly, the torque can be increased for the riding lawnmower 10 overall, and because the caster wheels do not rotate under any kind of undue stress or strain, the turn is executed as desired and there is little damage to the planting condition of a lawn or the like.

Thus, by applying a driving force to the caster wheels 44 and 46 while observing the conditions as shown in FIG. 16, a suitable turn can be executed while increasing the torque for the riding lawnmower 10 overall.

Although the above-described procedures for determining the number of caster wheel revolutions in a case in which the turn center position is on the outside of the wheels 40 and 42, i.e. the case illustrated in FIG. 10a, for the case of the pivot turn illustrated in FIG. 10b and the case of the stationary turn illustrated in FIG. 10c, similarly to the case described using FIG. 12a and FIG. 12b to FIG. 14, the number of caster wheel revolutions can be determined based on the vehicle speed and the turn center position using the geometrical dimensions of the riding lawnmower.

In the case of a pivot turn, i.e. in a case in which, with respect to the left and right wheel speeds, the speed of a wheel on one side is zero, the ground-contact position of that wheel on one side is taken as the turn center position and the wheel on the other side and the caster wheels are made to turn around that turn center position.

Further, in the case of a stationary turn, i.e. in a case in which, with respect to the left and right wheel speeds, the wheel speed on one side and the wheel speed on the other side are in opposing directions, a position between the left and right wheels is taken as the turn center position and the left and right wheels and the caster wheels are made to turn around that turn center position.

Further, although in the foregoing description a four-wheel drive riding lawnmower having two main drive wheels and two caster wheels is described, even in a case of a three-wheel drive riding lawnmower having one caster wheel, similarly to the case described using FIG. 12a and FIG. 12b to FIG. 14, the number of caster wheel revolutions can be determined based on the vehicle speed and the turn center position using the geometrical dimensions of the riding lawnmower. Likewise, in a case in which the number of main drive wheels is other than two or a case in which the number of caster wheels is other than one or two, the number of caster wheel revolutions can be determined based on the vehicle speed and the turn center position using the geometrical dimensions of the riding lawnmower.

Furthermore, although in the foregoing description a driving force is applied to the caster wheels by a steering control wheel electric rotary machine, a configuration may also be adopted that employs two-wheel driving when sufficient traveling is possible with only the main drive wheels and that performs driving with the caster wheel when the torque is insufficient. In order to determine the risk of insufficient torque, as shown in FIG. 8, a configuration can be adopted in which a slope sensor 68 is provided in the riding lawnmower 10 to transmit a slope-to-horizontal plane angle signal 80 to the control section 100, and the control section 100 can determine whether or not the slope-to-horizontal plane angle exceeds a predetermined threshold slope angle. More specifically, when it is determined that the slope-to-horizontal plane angle exceeds a threshold slope angle, driving by the caster wheels is performed, and when it is determined that the slope-to-horizontal plane angle does not exceed a threshold slope angle only driving by the main drive wheels can be performed.

When adopting a configuration in which a driving force is always applied to the caster wheels, the driving force of the main drive wheels can be reduced by that amount, to thereby enable a small electric rotary machine to be arranged and used for the riding lawnmower overall. In contrast, when a configuration is adopted in which driving by caster wheels is only used when necessary, the electric power consumption of the riding lawnmower can be suppressed at times when torque is not particularly necessary, for example, when traveling over a flat surface.

Further, although the caster wheels are described as being in a freely rotating state around the steering axis in the foregoing description, as described in relation to FIG. 4 to FIG. 7, a configuration may be adopted in which it is possible to achieve a desired steering angle by forcefully rotating the caster wheels around the steering axis using a steering actuator. For example, depending on the state of the ground surface, there are times a caster wheel faces in an unanticipated direction, and, when that situation is left unchanged, a situation may arise in which desired traveling or turning or the like can not be performed. Therefore, a sensor or the like that detects a steering angle is provided on the caster wheel to monitor the steering angle, and when the actual steering angle, for example, deviates from a calculated steering angle that is determined with FIG. 13b or FIG. 16 to the extent that it exceeds a permissible range, control can be performed to return the actual steering angle to the calculated steering angle using the steering actuator. As a result, traveling and turning that conform to the actual ground surface state can be ensured.

EXAMPLE 3

Figure 19:
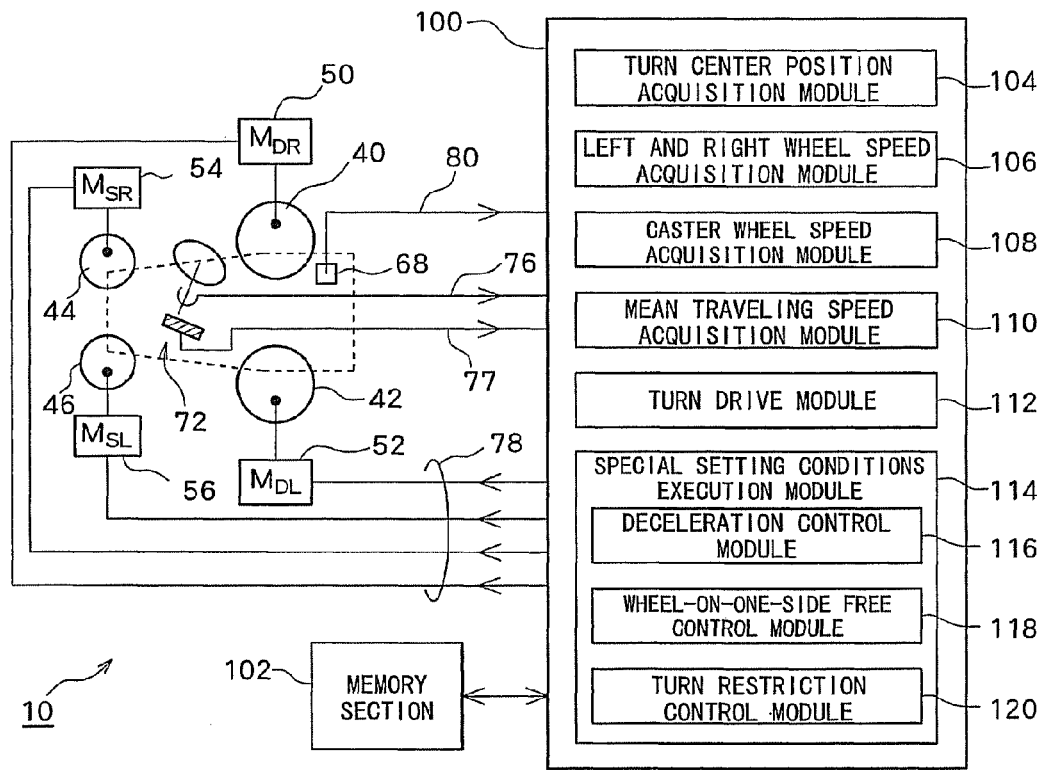
FIG. 19 is a block diagram of a riding lawnmower comprising a steering operator according to the first embodiment of the present invention.
Figure 20:
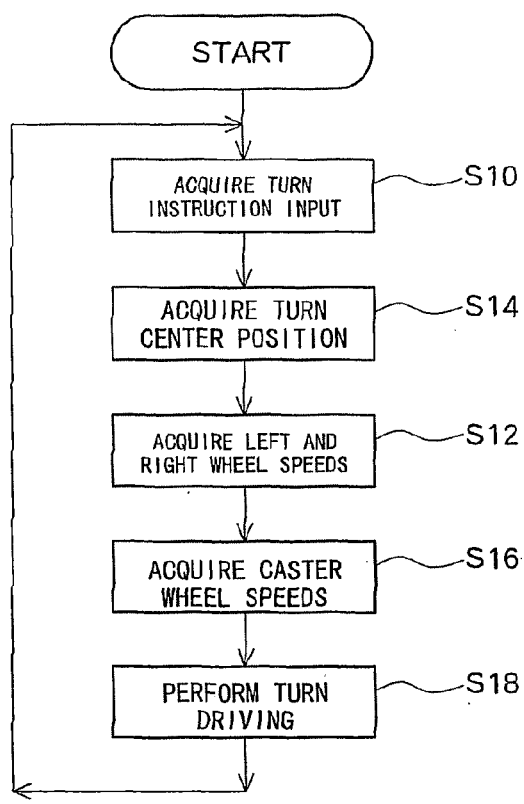
FIG. 20 is a flowchart illustrating the procedures of turn control for the configuration shown in FIG. 19.

FIG. 19 and FIG. 20 are views showing a block diagram and a flowchart relating to a riding lawnmower 10 comprising a steering operator that correspond to FIG. 8 and FIG. 11. The differences between FIG. 8 and FIG. 19 are as follows. Specifically, the configuration shown in FIG. 8 comprises the two lever-type operator 70 and operation amount signals 74 and 75 of the left and right wheel axle control levers are transmitted to the control section 100. In contrast, the configuration shown in FIG. 19 comprises a steering operator 72 and an operation amount signal 76 regarding a steering wheel position and an operation amount signal 77 regarding a depression amount of an accelerator pedal are transmitted to the control section 100. Although the other components are shown as identical components, in conjunction with the difference between the two lever-type operator 70 and the steering operator 72, the details of the turn center position acquisition module 104 and the details of the left and right wheel speed acquisition module 106 differ to some extend. With respect to FIG. 11 and FIG. 20 also, although the details of the overall procedures are the same, the order of the turn center position acquisition process and the left and right wheel speed acquisition process is different.

The actions of the configuration shown in FIG. 19 are now described hereunder in accordance with the procedures shown in FIG. 20 centering mainly on the differences with the case comprising the two lever-type operator 70.

The lawnmower vehicle control program begins when operation of the riding lawnmower 10 comprising the steering operator 72 starts. Thereafter, whenever the steering operator 72 is actually operated, that turn instruction input is acquired (S10). More specifically, operation amount signals 76 and 77 of the steering operator 72 are transmitted as turn instruction input signals to the control section 100. As described with FIG. 3, the operation amount signals 76 and 77 are an operation amount signal 76 regarding an operation amount of the steering wheel, i.e., a steering position, and an operation amount signal 77 regarding a depression amount of an accelerator pedal.

As described in connection with the example shown in FIG. 3, when the steering position is clockwise of center, this represents an instruction to make the number of revolutions per unit time of the left wheel greater than the number of revolutions per unit time of the right wheel, and, as the position of the steering wheel moves further away from the middle position, it represents an instruction to increase the difference between the rotational speed of the left wheel and the rotational speed of the right wheel. Conversely, as the position of the steering wheel moves closer to the middle position, it represents an instruction to decrease the difference between the rotational speed of the left wheel and the rotational speed of the right wheel. Further, depression of the accelerator pedal represents an instruction to increase the traveling speed, wherein the greater the depression amount is, the higher the traveling speed that is instructed, and the smaller the depression amount is, the lower the traveling speed that is instructed. Accordingly, the mean traveling speed is indicated by the operation amount signal 77 for the accelerator pedal depression amount, and a speed difference between the left and right wheels corresponding to the turn center position is indicated by the operation amount signal 76 for the steering position. In this connection, it is desirable that the correlation between the size of the operation amount signal 77 for the accelerator pedal depression amount and the mean traveling speed, and the correlation between the size of the operation amount signal 76 for the steering position and the speed difference between the left and right wheels be predetermined and that, for example, the correlation data be stored in the memory section 102.

Thus, in the riding lawnmower 10 comprising the steering operator 72, the mean traveling speed, and the speed difference between the left and right wheels are acquired as turn instruction inputs at S10. In this connection, in the riding lawnmower 10 comprising the two lever-type operator 70, as described with reference to FIG. 11, the respective speeds of the left and right wheels are acquired as turn instruction inputs.

Next, based on the acquired input turn instructions, a turn center position is determined and acquired (S14), and the left and right wheel speeds are determined and acquired (S12). This function is executed by the turn center position acquisition module 104 and the left and right wheel speed acquisition module 106 of the control section 100. More specifically, for the formulas described with FIG. 12a and FIG. 12b to FIG. 14, the mean number of revolutions $N_M=(N_o+N_i)/2$ corresponding to the mean traveling speed $V_M$ is applied and the difference in number of revolutions $\Delta=(N_o-N_i)$ corresponding to the speed difference is applied to determine the turn center position R and determine the number of revolutions $N_o$ and $N_i$ corresponding to the respective speeds of the left and right wheels. The turn center position R and the respective number of revolutions per unit time $N_o$ and $N_i$ corresponding to the left and right wheels may also be acquired without using a formula by, for example, creating in advance a correlation table as shown in FIG. 16 for each mean traveling speed and storing the correlation tables in the memory section 102, and reading out the relevant correlation table and applying the mean number of revolutions $N_M$ corresponding to the mean traveling speed $V_M$.

In this manner, a turn center position and left and right wheel speeds are determined and acquired based on a mean traveling speed and a speed difference between left and right wheels in the riding lawnmower 10 comprising the steering operator 72. In this connection, in the riding lawnmower 10 comprising the two lever-type operator 70, as shown in FIG. 11, the respective speeds of the left and right wheels are acquired as turn instruction inputs and the turn center position is determined and acquired based on those speeds.

As described above, because the turn instruction inputs differ between the riding lawnmower 10 comprising the steering operator 72 and the riding lawnmower 10 comprising the two lever-type operator 70, the procedure for determining and acquiring a turn center position and the left and right wheel speeds as well as the details thereof are different. However, in either case the fact that a turn center position and left and right wheel speeds are determined and acquired based on formulas described with FIG. 12a and FIG. 12b to FIG. 14 or correlation tables or corresponding map groups that correspond to the formulas using the geometrical dimensions of the riding lawnmower 10 is the same.

As shown in FIG. 20, upon acquiring a turn center position and the left and right wheel speeds, thereafter a caster wheel speed acquisition process (S16) and a turn driving process (S18) are executed. The contents of these processes are the same for the riding lawnmower 10 comprising the steering operator 72 and the riding lawnmower 10 comprising the two lever-type operator 70. Accordingly, in the riding lawnmower 10 comprising the steering operator 72 also, similarly to the riding lawnmower 10 comprising the two lever-type operator 70, an appropriate turn can be executed while increasing the overall torque for the riding lawnmower 10.

Thus, because there is a difference in the turn instruction inputs between the riding lawnmower 10 comprising the steering operator 72 and the riding lawnmower 10 comprising the two lever-type operator 70, the processing procedures for determining and acquiring a turn center position and left and right wheel speeds are different. However, the contents of formulas used for calculation processing, or the contents of correlation tables or correlation map groups used for retrieval processing are the same. Accordingly, for riding lawnmowers with the same geometrical dimensions, a selection step to select whether the steering operator is a two lever-type operator can be previously incorporated into the lawnmower vehicle control program to achieve a uniform program, and a selection can be made in accordance with the specific riding lawnmower specifications. By adopting this configuration, it is possible to perform control with respect to the kinds of lawnmower vehicle control programs.

EXAMPLE 4

In FIG. 8 and FIG. 19, the control section 100 has a function as a special setting conditions execution module 114. The term "special setting conditions" refers to conditions that are different from setting conditions in the normal control mode that correspond to the standard setting conditions. Here, the function of the deceleration control module 116 in the special setting conditions execution module 114 will be described. The following description is made referring to the symbols illustrated in FIG. 1 to FIG. 20. The turn control described in Example 2 attempts to respond in real time to a change in the speeds of the left and right wheels with respect to a turn instruction input. For example, in the case of the steering operator 72, when the steering wheel is slowly rotated, in accordance with the operation amount corresponding to the position of the steering wheel at each moment, the speed of the left and right wheels is changed at each of those moments. Although there are in fact several time delays such as a delay for the processing time of the controllers 28, 29, and 30 and a response delay of each mechanical component of the electric rotary machine and the like, the configuration is based on the principle that the speeds of the left and right wheels are changed immediately in response to the operation amount from each moment to the next of the steering wheel. When this control mode is referred to as a "normal control mode", it can be said that Examples 2 and 3 were described with respect to the normal control mode as control that is performed under the standard setting conditions.

In lawn mowing work, there are cases in which it is desirable to execute a turn more slowly than normal due to the state of the ground surface. For example, when the turning radius is small such as in the case of a pivot turn or a stationary turn, the entire body of the riding lawnmower 10 rotates with a small turning radius, and thus from a lawn mowing work viewpoint as well as an operator safety viewpoint it is desirable to turn more slowly than normal. Further, when there are severe bumps on the ground surface or when mowing lawn on a sharp sloping surface it is desirable to turn more slowly than normal.

Thus, when it is desirable to turn more slowly than normal due to the state of the ground surface, the operator performs a maneuver in which they slowly rotate the steering wheel. In the case of the two lever-type operator 70, the operator performs a maneuver in which they slowly tilt the control levers while maintaining a balance for the two control levers. This kind of maneuver requires quite a deal of experience and may be difficult for a novice operator. The deceleration control module 116 shown in FIG. 8 executes a deceleration control mode that is incorporated inside the lawnmower vehicle control program so as to automatically execute a turn slower than normal in this kind of case.

Figure 21:
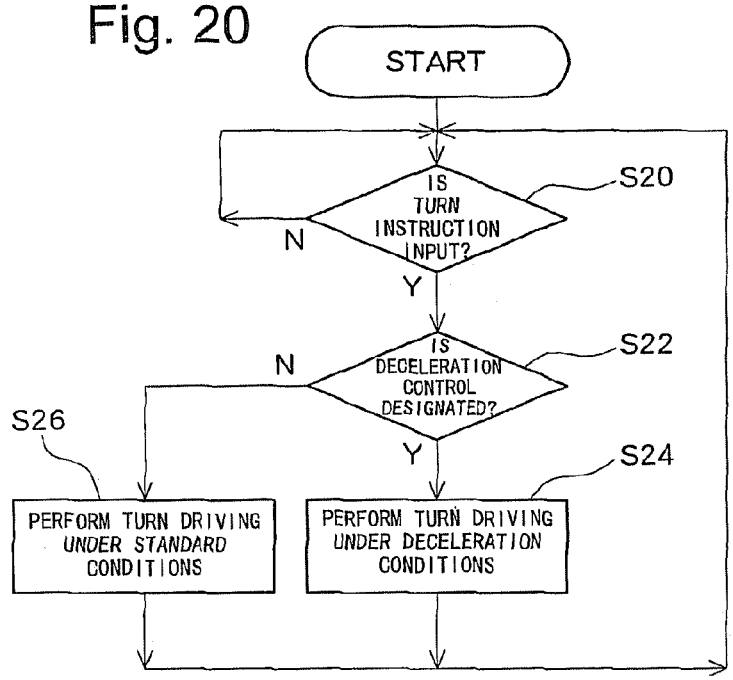
FIG. 21 is a flowchart illustrating the procedures of deceleration control according to the first embodiment of the present invention.

The action of the deceleration control module 116 will now be described using the flowchart shown in FIG. 21. Initially control is performed under the normal control mode and it is determined whether or not there is a turn instruction input in the processing of the normal control mode (S20). Determination of the presence or absence of a turn instruction input is carried out in the case of the two lever-type operator 70 by determining whether or not it is detected that at least one of the two control levers moves from the middle position. In the case of the steering operator 72, the presence or absence of a turn instruction input is carried out by determining whether or not the steering wheel is at the middle position.

When it is determined that there is a turn instruction input, it is then determined whether or not the deceleration control mode is designated (S22). Although it is necessary to switch from the normal control mode to the deceleration control mode to execute the deceleration control mode, that switching can be performed in response to an instruction from the operator. For example, a configuration can be adopted in which, for example, a "normal driving mode/deceleration driving mode" selection switch is provided in the vicinity of the seat 14, and when the normal driving mode is selected by the operator, the control section 100 acquires that selection signal and assumes that the normal control mode has been designated. In contrast, when the deceleration driving mode is selected by the operator, the control section 100 acquires that selection signal and assumes that the deceleration control mode has been designated. Alternatively, a configuration can be adopted in which a "deceleration driving mode" switch is provided and the normal control mode is taken as the standard state. In this case, the control section 100 assumes that the deceleration control mode is designated only when the deceleration driving mode switch is turned on and the control section 100 acquires that on signal.

Further, a configuration may be adopted which automatically designates the deceleration control mode depending on the vehicular state of the riding lawnmower 10. For example, a configuration can be adopted in which, using the slope sensor 68 shown in FIG. 8 and FIG. 19, the control section 100 acquires a slope-to-horizontal plane angle signal from the slope sensor 68 and takes a time when the slope-to-horizontal plane angle signal exceeds a predetermined threshold slope angle as designation of the deceleration control mode to thereby switch from the normal control mode to the deceleration control mode. Further, although a turn center position is determined and acquired as described above in the normal control mode, a configuration can be adopted in which the control section 100 compares the acquired value of the turn center position R with a predetermined threshold turn center position, and when the comparison result indicates that that the turn center position R is further on the center position side of the left and right wheels than the threshold turn center position, the control section 100 determines that the deceleration control mode is designated and switches from the normal control mode to the deceleration control mode.

When it is determined that the deceleration control mode is designated, turn driving is executed under deceleration conditions (S24). Execution of this step is the real function of the deceleration control module 116. When the determination at S22 is negative, the normal control mode is executed under the standard setting conditions (S26).

The manner of turn driving under deceleration conditions will be described using FIG. 22 to FIG. 27. In these views, the details of turn angle instructions by the operator are shown on the horizontal axis and the number of wheel revolutions per unit time is shown on the vertical axis. These views illustrate changes in the respective number of revolutions of the left and right wheels per unit time and the mean number of revolutions per unit time as the mean value for the number of revolutions of the left and right wheels with respect to turn angle instructions. The turn angle instructions on the horizontal axis are represented with θ, in which 4/4 indicates a maximum limit value for a turn instruction input, and 1/4, 2/4, and 3/4 indicate values that are 1/4, 2/4, and 3/4 of the maximum limit value, respectively. For example, in the case of a steering wheel, if it is assumed that the steering wheel is rotatable by 120 degrees to the left and right respectively, an operation amount of 120 degrees corresponds to 4/4. When the steering wheel can be rotated 180 degrees, an operation amount of 180 degrees corresponds to 4/4.

Figure 22:
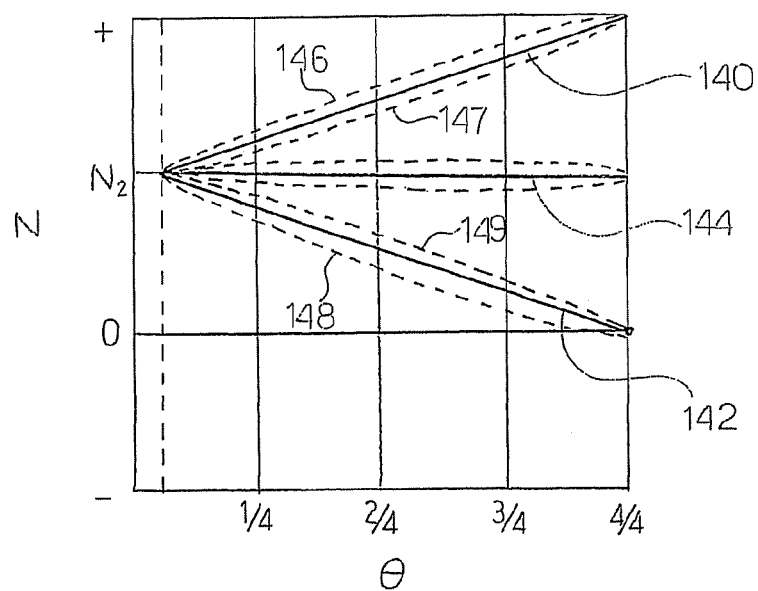
FIG. 22 is a view illustrating the state of turn driving under deceleration conditions according to the first embodiment of the present invention.

FIG. 22 is a view illustrating turn driving in the normal control mode. In FIG. 22, the three characteristic lines are an outside wheel number of revolutions characteristic line 140, an inside wheel number of revolutions characteristic line 142, and a mean number of revolutions characteristic line 144 that is the average of the number of revolutions of the outside wheel per unit time and the number of revolutions of the inside wheel revolutions per unit time. Using the symbols shown in FIG. 12a, the number of revolutions characteristic line 140 is a characteristic line for the turn angle θ of the number of revolutions per unit time $N_o$ of the outside wheel 40, the number of revolutions characteristic line 142 is a characteristic line for the turn angle θ of the number of revolutions $N_i$ of the inside wheel 42, and the number of revolutions characteristic line 144 is a characteristic line for the turn angle θ of the number of revolutions corresponding to the mean traveling speed $V_M$.

In the example shown in FIG. 22, a value $N_o$ represented by the number of revolutions characteristic line 140 linearly increases as the turn angle θ increases, a value $N_i$ represented by the number of revolutions characteristic line 142 linearly decreases as the turn angle θ increases, and the mean number of revolutions per unit time, i.e. $(N_o+N_i)/2$, is shown as being maintained at a constant value $N_2$ with respect to the turn angle θ. That is, in this example, as the instructed turn angle θ increases while the mean traveling speed $V_M$ of the riding lawnmower 10 remains constant, the difference in the number of revolutions per unit time that is the difference between the number of revolutions $N_o$ of the outside wheel 40 and the number of revolutions $N_i$ of the inside wheel 42 increases linearly to execute a turn. In this example, the mean traveling speed during the turn is constant. This is a turn characteristic of the normal control mode.

In FIG. 22, although the number of revolutions characteristic line 140 and the like do not start from a point where the turn angle=0, this is because there is a dead zone with respect to a turn instruction in the two lever-type operator 70 or the steering operator 72. The same applies to the examples shown in FIG. 23 and thereafter.

In this connection, in FIG. 22, the dashed line indicates that, as an option within the range of the normal control mode, the outside wheel number of revolutions characteristic line 140 and the inside wheel number of revolutions characteristic line 142 can be changed somewhat. This option is provided, for example, to take into account the variation in handling ability of an experienced operator and a novice operator. This option can be designated by operating an "aggressive mode/slow mode" selection switch that is provided in the vicinity of the seat 14. In FIG. 22, aggressive mode characteristic lines 146 and 148 represent execution of turns at a somewhat higher speed than the normal control mode, and slow mode characteristic lines 147 and 149 represent execution of turns at a somewhat lower speed than the normal control mode. The term "somewhat" refers to a change within the range of ±10% with respect to the mean traveling speed. In the deceleration mode described hereunder, the speed can be reduced within a range of from approximately −10% to −50% with respect to the mean traveling speed or the mean number of revolutions.

Figure 23:
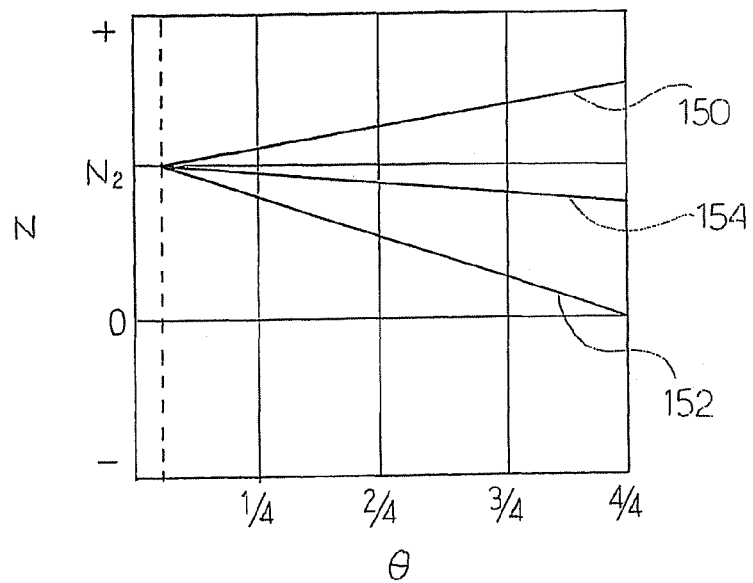
FIG. 23 is a view illustrating the state of turn driving under deceleration conditions according to the first embodiment of the present invention.

FIG. 23 is a view for describing a representative example of the deceleration control mode. In comparison with FIG. 22, it is shown that the number of revolutions characteristic line 154 for the mean number of revolutions falls as the turn angle θ increases. In FIG. 23, the difference in the number of revolutions that is shown by the difference between the outside wheel number of revolutions characteristic line 150 and the inside wheel number of revolutions characteristic line 152 is the same as in FIG. 22. Accordingly, as the instructed turn angle θ increases, the difference in number of revolutions that is the difference between the number of revolutions per unit time $N_o$ of the outside wheel 40 and the number of revolutions per unit time $N_i$ of the inside wheel 42 linearly increases, and, even though the same as in FIG. 22 is executed, the average number of revolutions, i.e. $(N_o+N_i)/2$, gradually decreases as the turn angle θ increases. That is, in this case, the mean number of revolutions $N_M$ or the mean traveling speed $V_M$ of the riding lawnmower 10 is gradually decreased in accordance with the progress of a turn. As a result, a turn can be performed more slowly than with the normal control mode. The degree of deceleration can be varied by the settings. As described above, the degree of variance can be arbitrarily set within the range of −10% to −50% with respect to the mean traveling speed or mean number of revolutions in the normal control mode. For example, a volume switch or the like can be provided beside the "normal driving mode/deceleration driving mode" selection switch in the vicinity of the seat 14, and the degree of deceleration can be arbitrarily set by operating that switch.

In FIG. 23, for the inside wheel number of revolutions characteristic line 152, even when the turn angle is at a maximum, the number of revolutions is at most=0, and the wheel does not rotate in the reverse direction. Although in the description for FIG. 10*b* a state in which the turn center position comes to the ground-contact position of the inside wheel and the number of revolutions of the inside wheel=0 is a pivot turn, in the case shown in FIG. 23 it is not possible to adequately perform a pivot turn. In order to adequately perform a pivot turn it is preferable that a point at which the number of revolutions of the inside wheel number of revolutions characteristic line=0 is in the area where the turn angle is between 2/4 and 4/5. To achieve this, it is sufficient to reduce the mean number of revolutions or to operate the two lever-type operator 70 or the steering operator 72 so as to increase the change in the difference in number of revolutions with respect to the turn angle θ.

Figure 24:
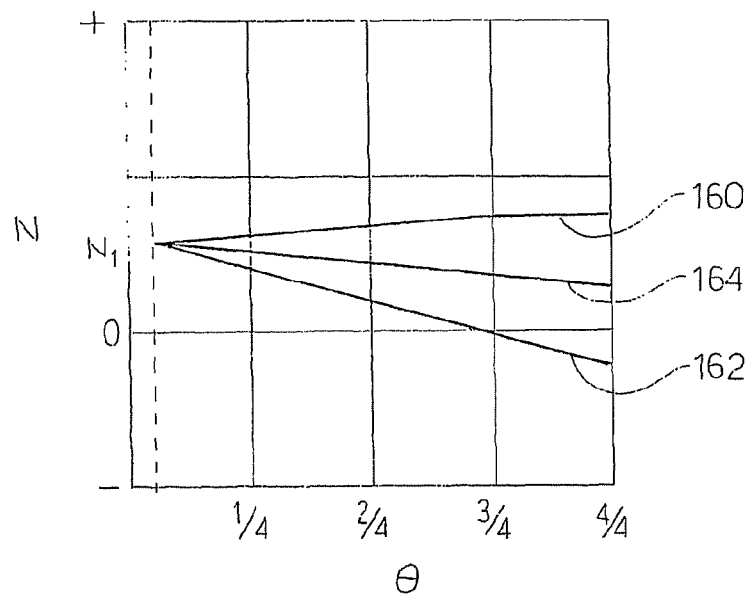
FIG. 24 is a view illustrating the state of turn driving under deceleration conditions according to the first embodiment of the present invention.

FIG. 24 is a view illustrating deceleration control when a configuration is adopted such that the mean number of revolutions is lowered so that the number of revolutions=0 for an inside wheel number of revolutions characteristic line 162 in the vicinity of a point where the turn angle is 3/4. Also in this case, a number of revolutions characteristic line 164 for the mean number of revolutions shows a gradual deceleration in accordance with the progress of the turn. As a result, in comparison to the normal control mode, a turn can be performed more slowly by employing a turn control that includes a pivot turn. Here, the reason that the tendency of the outside wheel number of revolutions characteristic line 160 to increase is suppressed from around the point where the turn angle exceeds 3/4 is that the number of revolutions of the inside wheel represents revolutions in the reverse direction from that point.

Figure 25:
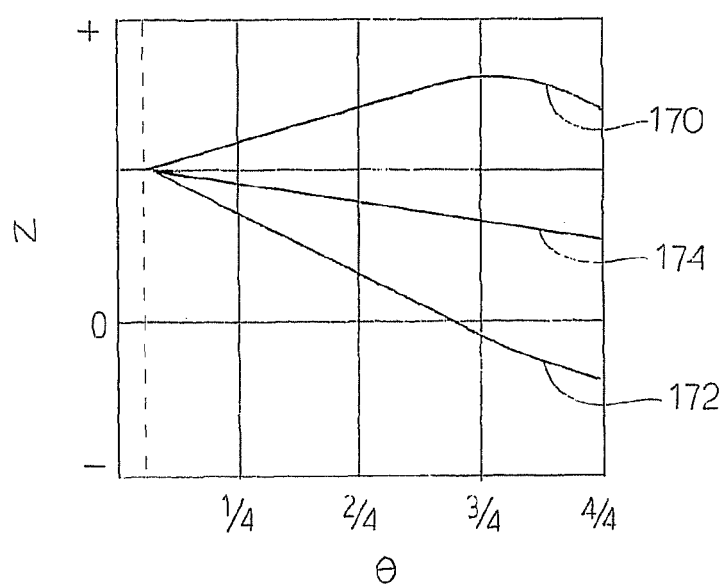
FIG. 25 is a view illustrating the state of turn driving under deceleration conditions according to the first embodiment of the present invention.

FIG. 25 is a view describing the manner of the deceleration control mode when a configuration is adopted such that a change in the difference in the number of revolutions with respect to the turn angle θ is increased and an inside wheel number of revolutions characteristic line 172 indicates that the number of revolutions=0 in the vicinity of an area where the turn angle is 3/4. In this case also, a number of revolutions characteristic line 174 for the mean number of revolutions represents a gradual deceleration in accordance with the progress of the turn. As a result, in comparison to the normal control mode, a turn can be performed more slowly by turn control that includes a pivot turn. In this case, the reason that the increase trend of an outside wheel number of revolutions characteristic line 170 is suppressed, or rather that the rotational speed decelerates, from around the point where the turn angle exceeds 3/4, is that the rotational speed of the inside wheel in the reverse direction gradually increases.

In FIG. 24 and FIG. 25, the number of revolutions characteristic lines 164 and 174 for the mean number of revolutions do not reach a point where the number of revolutions per time=0, even when the turn angle is set to the maximum. Although, as described with FIG. 10*c*, a state in which the turn center position comes to exactly an intermediate position between the inside wheel and the outside wheel, the absolute values for rotational speed of the inside wheel and the rotational speed of the outside wheel are the same, and the rotational directions are mutually opposite directions is a stationary turn or a spin turn, in the case of FIG. 24 and FIG. 25 it is not possible to adequately perform a stationary turn or a spin turn. In order to adequately perform a stationary turn or a spin turn it is preferable that a point where the number of revolutions characteristic line of the mean number of revolutions indicates that the number of revolutions=0 is at least within a variable range of the turn angle. One method for achieving this is, after entering a pivot turn state, to operate the two lever-type operator 70 or the steering operator 72 so as to lower the mean number of revolutions and make the mean number of revolutions=0 within the variable range of the turn angle.

Figure 26:
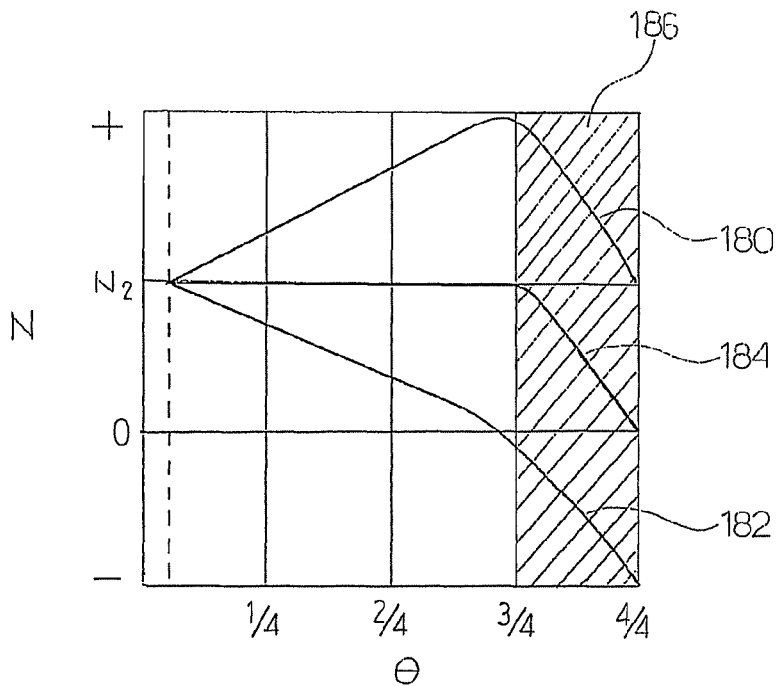
FIG. 26 is a view illustrating the state of turn driving under deceleration conditions according to the first embodiment of the present invention.

FIG. 26 is a view for describing control that increases a change in the difference in number of revolutions with respect to the turn angle θ while maintaining the mean number of revolutions constant, makes the number of revolutions per unit time=0 for an inside wheel number of revolutions characteristic line 182 in the vicinity of the point where the turn angle is 3/4 and, after entering a pivot turn state, decreases the value of a number of revolutions characteristic line 184 of the mean number of revolutions until the turn angle is 4/4 so that the mean number of revolutions=0. This control is the normal control mode for executing a stationary turn. In this case, a situation is illustrated in which, in a region 186 that exceeds a pivot turn, as the turn center position approaches an intermediate position between the left and right wheels, the mean number of revolutions or the mean traveling speed decreases to approach zero.

In connection with this, for the inside wheel number of revolutions characteristic line 182, the number of revolutions=0 in the vicinity of the turn angle 3/4, and thereafter the number of revolutions gradually increases in the opposite direction. In correspondence therewith, for an outside wheel number of revolutions characteristic line 180, after reaching a maximum number of revolutions in the vicinity of the turn angle 3/4, the number of revolutions gradually decreases, and decelerates until the absolute value is the same as that of the number of revolutions of the inside wheel. When the absolute values of the number of revolutions per unit time of the outside wheel and the number of revolutions per unit time of the inside wheel are the same, and the rotational directions of the inside wheel and the outside wheel are opposite, the mean number of revolutions=0, and the lawnmower enters a state known as a "stationary turn" or a "spin turn".

Figure 27:
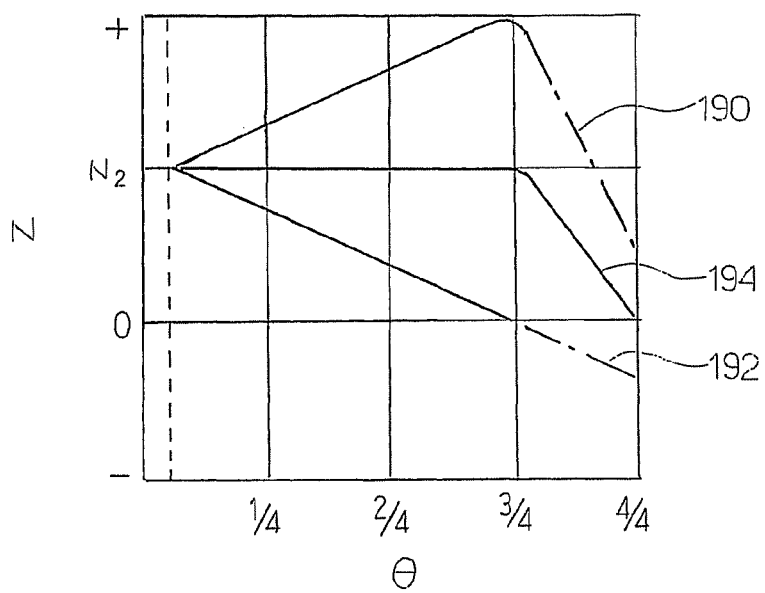
FIG. 27 is a view illustrating the state of turn driving under deceleration conditions according to the first embodiment of the present invention.

FIG. 27 is a view illustrating the manner of deceleration control mode corresponding to FIG. 26. In this case, a number of revolutions characteristic line 194 that relates to the mean number of revolutions is the same as the number of revolutions characteristic line 184 relating to the mean number of revolutions in FIG. 26. An outside wheel number of revolutions characteristic line 190 illustrates a deceleration that is much more than that represented by the number of revolutions characteristic line 180 in the normal control mode. In accordance therewith, an increase in the number of revolutions in the reverse direction is suppressed for an inside wheel number of revolutions characteristic line 192 also. Thus, as a result, a turn can be executed more slowly by turn control that includes a stationary turn in comparison with the normal control mode.

As described above, the mode can be changed from the normal control mode to the deceleration control mode by changing the outside wheel number of revolutions characteristic line, the inside wheel number of revolutions characteristic line, and the number of revolutions characteristic line for the mean number of revolutions. Although this change can be executed by arithmetic processing, it is also possible to store various number of revolutions characteristic lines for the normal control mode and various number of revolutions characteristic lines for the deceleration control mode in the memory section 102, and, in accordance with selection of the deceleration driving mode, read out the required number of revolutions characteristic lines to execute control of the number of revolutions per unit time of the outside wheel and the inside wheel in accordance with the number of revolutions characteristic lines that are read out. In the memory section 102, it is possible to store various number of revolutions characteristic lines using a hierarchical structure by employing a deceleration, a mean number of revolutions, a difference in number of revolutions or the like as a retrieval key.

Here, the above description is based on an example wherein a selection can be made between the normal control mode and the deceleration control mode, and the normal control mode is used for a three-wheel drive or four-wheel drive riding lawnmower described in Example 2 or 3. In this case, as will be understood from the flowchart shown in FIG. 21 and the descriptions of FIG. 22 to FIG. 27, the deceleration control mode relates only to control of the number of revolutions of the left and right wheels that are the main drive wheels. Accordingly, the deceleration control mode can be applied not only to a three-wheel drive or four-wheel drive riding lawnmower in which a driving force is applied to a caster wheel, but also to a two-wheel drive vehicle or the like in which a driving force is applied only to the main drive wheels without applying a driving force to a caster wheel.

EXAMPLE 5

In FIG. 8 and FIG. 19, the control section 100 has functions of the special setting conditions execution module 114. In this example, the function of the wheel-on-one-side free control module 118 among those functions is described. The following description is made using the symbols in FIG. 1 to FIG. 20.

It has been stated above that, in turn control, a case in which the turn center position comes to the ground-contact position of a wheel on one side and the ground speed of that wheel on one side, i.e. the number of revolutions, is zero is referred to as a "pivot turn". In a pivot turn, although the wheel on one side that is at the turn center position is taken as being in a fixed position, in response to rotation of the other wheel, i.e. the outside wheel, the wheel on one side turns around the turn center position. Because this turn is performed in a state in which a driving force is not applied around the axle of the wheel on one side, if a case is assumed in which the rotation of the wheel on one side around the axis thereof is completely constrained, surface of the wheel on one side that contacts with the ground surface will rub against the ground surface while turning, and as a result there is a risk that the wheel will damage the planting condition of the lawn.

In particular, in the case of a two lever-type operator, a problem is liable to occur when the driving source is a hydraulic actuator such as an oil motor. More specifically, when the driving source is a hydraulic actuator, when the control lever is in a neutral state it is determined that the vehicle is in a stopped state and a brake such as a dynamic brake is applied to prevent the vehicle from making an unanticipated movement. During a pivot turn, with the two lever-type operator, the control lever corresponding to control of the wheel on one side is at a position where the ground speed=0, that is, the middle position. As described above, if it is assumed that a brake is applied to the wheel on one side when the control lever is in a neutral state, the rotation of the wheel on one side around the axle thereof is completely restricted. Even when a hydraulic actuator is not used, when the control lever is in a neutral state, the same situation can arise as long as the control system employs a method that applies a brake to the wheel.

In the case of the steering operator, because the steering wheel is not in a neutral state at the time of a pivot turn, problems of this type are not liable to occur.

The wheel-on-one-side free control module 118 counteracts the above described problem. At the time of a pivot turn, the wheel-on-one-side free control module 118 makes the wheel on one side that is at the turn center position freely rotatable with respect to its relationship with the ground surface, without applying a brake around the axle thereof. As a result, damage to the planting condition of a lawn and the like can be suppressed when executing a pivot turn.

Figure 28:
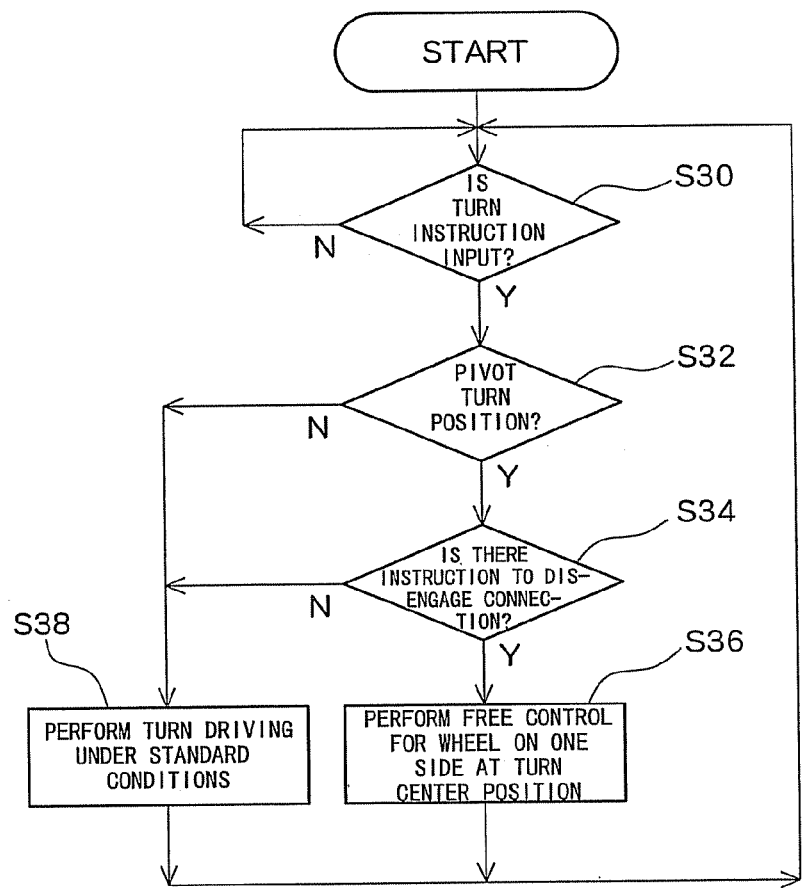
FIG. 28 is a flowchart showing free control of a wheel on one side according to the first embodiment of the present invention.

FIG. 28 is a flowchart illustrating the procedures of the free control of a wheel on one side. Although initially control is performed in the normal control mode, during the processing of the normal control mode it is determined whether or not there is a turn instruction input (S30). The contents of this step are the same as those of S20 in FIG. 21.

More specifically, the existence or non-existence of a turn instruction input is determined in the case of the two lever-type operator 70 by determining whether or not it is detected that at least one of the two control levers moved to the middle position, and in the case of the steering operator 72 is determined based on whether or not the position of the steering wheel is the middle position.

When it is determined that a turn instruction has been input, it is next determined whether or not the turn center position is at the pivot turn position (S32). Whether or not the turn center position is at the pivot turn position can be determined by whether or not the turn center position R that was described in relation to FIG. 12 is at ½ of the main drive wheel tread. Here, in the case of the two lever-type operator 70, it can also be determined in a subsidiary manner that one of the control levers is at the middle position and the other control lever is not at the middle position.

When it is determined that the turn center position is at the pivot turn position, it is next determined whether or not there is an instruction to place the axle of the wheel that is at the turn center position and the driving source is in a disengaged state (S34). In the two lever-type operator 70, this can be determined by, for example, determining whether or not a control lever is in a neutral state. In the case of the steering operator 72, the process at S34 can be omitted.

When the result of the determination at S34 is affirmative, or when the result of the determination at S32 is affirmative and the process of S34 is omitted, the operation proceeds to S36 and free control is executed for the wheel on one side that is at the turn center position. More specifically, a state is entered in which no driving force is applied around the axle, a brake is not applied, and the wheel on one side can freely rotate around the axle in conformity with the wheels relationship with the ground surface. More specifically, the instruction to the brake unit of the wheel on one side is and instruction to effect no braking.

Here, in a case in which the determination at S32 is negative, or when the determination at S32 is affirmative and the determination at S34 is negative, because there are cases in which the vehicle is stopped, the operation does not proceed to S36 and instead the normal control mode is executed under standard setting conditions (S38).

Although in the above description switching between the normal control mode and a wheel-on-one-side free control mode was performed according to the determination made at S32, apart from this configuration, a configuration may also be adopted in which a mode switching switch, in particular, is provided, and the processing procedures of FIG. 28 are executed only when the mode switching switch is on. For example, in the case of a golf course or park or the like for which strict management is performed with respect to the planting condition of the lawn or grass, by switching the mode switching switch "on", the lawn mowing work can be executed without worrying about damaging the lawn or grass when executing a pivot turn.

Further, the normal control mode that is the mode the vehicle is in prior to switching to the wheel-on-one-side free control mode was described in Examples 2 and 3 on the premise that the riding lawnmower is a three-wheel drive or four-wheel drive vehicle. In this case, as will be understood from the description of the flowchart shown in FIG. 28, the wheel-on-one-side free control mode relates only to control of the rotational speeds of the left and right wheels which are the main drive wheels. Accordingly, the wheel-on-one-side free control mode can be applied not only to a three-wheel drive or four-wheel drive riding lawnmower or the like that applies a driving force to a caster wheel, but also to a two-wheel drive vehicle or the like that applies a driving force only to the main drive wheels and does not apply a driving force to a caster wheel.

EXAMPLE 6

In FIG. 8 and FIG. 19, the control section 100 has functions of a special setting conditions execution module 114. In this example, the function of the turn restriction control module 120 among those functions is described. The following description refers to the symbols used in FIG. 1 to FIG. 20.

In Examples 2 and 3, the turn control was described as control that could perform a pivot turn or a stationary turn in accordance with a turn instruction input of the two lever-type operator 70 or the steering operator 72. In this case, in a stationary turn, because the turn center position comes to the inner side of the left and right wheels that are the main drive wheels, the riding lawnmower 10 turns at a large angle with a small turning radius, and can thus execute a tight turn. However, depending on the ground surface state, execution of a turn with this kind of small turning radius and large turning angle can place the riding lawnmower 10 in an unstable state. For example, when a stationary turn is executed on a steep sloping surface, the center of gravity of the riding lawnmower 10 shifts in a short time period, and depending on the case, there is a risk that the vehicle itself will move a large amount accompanying the shift in the center of gravity.

The turn restriction control module 120 has a function that restricts the size of the turning radius to return the turn center position to the position of a pivot turn even when a stationary turn is instructed. It is thereby possible to prevent execution of an unsafe turn.

Figure 29:
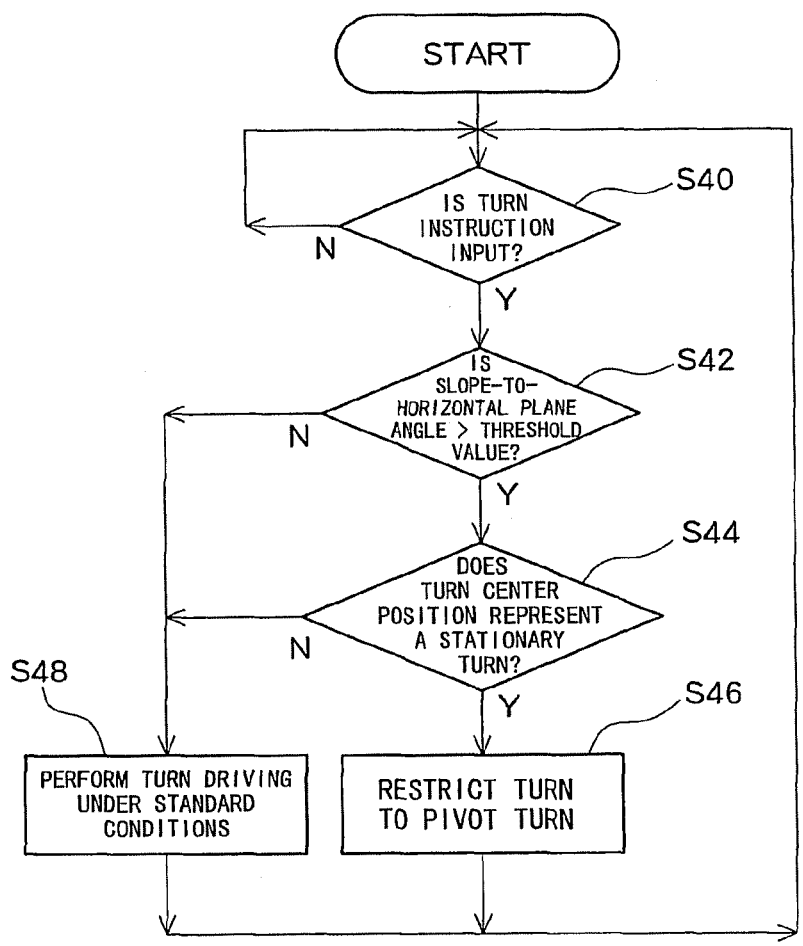
FIG. 29 is a flowchart showing turn restriction control according to the first embodiment of the present invention.

FIG. 29 is a flowchart illustrating the procedures of the turn restriction control. Although initially control is performed in the normal control mode, during the processing of the normal control mode it is determined whether or not there is a turn instruction input (S40). The contents of this step are the same as those of S20 in FIG. 21. More specifically, the existence or non-existence of a turn instruction input is determined in the case of the two lever-type operator 70 by determining if it has been detected that at least one of the two control levers moved to the middle position, and in the case of the steering operator 72 is determined based on whether or not the position of the steering wheel is the middle position.

When it is determined that there is a turn instruction input, next it is determined whether or not the slope-to-horizontal plane angle exceeds a threshold slope angle (S42). Detection of the slope-to-horizontal plane angle is performed using the slope sensor 68 shown in FIG. 8 and FIG. 19, and the collected detection data is acquired by the control section 100 as a slope-to-horizontal plane angle signal 80. The threshold slope angle can be set empirically based on the center of gravity position of the riding lawnmower 10 and the like. For example, the threshold slope angle can be set to from +20 degrees to −15 degrees. In this case, when the symbol is "+" it indicates that the surface is an upgrade slope, and when the symbol is "−" it indicates that the surface is a downgrade slope. Naturally, the threshold slope angle can be set to values other than these.

When the determination at S42 is affirmative, it is then determined whether or not the turn center position is equivalent to a stationary turn (S44). This determination can be made on the basis of whether or not the turn center position R that was described in relation to FIG. 12a and FIG. 12b is less than ½ of the main drive wheel tread.

When the determination at S44 is affirmative, turn restriction is executed that returns the turn center position as far as a pivot turn position (S46). More specifically, the rotational speeds of the left and right wheels are adjusted such that the turn center position R becomes ½ or more of the main drive wheel tread. Here, when the determination at S42 is negative or when the determination at S44 is negative, the normal control mode is executed under the standard setting conditions (S48).

In the above description, switching between the normal control mode and turn restriction control mode was performed according to the determination made at S42. Accordingly, the slope sensor corresponds to means that issue an instruction as to whether to execute the normal control mode or the turn restriction control mode. Apart from this configuration, a configuration may also be adopted in which a mode switching switch, in particular, is provided, and the processing procedures of FIG. 29 are executed only when the mode switching switch is on. For example, when there is severe unevenness in the ground surface or when there are many obstacles, by turning on the mode switching switch the lawn mowing work can be executed without worrying about the size of a turning radius.

Further, the normal control mode that is the mode the vehicle is in prior to switching to the turn restriction control mode was described in Examples 2 and 3 on the premise that the riding lawnmower is a three-wheel drive or four-wheel drive vehicle. In this case, as will be understood from the description of the flowchart shown in FIG. 29, the turn restriction control mode relates only to control of the number of revolutions of the left and right wheels that are the main drive wheels. Accordingly, the turn restriction control mode can be applied not only to a three-wheel drive or four-wheel drive riding lawnmower or the like that applies a driving force to a caster wheel, but also to a two-wheel drive vehicle or the like that applies a driving force only to the main drive wheels and does not apply a driving force to a caster wheel.

[Second Embodiment]

Figure 30:
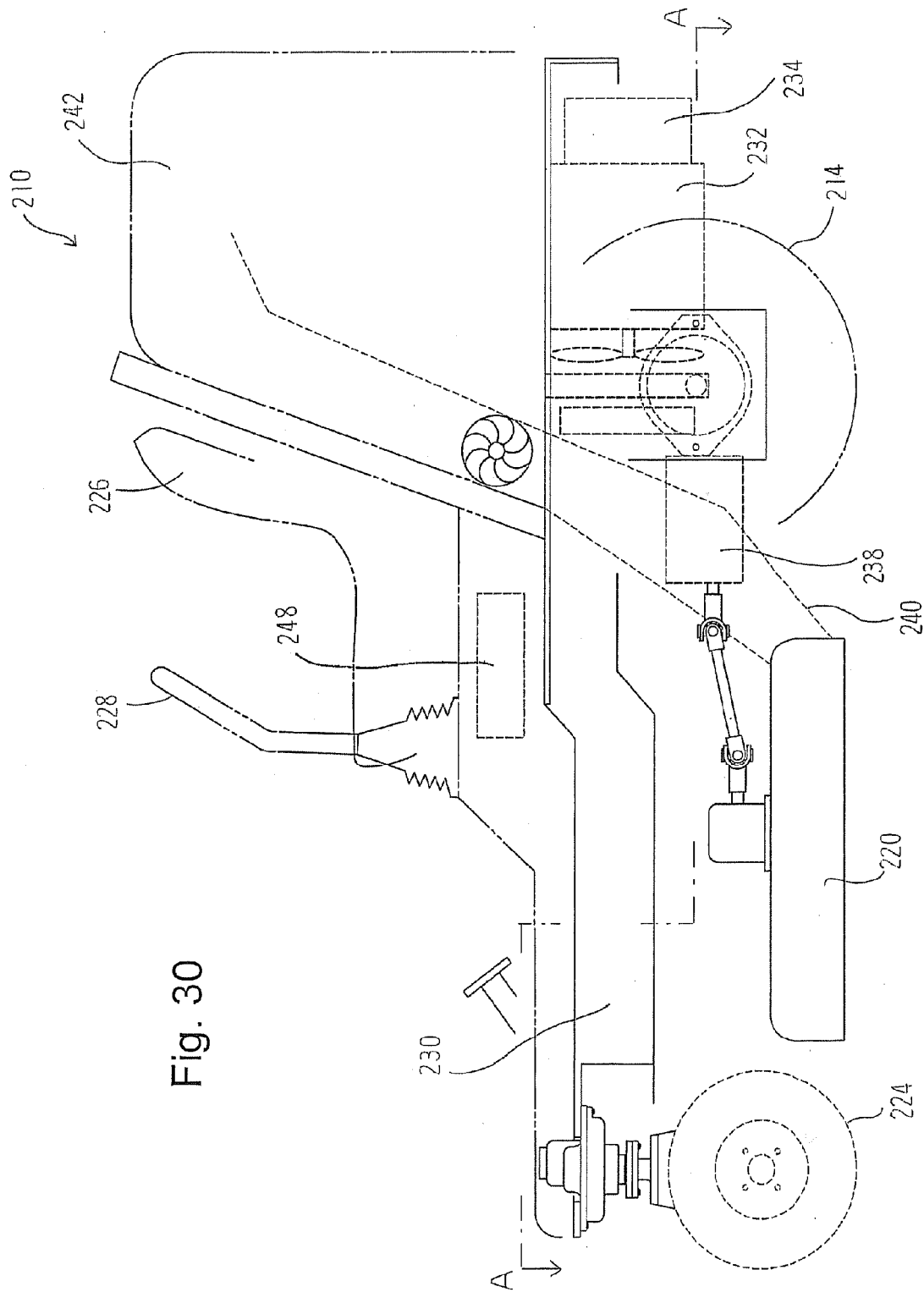
FIG. 30 is a schematic illustration showing the configuration of a lawnmower vehicle according a second embodiment according to the present invention.
Figure 31:
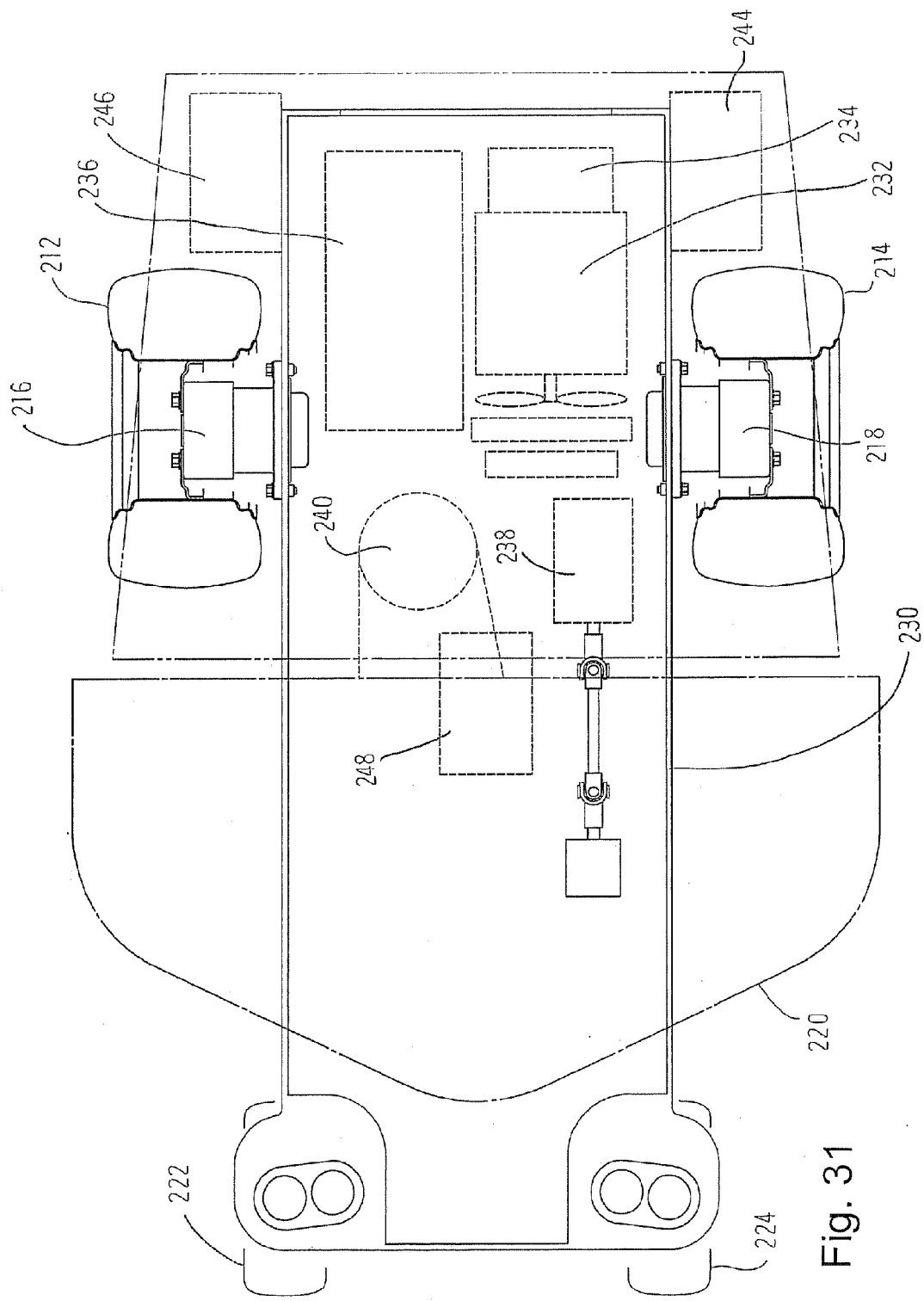
FIG. 31 is a cross sectional view substantially along the line A-A shown in FIG. 30.

Hereunder, an embodiment according to the present invention that relates to a third aspect is described in detail using the drawings. FIG. 30 to FIG. 40 are views that illustrate the second embodiment. FIG. 30 is a schematic illustration that shows the configuration of a lawnmower vehicle 210 as a riding lawnmower of the present embodiment. FIG. 31 is a cross sectional view substantially along the line A-A shown in FIG. 30. Although a lawnmower vehicle 210 is described hereunder as having a configuration in which the left and right rear wheels are the main drive wheels and the left and right front wheels are the steering control wheels, a configuration can also be applied to riding lawnmower of a three-wheel type having one wheel as a steering control wheel.

Although in the following description a device using an electric motor is described as a power source for the traveling of the main drive wheels and steering control wheels of the lawnmower vehicle 210, a power source other than an electric motor, for example, an oil hydraulic motor can be used. Further, although a device using an electric motor or an oil hydraulic motor is described as a power source of the lawnmower, an internal combustion engine may be used as a power source of the lawnmower via a suitable power transmission device.

Although an apparatus having a function as an electric motor that is supplied with electric power and outputs a rotational driving force to at least the main drive wheels and also having a function as an electricity generator that recovers regenerative energy when braking is applied to at least the main drive wheels is described in the following example, an apparatus having a function simply as an electric motor can also be used. An electricity generator for generating regenerative energy may also be provided separately. Further, hereunder, an electric motor power supply source is taken as a power supply unit, and a so-called hybrid riding lawnmower that uses an engine and an electricity generator as power supply sources for the power supply unit is described. However, the riding lawnmower may be configured to use only a power supply unit without mounting an engine or an electricity generator. In that case, the mounting space of the engine and the like can be eliminated, enabling the lawnmower vehicle to be made lightweight. Further, the size of the power supply unit can be increased by the amount of the mounting space of the engine and the like that can be eliminated. The power supply unit may be a secondary battery that receives a supply of charged energy from outside, or may be a unit having a self-electricity generating function such as a fuel cell or a solar cell. Further, the arrangement of each component in the riding lawnmower described hereunder, including the third through eleventh examples below, is described as one example configuration suited to storing grass and the like that is cut and mowed by the lawnmower, and the arrangement can be appropriately changed in accordance with the specifications of the riding lawnmower and the like.

As shown in FIG. 30 and FIG. 31, in the lawnmower vehicle 210, the right and left two main drive wheels (the rear wheels in the FIGS. 212 and 214 can be driven by a first electric motor (right axle motor) 216 and a second electric motor (left axle motor) 218 (FIG. 31) that are two electric motors. The lawnmower vehicle 210 comprises a mower 220 as a working machine and travels over the ground surface using the right and left two main drive wheels 212 and 214 and caster wheels 222 and 224 as two steering control wheels on the right and left. In the vicinity of a driver's seat 226, on which the operator sits, are provided operating levers 228 as an operation section with two levers. The operating levers 228 are collectively a two lever-type operator in which two levers are provided separately from each other in the right and left directions for turning, accelerating, and decelerating the lawnmower vehicle 210. In FIG. 30, only one of the two operating levers 228 is illustrated. Further, although not illustrated in FIG. 30 and FIG. 31, operation sections such as a starting switch that is a separate operation section for operating the mower 220 or a brake pedal for executing a brake operation of the lawnmower vehicle 210 and a parking brake lever comprising a mechanical brake for maintaining a stopped state are also provided in the vicinity of the driver's seat 226.

The lawnmower vehicle 210 comprises a main frame 230 that constitutes the vehicle body, an engine 232 as an internal combustion engine that is supported on the main frame 230, an electricity generator 234 that is operatively coupled with an output shaft of the engine 232, i.e. a drive shaft thereof is operatively coupled to the output shaft, and a power supply unit 236 that stores electric power supplied with electric power from the electricity generator 234 (see FIG. 31). The first electric motor 216 and the second electric motor 218 are driven by electric power that is supplied from the power supply unit 236. For example, a drive shaft comprising the electricity generator 234 is coupled to an end of the output shaft of the engine 232, or the output shaft of the engine 232 and a drive shaft of the electricity generator 234 are configured in an integrated manner using a common shaft. A configuration can also be adopted in which a drive pulley is fixed to the end of an output shaft of the engine 232, and the electricity generator 234 is driven by the engine 232 via this drive pulley, a belt, and a driven pulley that is fixed to the drive shaft of the electricity generator 234.

Further, at a portion near the rear of the main frame 230 (near the right side in FIG. 30 and FIG. 31), the right and left main drive wheels 212 and 214 (top and bottom of FIG. 31) are supported, and at a portion divided among the right and left sides (top and bottom of FIG. 31) at the front end of the main frame 230 (left side end in FIG. 30 and FIG. 31), right and left caster wheels 222 and 224 are supported. The mower 220 is provided between the main drive wheels 212 and 214 and the caster wheels 222 and 224 with respect to the front to rear direction of the main frame 230 (left to right direction of FIG. 30 and FIG. 31). The mower 220 is operatively coupled with a power source (for example, an oil hydraulic motor or an electric motor) 238 for driving the mower 220. In the example illustrated in the drawings, the section between the power source 238 and the mower 220 is operatively coupled, i.e. in a manner enabling transmission of power, by a universal joint and a transmission shaft. The height of the mower 220 can be adjusted by a working machine lifting actuator (not shown). Further, a discharge duct 240 for discharging grass that is mowed to the rear of the vehicle is connected to the mower 220. The discharge duct 240 extends diagonally upward along the rear side of the driver's seat 226, and the top part thereof is connected to a grass storage tank 242 that is provided on the rear side of the driver's seat 226. A middle section of the discharge duct 240 extends diagonally in the vertical direction so as to pass through a hole section that is provided in a horizontal plate portion constituting the main frame 230.

Further, as shown in FIG. 31, the engine 232, the electricity generator 234, and the power supply unit 236 are supported on the rear side of the discharge duct 240 so as to avoid the discharge duct 240 on the bottom side of a tabular, horizontal plate portion constituting the main frame 230.

Controllers 244, 246, and 248 that perform overall control of the operation of each component such as the power supply unit 236, the first electric motor 216, and the second electric motor 218 are disposed at suitable positions on the top surface side or bottom surface side of the main frame 230. Because the controllers 244, 246, and 248 are electrical circuits, a distributed arrangement of these components is much more easily achievable than with the mechanical components. In the example shown in FIG. 30 and FIG. 31, the controllers 244, 246, and 248 are arranged such that they are distributed among a total of three locations consisting of one position on the underside of the driver's seat 226 that is on the top surface side of the main frame 230 and two positions near the first electric motor 216 and the second electric motor 218 that are on the bottom surface side of the main frame 230. The controllers 244, 246, and 248 are connected to each other with a suitable signal cable or the like. In this case, driver circuits such as inverter circuits that are used for the first electric motor 216 and the second electric motor 218 are principally disposed in the controllers 246 and 244 that are disposed at positions close to the first electric motor 216 and the second electric motor 218, and a control logic circuit such as a CPU is principally disposed in the controller 248 that is disposed at a position close to the driver's seat 226. Here, the controllers 244, 246, and 248 can also be integrated at one or two positions.

The first electric motor 216 and the second electric motor 218 drive the two main drive wheels 212 and 214, respectively, by driving a rotary shaft. The two electric motors 216 and 218 enable rotational driving in both the forward and reverse directions that is a DC brushless motor or the like. It is also possible to control the number of revolutions per unit time of the two electric motors 216 and 218.

The mower 220 comprises one or a plurality of lawnmower blades that rotationally drive around a shaft in the vertical direction. In this connection, instead of blades for mowing, the mower 220 may be configured using a lawnmower reel-type device in which, for example, a helical blade is disposed in a cylinder having a rotation shaft that is rotationally driven around a shaft in the horizontal direction and which clips and mows a lawn or the like.

Figure 32:
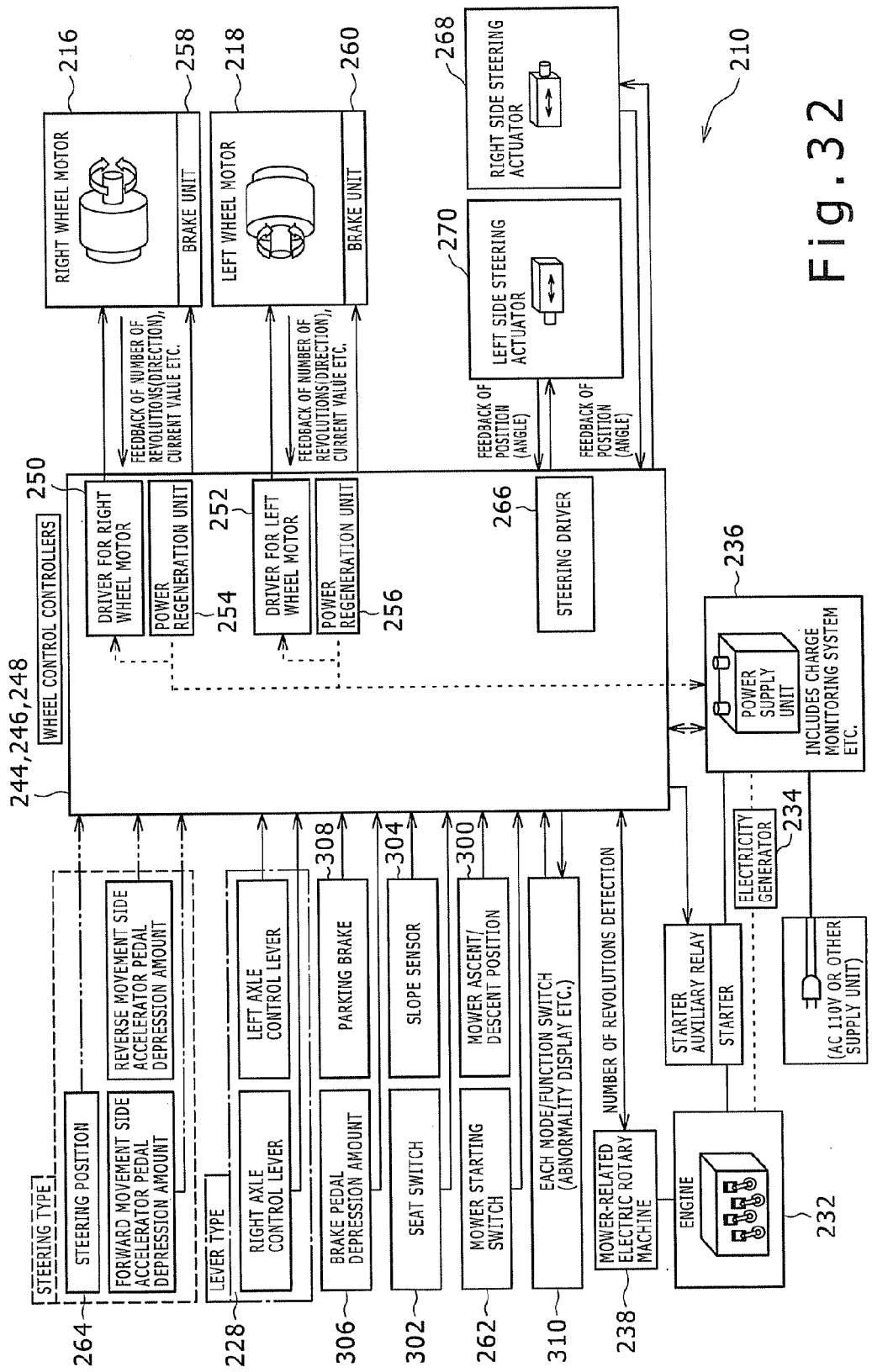
FIG. 32 is a view illustrating the basic configuration, including a controller, of a lawnmower vehicle of the second embodiment.

FIG. 32 is a view that shows the basic configuration of the lawnmower vehicle 210 including the controllers 244, 246, and 248. The controllers 244, 246, and 248, for example, are control circuits that include a CPU, and include a first electric motor drive circuit (driver for right axle motor) 250, a second electric motor drive circuit (driver for left axle motor) 252, an electric power regeneration unit 254 for the first electric motor 216, and an electric power regeneration unit 256 for the second electric motor 218. For example, the first electric motor drive circuit 250 drives the first electric motor 216 with a control signal from the CPU. As feedback from the first electric motor 216, signals representing the number of revolutions per unit time, the rotational direction, and the current value and the like are sent to the controllers 244, 246 and 248. An electrically-operated brake unit 258 is provided for applying a brake to the main drive wheel 212 (FIG. 31) on the right side in correspondence with the first electric motor 216, and is configured to receive control signals sent from the controllers 244, 246, and 248.

The second electric motor drive circuit 252 drives the second electric motor 218 with a control signal from the CPU. As feedback from the second electric motor 218, signals representing the rotational speed (number of revolutions per unit time), rotational direction, current value, and the like are sent to the controllers 244, 246 and 248. An electrically-operated brake unit 260 is provided for applying a brake to the main drive wheel 214 (FIG. 31) on the left side in correspondence with the second electric motor 218, and is configured to receive control signals sent from the controllers 244, 246, and 248.

In response to braking of the main drive wheels 212 and 214 (FIG. 31), the first electric motor 216 and the second electric motor 218 act as electricity generators, and the generated electric power is stored in the power supply unit 236 via the electric power regeneration units 254 and 256. A charge monitoring system for monitoring the charging state of the power supply unit 236 is provided in correspondence to the power supply unit 236. Here, with respect to the first electric motor drive circuit 250 and the electric power regeneration unit 254, a circuit including an inverter can be designed to possess both functions. Likewise, with respect to the second electric motor drive circuit 252 and the electric power regeneration unit 256, a circuit including an inverter can be made to possess both functions.

The power supply unit 236 is a secondary battery that has a function of storing electrical energy and, as necessary, supplying electrical power to a load of the electric motors 216 and 218 and the like. A lead storage battery, lithium ion battery pack, nickel hydrogen battery pack, capacitor, or the like can be used as the power supply unit 236.

The power supply unit 236 can also receive a supply of charged energy from an external power supply separately to the electric power supply system from the engine 232 and the electricity generator 234. In FIG. 32, the phrase "AC 110V or other supply unit" indicates a system that receives a charged energy supply from an external power supply by a so-called "plug-in" method. Therefore, when the lawnmower vehicle 210 is not operating, the power supply unit 236 can be adequately charged using an external power supply, so that when performing lawn mowing work the lawnmower vehicle 210 can be operated using only the electric power of the power supply unit 236, without operating the engine 232.

A lawn mowing-related power source 238 is, for example, connected to the power supply unit 236 and has a function of rotationally driving a lawn mowing blade of the mower 220. The operation of the power source 238 is controlled by turning a mower starting switch 262 (see FIG. 32) provided near the driver's seat 226 on or off. More specifically, the controllers 244, 246, and 248 detect the on/off state of the mower starting switch 262 and, based on that detection, control the operations of driver for driving the power source 238 to activate or stop the power source 238.

In FIG. 32, although the two lever-type operating levers 228 and a steering wheel (handle) type or monolever-type steering operation section 264 are shown, these are shown together to facilitate the description, and the lawnmower vehicle 210 actually only comprises either one of these. In the example shown in FIG. 30 and FIG. 31, the two lever-type operating levers 228 are illustrated.

The operating levers 228 have a function of regulating the number of revolutions of the left and right main drive wheels 212 and 214 using two levers. For example, an operating lever 228 that regulates the number of revolutions of the main drive wheel 214 on the left is disposed on the left side of the driver's seat 226 and an operating lever 228 that regulates the number of revolutions of the main drive wheel 212 on the right is disposed on the right side of the driver's seat 226. Each of the operating levers 228 can be moved in the front and rear direction with respect to the driver's seat 226. The operation amount of each operating lever 228 is transmitted to the controllers 244, 246, and 248 using an operation amount sensor as an operation amount detection section, to thereby control the operation of the electric motors 216 and 218 that are connected to the left and right main drive wheels 212 and 214. As described below, the operations of electric motors for steering the caster wheels 222 and 224 (FIG. 31) are also controlled in correspondence with the operations of the electric motors 216 and 218.

Returning to FIG. 32, the controllers 244, 246, and 248 include a steering drive circuit (steering driver) 266 corresponding to electric motor drive unit for steering of the caster wheels 222 and 224 (FIG. 31). Control signals from the steering drive circuit 266 are input to right and left side steering actuators 268 and 270 that are steering power sources for steering the right and left caster wheels 222 and 224 at the front side to drive the respective steering actuators 268 and 270. According to the present embodiment, the right and left steering actuators 268 and 270 are respectively taken as an electric motor for steering.

Figure 33:
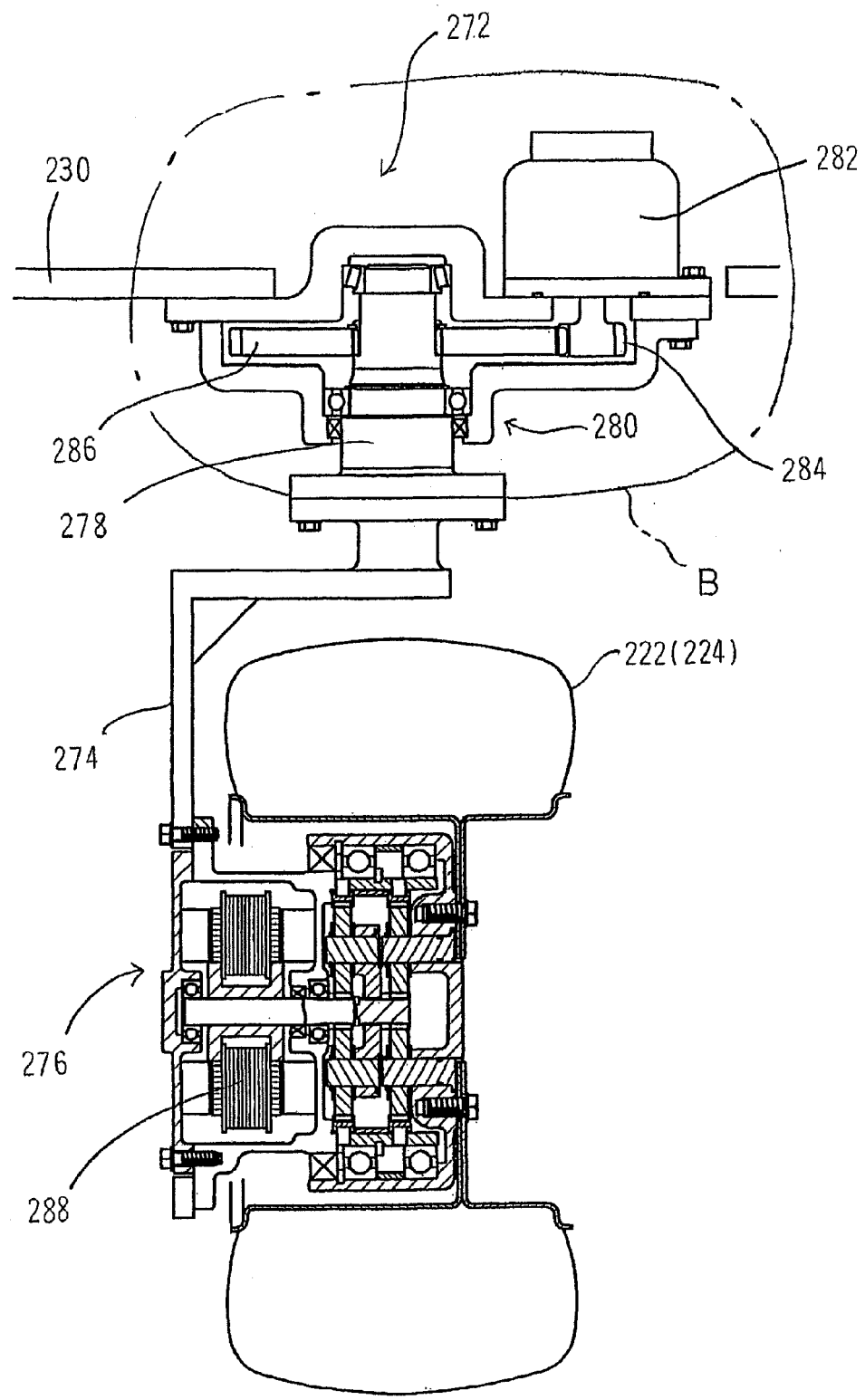
FIG. 33 is a cross sectional view showing one caster wheel and a driving device for steering according to the second embodiment.

FIG. 33 is a cross sectional view showing the caster wheel 222 (the same configuration applies for the caster wheel 224) and a driving device for steering 272 that corresponds to the caster wheel 222. The driving device for steering 272 comprises a support frame 274, a lower side support portion 276 that rotatably supports the caster wheel 222 to rotate around a rotary shaft in the horizontal direction with respect to the support frame 274, and an upper side support portion 280 that rotatably supports the support frame 274 with respect to the main frame 230 as far as a predetermined angle with 360 degrees or less around a support shaft 278 in the vertical direction as a steering axis. The case of an electric motor for steering 282 is fixed to the top side of the main frame 230, and a rotary shaft of the electric motor for steering 282 is disposed in the vertical direction. A pinion 284 is provided at the lower end of the rotary shaft of the electric motor for steering 282, and the pinion 284 and a gear wheel 286 that is fixed at a top portion of the support shaft 278 are caused to mesh together. As a result, when the electric motor for steering 282 drives upon receipt of a control signal from the steering drive circuit 266 shown in FIG. 32, the support frame 274 rotates at a predetermined angle around the center of the support shaft 278 via a gear mechanism comprising the pinion 284 and the gear wheel 286 to steer the caster wheel 222 in a predetermined direction. Here, instead of the electric motor for steering 282, it is possible to use a hydraulic actuator such as an oil hydraulic motor for steering.

In FIG. 33, an example is illustrated in which an electric motor 288 for driving the caster wheel 222 to travel is operatively coupled to the caster wheel 222, and the rotation of a rotary shaft of the electric motor 288 is decelerated by a planetary gear mechanism and transmitted to the caster wheel 222. In the case of the example illustrated here, electric motors 288 for driving the caster wheels 222 and 224 are forcefully driven in accordance with the driving of the electric motors 216 and 218 (FIG. 31) for driving the right and left main drive wheels 212 and 214 (FIG. 31). Further, in this case, one end of a current-carrying cable (not shown) is connected to the electric motor 288 and another end of the cable is connected to the controllers 244, 246, and 248 and the like that are fixed to the main frame 230. Furthermore, in this case, an unshown stopper for limiting the steering angle of the caster wheels 222 and 224 to a predetermined angle is provided between the main frame 230 and the support frame 274 or the like. As a result, excessive twisting of a cable that is connected to the electric motor 288 is prevented. Here, although in FIG. 33 the planetary gear mechanism is configured to perform deceleration in two stages, the planetary gear mechanism may be configured to perform deceleration in only one stage or to perform deceleration in three or more stages. Further, a configuration can also be adopted in which the rotary shaft of the electric motor 288 is fixed directly to the caster wheel without providing a planetary gear mechanism, to directly transmit the rotation of the rotary shaft to the caster wheel.

The present embodiment is not limited to a configuration in which electric motors 288 for driving the caster wheels 222 and 224 to travel are provided as described above, and a configuration can also be adopted in which the caster wheels 222 and 224 are freely rotated around a shaft in the horizontal direction.

Figure 34:
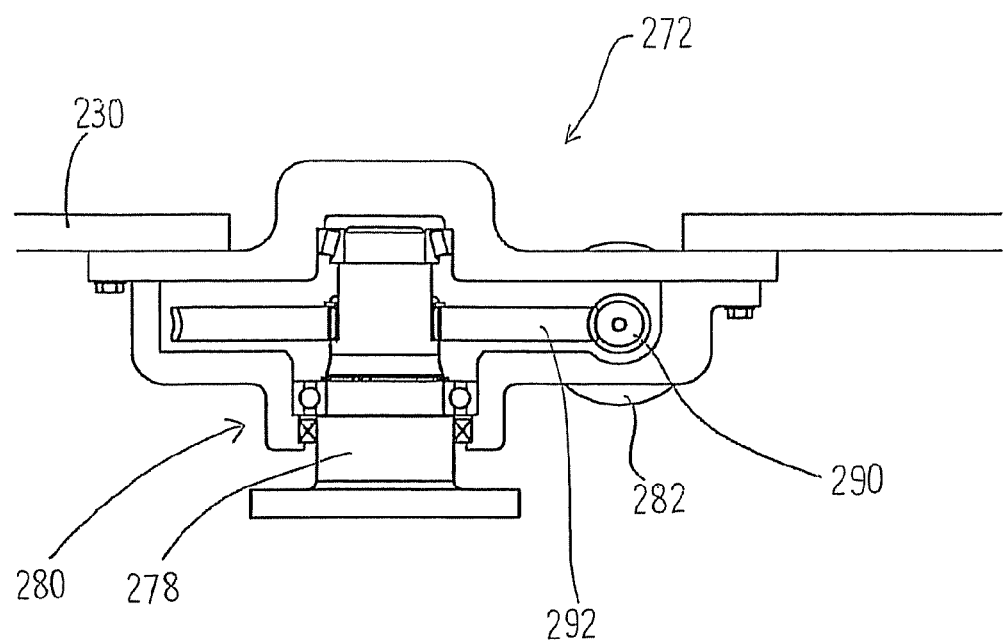
FIG. 34 is a cross sectional view corresponding to section B of FIG. 33 that shows another example of the driving device for steering according to the second embodiment.

FIG. 34 is a cross sectional view corresponding to a B portion of FIG. 33 that shows another example of the driving device for steering 272 of the caster wheels 222 and 224. As shown in FIG. 34, in the driving device for steering 272, the electric motor for steering 282 is disposed so as that the rotary shaft thereof faces in the horizontal direction, and a worm of a worm shaft 290 provided at the top end side of the rotary shaft and a worm wheel 292 fixed to the support shaft 278 can be caused to intermesh.

Returning to FIG. 33, between the top portion of the support shaft 278 and the main frame 230 is provided a rotation angle detection device (not shown) as a caster wheel direction detection section for detecting a rotation angle of the support shaft 278 and detecting a steering direction of the caster wheel 222 and 224. The rotation angle detection device includes an encoder that is fixed to the support shaft 278. The encoder, for example, is a device that has magnetic pole properties that alternately change in the circumferential direction of the support shaft 278 between a north pole direction and a south pole direction. A rotation angle sensor (not shown) is fixed to the main frame 230, opposite the encoder. Detection signals from the rotation angle sensor are input to the above described controllers 244, 246, and 248. The rotation angle detection device can also be configured from an encoder fixed to the top end portion of the rotary shaft of the electric motor for steering 282 and a rotation angle sensor fixed to the main frame 230.

Figure 35:
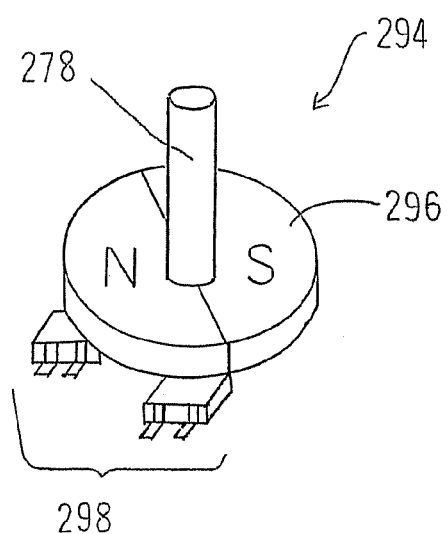
FIG. 35 is a schematic perspective illustration of another example of a rotation angle detection device provided in a caster wheel support portion according to the second embodiment.

FIG. 35 is a schematic perspective illustration that shows another example of a rotation angle detection device 294. As shown in FIG. 35, the rotation angle detection device 294 comprises an encoder 296 and a rotation angle sensor 298. The encoder 296 is provided in the shape of a disc that is fixed to the support shaft 278, with a north pole provided on one half portion in the circumferential direction and a south pole provided on the other half portion in the circumferential direction. The rotation angle sensor 298 is constituted by Hall elements that are provided at two positions with differing 90-degree phases that are fixed to the main frame 230 (see FIG. 33 etc.). According to this type of rotation angle detection device 294, accompanying rotation of the encoder 296, because output voltages based on signals from the two Hall elements form waveforms for which the phases are out of synch with each other by 90 degrees, the rotation angle of the support shaft 278 can be detected using the signals from the two Hall elements. Here, the polarization direction of the encoder 296 is not limited to polarization in the directions of the front side and back side of a disc as shown in FIG. 35, and it is also possible to polarize in the diametrical direction on the outer peripheral surface of the disc. Here, the Hall elements constituting the rotation angle sensor 298 are disposed so as to face each other in the diametrical direction of the encoder 296. A configuration can also be adopted in which two or more Hall elements are provided in a single package, and the single package is disposed to face the encoder 296 to form a rotation angle detection device.

The driving device for steering 272 (FIG. 33) that includes this type of rotation angle detection device is respectively provided in correspondence with the two caster wheels 222 and 224 on the right and left sides. Detection signals from the respective rotation angle detection devices are input into the controllers 244, 246, and 248 shown in the above described FIG. 32. In this connection, although in FIG. 32 an illustration representing a linear actuator is shown as an illustration corresponding to the right and left steering actuators 268 and 270, as described above, an electrically-driven actuator such as an electrically-driven plunger, a linear actuator such as a hydraulic actuator or a linear motor or the like can also be used as the steering actuator 268 and 270.

As shown in FIG. 32, the lawnmower vehicle 210 comprises a starter and a starter auxiliary relay for starting the engine 232. The starter is activated upon input of a start command signal from the controllers 244, 246, and 248 to the starter auxiliary relay, to thereby activate the engine 232. Electric power is supplied from the power supply unit 236 to the starter.

A signal from a mower ascent/descent position detection sensor 300 that represents the ascent/descent position of the mower 220 (see FIG. 30 and FIG. 31) is input to the controllers 244, 246, and 248, enabling the controllers 244, 246, and 248 to adjust the ascent/descent position of the mower 220. A seat switch 302 is provided that detects whether or not the driver is riding on the driver's seat. A signal from the seat switch 302 is input to the controllers 244, 246, and 248. In accordance with the signal from the seat switch 302, when the driver is not riding on the driver's seat the controllers 244, 246, and 248 control the mower 220 and the lawnmower vehicle 210 so as to stop the operations of the mower 220 and the lawnmower vehicle 210.

A slope sensor 304 is also provided in the lawnmower vehicle 210 to enable detection of a slope angle of the ground surface on which the lawnmower vehicle 210 is positioned i.e. a slope to horizontal plane angle of the lawnmower vehicle 210. A detection signal from the slope sensor 304 is input to the controllers 244, 246, and 248. Further, the amount of depression of the brake pedal can be detected by a brake pedal sensor 306. A detection signal from the brake pedal sensor 306 is also input to the controllers 244, 246, and 248. The operation state of a parking brake lever, that is, whether the lever is in an off state or an on state, can be detected by a parking brake sensor 308. A detection signal from the parking brake sensor 308 is also input to the controllers 244, 246, and 248. Further, an operation/display section 310 is provided in which a display section for displaying modes such as various travel modes and a mode function switch for implementing various modes or calling up functions are arranged together, and various errors are also displayed on the operation/display section 310. A signal from the mode function switch constituting the operation/display section 310 is input to the controllers 244, 246, and 248. The display section is made to display a predetermined state (for example, an error state) by a signal from the controllers 244, 246, and 248.

Figure 36A:
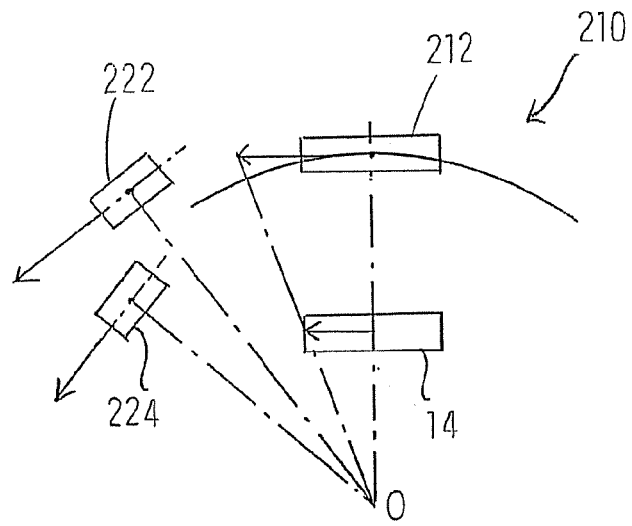
FIG. 36a is a schematic diagram illustrating a first example of a turn form according to the second embodiment.
Figure 36B:
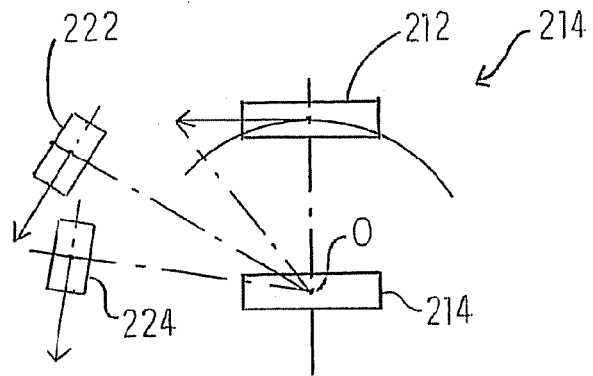
FIG. 36b is a schematic diagram illustrating a second example of a turn form according to the second embodiment.
Figure 36C:
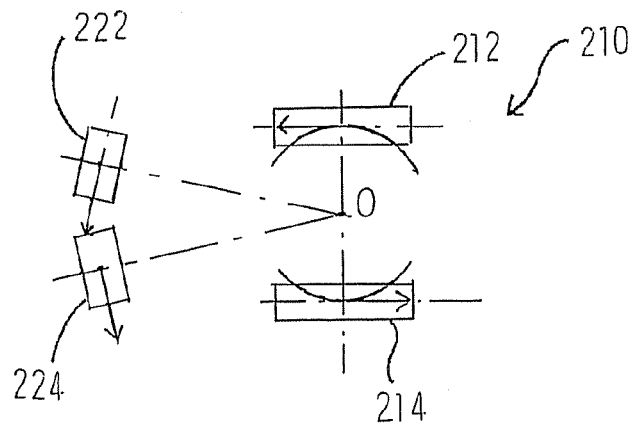
FIG. 36c is a schematic diagram illustrating a third example of a turn form according to the second embodiment.

The two electric motors 216 and 218 corresponding to the main drive wheels 212 and 214 (FIG. 31) and the electric motors for steering 282 (FIG. 33 and FIG. 34) corresponding to the right and left steering actuators 268 and 270 (FIG. 32) are configured to operate in response to a signal from an operation amount sensor that detects an operation amount of right and left operating levers 228 for performing turning and acceleration of the lawnmower vehicle 210. For example, three forms of turn traveling are schematically illustrated in FIGS. 36a, 36b, and 36c. By operating the right and left operating levers 228 (FIG. 30 and FIG. 32) to the front and rear, the electric motors 216 and 218 corresponding to the main drive wheels 212 and 214 drive to enable turning, acceleration, and deceleration or the like. The operating levers 228 enter in a released state, i.e. a neutral state, when they are positioned upright in the vertical direction. The electric motors 216 and 218 stop when the operating levers 228 are in this state. By tilting the operating levers 228 forward from this state the corresponding electric motors 216 and 218 rotate forward in the forward movement direction, and by tilting the operating levers 228 rearward the corresponding electric motors 216 and 218 rotate backward in the reverse movement direction. The number of revolutions per unit time of the electric motors 216 and 218 increases in accordance with the increase in the tilting amount of the operating levers 228. For example, by tilting the right operating lever 228 forward, the electric motor 216 corresponding to the main drive wheel 212 on the right side rotates forward, and by tilting the right operating lever 228 backward, the electric motor 216 corresponding to the main drive wheel 212 on the right side rotates backward. When the two operating levers 228 are tilted forward by the same amount the lawnmower vehicle 210 advances straight ahead. In this case, the two caster wheels 222 and 224 on the front side enter a state in which they face in a direction that is parallel with the main drive wheels 212 and 214.

In contrast, as shown in FIG. 36a, when causing the lawnmower vehicle 210 to make a gentle turn in the left direction, that is, when turning the lawnmower vehicle 210 to the left with a large curvature radius, although both of the operating levers 228 are tilted forward, the operating lever 228 on the right side is tilted more than the operating lever 228 on the left side. In a situation like this in which there is a difference in the tilting amount of the operating levers 228 on the right side and the left side, the two electric motors for steering 282 (FIG. 33 and FIG. 34) that respectively correspond to the two caster wheels 222 and 224 drive the caster wheels 222 and 224 to face in a predetermined direction.

In the case of the example shown in FIG. 36*a*, the controllers 244, 246, and 248 have a right and left wheel speed acquisition module, a turn center acquisition module, and a caster wheel steering angle acquisition module. The right and left wheel speed acquisition module determines and acquires the traveling speeds of the right and left main drive wheels 212 and 214 in accordance with the tilting amount of the operating levers 228. The turn center acquisition module determines and acquires a turn center O corresponding to the traveling speeds of the right and left main drive wheels 212 and 214 that are acquired. The caster wheel steering angle acquisition module determines and acquires the respective steering angles of the two caster wheels 222 and 224 that correspond to the position of the turn center O that is acquired. The first electric motor drive circuit 250, the second electric motor drive circuit 252, and the steering drive circuit 266 (FIG. 32) drive the right and left main drive wheels 212 and 214 to travel in accordance with the acquired right and left wheel speeds using the first electric motor 216 and the second electric motor 218. Further, the right and left caster wheels 222 and 224 are steered by the two electric motors for steering 282 in accordance with the acquired steering angle. More specifically, the two caster wheels 222 and 224 are steered so as to face in their respective circular tangential directions having the acquired turn center O.

FIG. 36*b* illustrates an example in which the lawnmower vehicle 210 is made to execute a pivot turn in the left direction, i.e. in which the lawnmower vehicle 210 is turned to the left in a state in which the turn center O is located at the ground-contact position of the main drive wheel 214 on the left side. In this case, although the right side operating lever 228 is tilted forward, the left side operating lever 228 is positioned in a neutral position in the upright state, i.e. a released state. In this case, the right and left wheel speed acquisition module determines and acquires the traveling speed of the main drive wheel 212 on the right side in accordance with the tilting amount of the operating lever 228. The turn center acquisition module determines and acquires, as the ground-contact position of the main drive wheel 214 on the left side, the position of the turn center O corresponding to the traveling speeds of the right and left main drive wheels 212 and 214 that are acquired. The caster wheel steering angle acquisition module determines and acquires the respective steering angles of the two caster wheels 222 and 224 that correspond to the position of the turn center O that is acquired. The first electric motor drive circuit 250 and the steering drive circuit 266 (FIG. 32) drive the main drive wheel 212 on the right side to travel in accordance with the speed of the right-side main drive wheel 212 that is acquired, using the first electric motor 216, and steer the right and left caster wheels 222 and 224 in accordance with the acquired steering angle using the two electric motors for steering 282. In this case also, the two caster wheels 222 and 224 are steered so as to face in their respective circular tangential directions having the acquired turn center O. Further, in this case, the speed of the main drive wheel 214 on the left side is zero.

FIG. 36*c* illustrates an example of causing the lawnmower vehicle 210 to execute a stationary turn (spin) in the left direction, i.e. causing the lawnmower vehicle 210 to turn to the left in a state in which the turn center O is located at a center position between the ground-contact positions of the right and left main drive wheels 212 and 214. In this case, although the right side operating lever 228 is tilted forward, the left side operating lever 228 is tilted backward by the same amount. In this case, the right and left wheel speed acquisition module determines and acquires the traveling speeds of the right and left main drive wheels 212 and 214 in accordance with the tilting amount of the operating levers 228. The right and left main drive wheels 212 and 214 rotate in opposite directions at the same speed. The turn center acquisition module determines and acquires the position of a turn center O corresponding to the traveling speeds of the right and left main drive wheels 212 and 214 that are acquired, as a center position between the ground-contact positions of the right and left main drive wheels 212 and 214. The caster wheel steering angle acquisition module determines and acquires the respective steering angles of the two caster wheels 222 and 224 that correspond to the position of the turn center O that is acquired. The first electric motor drive circuit 250, the second electric motor drive circuit 252, and the steering drive circuit 266 (FIG. 32) drive the right and left main drive wheels 212 and 214 to travel in accordance with the acquired right and left wheel speeds using the first electric motor 216 and the second electric motor 218. Further, the right and left caster wheels 222 and 224 are steered by the two electric motors for steering 282 in accordance with the acquired steering angle. In this case also, the two caster wheels 222 and 224 are steered so as to face in circular tangential directions having the acquired turn center O. In this connection, although in FIGS. 36*a*, 36*b*, and 36*c* examples are illustrated in which the lawnmower vehicle 210 is turned in the left direction, the situation is the same for a turn in the right direction, except that the operations for right and left are reversed.

Figures 37A, 37B:
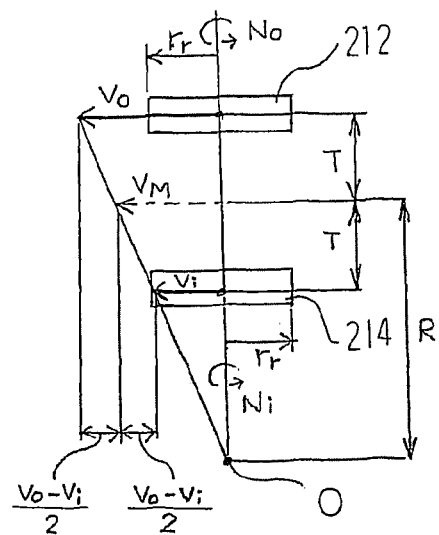
FIG. 37a is a view illustrating a state in which a turn center position is determined when speeds of the main drive wheels on the right and left sides are given according to the second embodiment.
FIG. 37b is a view illustrating determination of a turn center position when speeds of the main drive wheels on the right and left sides are given according to the second embodiment.

When steering the caster wheels 222 and 224 using the electric motors for steering 282 and also driving the caster wheels 222 and 224 using the electric motors 288 for caster wheel traveling (see FIG. 33), the steering angles and speeds of the caster wheels 222 and 224 can be determined in the following manner. FIG. 37*a* and FIG. 37*b* are views that illustrate the manner in which a turn center position when speeds of the right and left main drive wheels 212 and 214 are applied. FIG. 37*a* is a view corresponding to FIG. 36*a* that shows the disposition of the main drive wheels 212 and 214 and the turn center position O that is to be determined hereafter. In the illustrated example, the main drive wheel 212 is shown as the outside wheel with respect to the turn and the ground speed thereof is indicated as $V_o$, while the main drive wheel 214 is shown as the inside wheel and the ground speed thereof is indicated as $V_i$. Further, a ground speed $V_M$ at exactly an intermediate position between the main drive wheels 212 and 214 on the axle of the main drive wheels 212 and 214 corresponds to the mean traveling speed, and is given by $V_M=(V_o+V_i)/2$. Here, a function that determines and acquires the mean traveling speed is executed by a turn center position acquisition module of the controllers 244, 246, and 248 (FIG. 32). However, there are cases where only this section, in particular, is extracted and utilized. More specifically, the mean traveling speed acquisition module can also be executed as one function of the controllers 244, 246, and 248.

Further, a main drive wheel tread that is the space between the main drive wheels 212 and 214 is denoted as 2T, and the radius of the main drive wheels 212 and 214 is denoted as $r_r$. Accordingly, a number of revolutions per unit time $N_o$ around the axle of the main drive wheel 212 is given by $V_o/r_r$, and a number of revolutions per unit $N_i$ around the axle of the main drive wheel 214 is given by $V_i/r_r$.

FIG. 37*b* is a view that shows the calculation process that determines the turn center position O using the above described symbols. In this case, the turn center position O is represented by a distance R from exactly an intermediate position between the main drive wheels 212 and 214 on the axle of the main drive wheels 212 and 214. As shown in FIG. 37b, the turn center position can be represented by R=T×{($N_o$−$N_i$)/($N_o$−$N_i$)}. Accordingly, if T is decided based on the configuration of the lawnmower vehicle 210, the turn center position R can be determined based on the number of revolutions $N_o$ and $N_i$ corresponding to the speeds $V_o$ and $V_i$ of the main drive wheels 212 and 214.

Next the speeds of the caster wheels are determined and acquired based on the speeds of the right and left main drive wheels 212 and 214 and the turn center O position. This function is executed by a caster wheel speed acquisition module of the controllers 244, 246, and 248.

FIG. 38a, FIG. 38b, and FIG. 39 are views illustrating the manner in which speeds of the caster wheels 222 and 224 are determined using the turn center position O that is determined in FIG. 37a and FIG. 37b. The reference numerals used in FIG. 37a and FIG. 37b are used for the following description. FIG. 38a is a view that corresponds to FIG. 36a and FIG. 37a, and shows the disposition of the main drive wheels 212 and 214, the disposition of the caster wheels 222 and 224, and the turn center position O. In this case, with respect to the speeds of the caster wheels 222 and 224 that are to be determined hereafter, a ground speed of the caster wheel 222 that is on the outer side when viewed from the turn center position O is denoted by $V_{Fo}$, and the ground speed of the caster wheel 224 on the inner side is denoted by $V_{Fi}$.

Further, a caster wheel tread that is the space between the caster wheels 222 and 224 is denoted as 2t, a wheel base length that is the distance between the intermediate position of the main drive wheels 212 and 214 and the intermediate position of the caster wheels 222 and 224 is denoted as W, and the radius of the caster wheels 222 and 224 is denoted as $r_f$. Accordingly, a number of revolutions per unit time (rotational speed) $N_{Fo}$ around the axle of the caster wheel 222 is given by $V_{Fo}/r_f$ and a number of revolutions per unit time $N_{Fi}$ around the axle of the caster wheel 224 is given by $V_{Fi}/r_f$.

Further, a steering angle around the turn center O of the caster wheels 222 and 224 is determined as follows. More specifically, the axle direction of the respective caster wheels 222 and 224 is the direction of a straight line that joins the ground-contact position of each of the caster wheels 222 and 224 with the turn center position O. Accordingly, angles between these straight line directions and the axle directions of the main drive wheels 212 and 214 are the steering angles of the caster wheels 222 and 224, respectively, and in FIG. 38a these angles are denoted as $\theta_o$ and $\theta_i$, respectively. Further, the distances between the ground-contact positions of the respective caster wheels 222 and 224 and the turn center position O are denoted as $R_o$ and $R_i$, respectively.

FIG. 38b is a view illustrating a calculation process that determines the steering angles $\theta_o$ and $\theta_i$ of the respective caster wheels 222 and 224 using the above described symbols. In this case, $R_o$ and $R_i$ that correspond to the turning radius of the respective caster wheels 222 and 224 are determined based on R that is determined as described above in FIG. 37, the wheel base length W, and t that is ½ of the caster wheel tread. FIG. 38b illustrates the method of determining the steering angles $\theta_o$ and $\theta_i$ based on the relationship of these values and R. In this case, $R_o$ and $R_i$ are given by the distance between the turn center position O and the ground-contact positions of the respective caster wheels 222 and 224.

FIG. 39 is a view illustrating a process for determining the speeds $V_{Fo}$ and $V_{Fi}$ of the caster wheels 222 and 224 that correspond to the mean traveling speed $V_M$ of the main drive wheels 212 and 214. Because each component of the lawnmower vehicle 210 turns at the same angular speed around the turn center position O, the ground speeds differ in proportion to the distance from the turn center position O. Accordingly, the ratio between the speed $V_{Fo}$ of the caster wheel 222 and the mean traveling speed $V_M$ of the main drive wheels 212 and 214 is the ratio between the distance $R_o$ from the turn center position O to the ground-contact position of the caster wheel 222 and the distance R from the turn center position O to the intermediate position between the main drive wheels 212 and 214. Because R can be determined based on FIG. 37a and FIG. 37b and $R_o$ can be determined with FIG. 38b, the speed $V_{Fo}$ of the caster wheel 222 and a rotational speed $N_{Fo}$ corresponding thereto can be determined as shown in FIG. 39.

In FIG. 39, because R that indicates the turn center position O is rewritten with the rotational speeds $N_o$ and $N_i$ of the right and left main drive wheels 212 and 214, ultimately the number of revolutions $N_{Fo}$ of the caster wheel 222 can be determined based on the number of revolutions $N_o$ and $N_i$ of the right and left main drive wheels 212 and 214 and the wheel base length W, the main drive wheel tread 2T, the caster wheel tread 2t, the main drive wheel radius $r_r$, and the caster wheel radius $r_f$ that are decided according to the configuration of the lawnmower vehicle 210. Likewise, the number of revolutions $N_{Fi}$ of the caster wheel 224 can be determined based on the number of revolutions $N_o$ and $N_i$ of the right and left main drive wheels 212 and 214 and W, T, t, $r_r$, and $r_f$ that are decided according to the configuration of the lawnmower vehicle 210.

As described using FIG. 37a and FIG. 37b to FIG. 39, if the speeds or number of revolutions of the right and left main drive wheels 212 and 214 are provided, the turn center position R, the speeds or number of revolutions of the caster wheels 222 and 224, and the steering angles $\theta_o$ and $\theta_i$ can be determined using W, T, t, $r_r$, and $r_f$ that are decided according to the configuration of the riding lawnmower vehicle 210. Accordingly, by storing W, T, t, $r_r$, and $r_f$ that are already known and the formulas described using FIG. 37a and FIG. 37b to FIG. 39 in a memory section of the controllers 244, 246, and 248 and then applying the number of revolutions of the right and left main drive wheels 212 and 214, the steps of acquiring the turn center position and the steps of acquiring the speeds and the steering angles of the caster wheels 222 and 224 can be easily executed.

Further, in the present embodiment, the controllers 244, 246, and 248 comprise a switching module as switching unit. The switching module enables switching to either a forced steering mode in which the two caster wheels 222 and 224 are forcibly steered by the two electric motors for steering 282 (see FIG. 33 and FIG. 34) or a free steering mode that stops power generation of the two electric motors for steering 282 to enable free steering of the caster wheels 222 and 224. More specifically, to implement the free steering mode, the switching module stops the electric power supply to the electric motors for steering 282 and stops driving of the electric motors for steering 282. Further, the switching module receives detection signals that are respectively input from an operation amount sensor that detects the operation amount of the right and left operating levers 228 that are operated by the driver and the rotation angle detection device 294 (see FIG. 35 etc.) that detects the steering directions of the caster wheels 222 and 224. When the direction of the caster wheels 222 and 224 corresponding to the detection signal from the operation amount detection section and the direction of the caster wheels 222 and 224 corresponding to the detection signal from the rotation angle detection device 294 are different, the switching module switches from the free steering mode to the forced steering mode.

Figure 40:
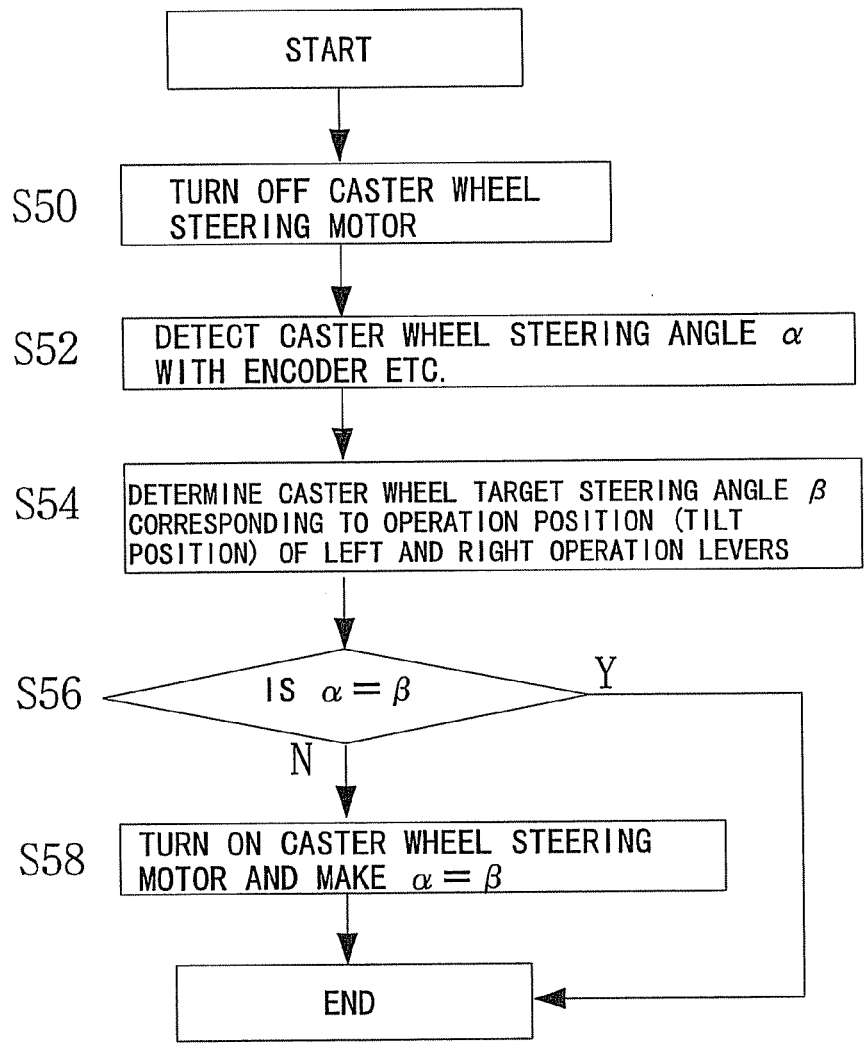
FIG. 40 is a flowchart illustrating a method of switching from a free steering mode to a forced steering mode using switching unit according to the second embodiment.

The lawnmower vehicle 210 as the riding lawnmower of the present embodiment that comprises this type of switching module switches the electric motors for steering 282 from a stopped state to a drive state in the following manner. FIG. 40 is a flowchart illustrating a method of switching the driving of the electric motors for steering 282. First, at step S50 in FIG. 40, the driving of the electric motors for steering 282 is stopped (turned off). More specifically, in the free steering mode state, at step S52, the respective current steering angles α of the caster wheels 222 and 224 are detected by the encoder 296 (see FIG. 35 etc.) or the like constituting the rotation angle detection device 294.

Subsequently, in step S54, the switching module determines and acquires the target steering angles β of the caster wheels 222 and 224 that correspond to the operation positions, i.e. the tilt positions, of the right and left operating levers 228. Next, at step S56, the switching module compares the acquired target steering angles β with the current steering angles α of the caster wheels 222 and 224 that are detected. When the target steering angles β and the detected steering angles α match, the switching module maintains the electric motors for steering 282 in a stopped state. When the target steering angles β and the detected steering angles α do not match, the switching module applies power to the electric motors for steering 282 to drive (turn on) the electric motors for steering 282 and switch them from a stopped state to a driving state. More specifically, the switching module switches from the free steering mode to the forced steering mode. The switching module then controls the electric motors for steering 282 so that the target steering angles β and the detected steering angles α match.

In this connection, this acquisition of the target steering angle β and detection of the steering angle α are performed for the right and left caster wheels 222 and 224, respectively, and in accordance with results obtained by the respective comparisons, the switching module determines whether or not to switch the respective electric motors for steering 282 that correspond to the respective caster wheels 222 and 224 from a stopped state to a driving state. More specifically, according to the present embodiment, in the forced steering mode in which the right and left two caster wheels 222 and 224 are forcibly steered by the electric motors for steering 282, the two caster wheels 222 and 224 can be forcibly steered by the electric motors for steering 282 independently from each other in accordance with the operation of the operating levers 228. Further, switching of the switching module can also be performed manually by the driver, by operating an operation section such as a switch.

According to the present embodiment, a switching module is provided that performs switching to either a forced steering mode in which the caster wheels 222 and 224 are forcibly steered by the electric motors for steering 282 or a free steering mode that stops power generation of the electric motors for steering 282 to enable free steering of the caster wheels 222 and 224. Therefore, when traveling on a sloping surface, in a case where the target steering angles β and the detected steering angles α do not match, the switching module switches to the forced steering mode to prevent undesirable situations, such as the caster wheels 222 and 224 facing downward to a greater extent than desired by the driver. More specifically, the lawnmower vehicle 210 can be accurately advances in the direction desired by the driver. Further, because the driver can manually operate an operation section to switch to the free traveling mode when the forced steering mode is not required, such as when traveling at a high speed, the loads applied to the electric motors for steering 282 are decreased, making it possible to reduce the sizes of the electric motors for steering 282. Further, because the caster wheels 222 and 224 are employed as steering control wheels, the degree of freedom with turning the lawnmower vehicle 210 is improved. For example, the turning radius at the time of a turn is made sufficiently small, and a sharp turn such as a stationary turn can be easily performed.

Further, when a configuration is adopted according to the present embodiment so that the caster wheels 222 and 224 are driven by electric motors 288 for traveling (see FIG. 33 etc.) in the forced steering mode, in a case in which the target steering angles β and the detected steering angles α do not match when traveling on a sloping surface, by switching to the forced steering mode it is possible to more effectively prevent occurrence of a disadvantage such as the caster wheels 222 and 224 facing in a downward direction to a greater extent than desired by the driver. Here, a decision as to whether or not to switch from the free steering mode to the forced steering mode can be made so that, even in a case when there is a difference between the target steering angles β and the steering angles α, switching is performed only when the difference exceeds an allowable percentage, such as, for example, 5% or the like.

According to the present embodiment, although a configuration is adopted in which, to implement the free steering mode, the electric power supply to the electric motors for steering 282 is stopped and the driving of the electric motors for steering 282, i.e. power generation, is stopped, in order to implement the free steering mode it is also possible to cut off the transmission of power for steering from the two electric motors for steering 282 to the two caster wheels 222 and 224. For example, a clutch mechanism can be provided in a power transmission section between the electric motors for steering 282 and the drive section of the caster wheels 222 and 224 so that the transmission of power for steering can be cut off or connected by disconnecting or connecting the clutch mechanism.

Furthermore, according to the present embodiment, although a configuration is adopted in which acceleration, deceleration, and turning of the lawnmower vehicle 210 can each be performed using the right and left operating levers 228, as shown in FIG. 32 the lawnmower vehicle 210 can also be configured so that a turn can be executed using the steering operation section 264 or the like, such as a steering wheel. In this case, for example, a detection signal from a rotation angle sensor that detects a rotation angle of the steering wheel is input to the controllers 244, 246, and 248. Further, a forward movement accelerator pedal and a reverse movement accelerator pedal are provided on the underside of the driver's seat 226 (FIG. 30), so that the vehicle can be made to accelerate to the forward travel side or the reverse travel side by depressing the respective accelerator pedal. A detection signal from a forward travel side depression amount detection sensor that detects a depression amount of the forward movement accelerator pedal and a detection signal from a reverse travel side depression amount detection sensor that detects a depression amount of the reverse movement accelerator pedal are input to the controllers 244, 246, and 248. In accordance with the detection signals from the two depression amount detection sensors, the electric motors 216 and 218 for driving the main drive wheels 212 and 214 are rotationally driven in a forward rotation direction or a reverse rotation direction. Further, in accordance with a detection signal from a steering wheel rotation angle detection sensor, the electric motors 282 (FIG. 33 and FIG. 34) for steering the caster wheels 222 and 224 are driven to steer the two caster wheels 222 and 224 in a predetermined direction corresponding to the turning direction.

Further, in FIG. 32, when driving the two caster wheels 222 and 224 with the electric motors 288 for traveling (see FIG. 33 etc.), as configurations for driving the two caster wheels 222 and 224, a configuration corresponding to the first electric motor drive circuit 250, the second electric motor drive circuit 252, and the electric power regeneration unit 254 for the first electric motor 216 and the electric power regeneration unit 256 for the second electric motor 218 and a configuration corresponding to the first electric motor 216 and the second electric motor 218 as well as the brake units 258 and 260 corresponding to the respective electric motors 216 and 218 are separately provided.

[Third Embodiment]

Figure 41:
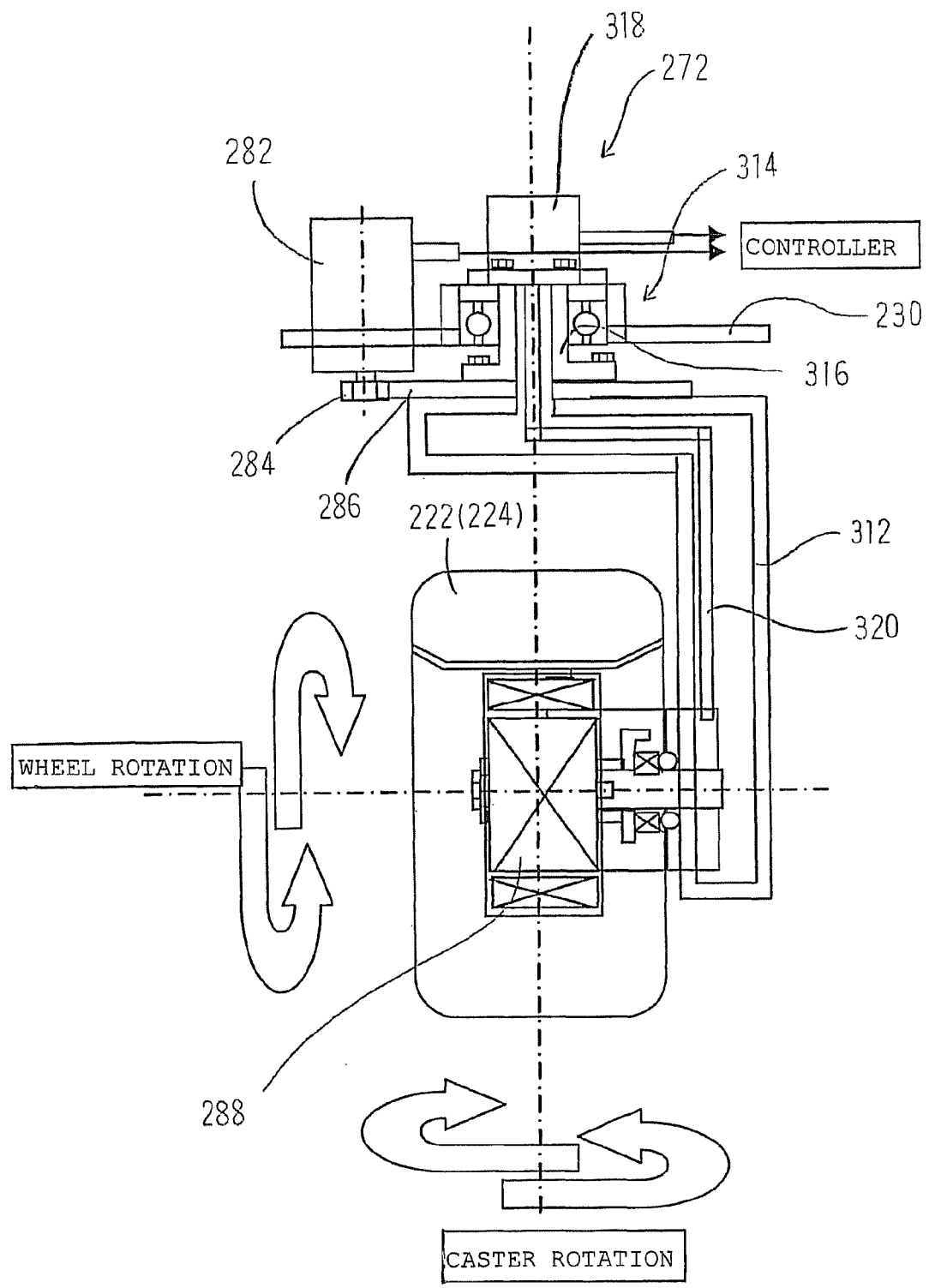
FIG. 41 is a view illustrating a third embodiment according to the present invention, and shows a schematic cross sectional view that corresponds to FIG. 33.

FIG. 41 is a schematic cross sectional view, corresponding to the above described FIG. 33, according to a third embodiment of the present invention. In the present embodiment, with respect to the forced steering mode that forcibly steers at least the caster wheels 222 and 224 using the electric motors for steering 282 according to the above described second embodiment, a configuration is adopted in which the two caster wheels 222 and 224 are driven by electric motors 288 that are power sources for traveling. Further, a support housing 312 that supports the caster wheels 222 and 224 is supported in a condition in which it can freely rotate at an angle exceeding 360 degrees around a shaft in the vertical direction by an upper side support portion 314. More specifically, the upper side support portion 314 comprises a tube portion 316 that is rotatably supported around a shaft in the vertical direction by bearings with respect to the main frame 230, a gear wheel 286 that is fixed to the tube portion 316, and the support housing 312. Further, a slip ring 318 is supported that receives control signals from the controllers 244, 246, and 248 (see FIG. 32) on the main frame 230, and a cable 320 that leads out from the underside of the slip ring 318 passes through the inside of the support housing 312 to connect to the electric motors 288 for driving the caster wheels 222 and 224 to travel.

As a result, twisting of the cable 320 can be more effectively prevented, irrespective of rotation around a shaft in the vertical direction of the caster wheels 222 and 224. In the present embodiment, it is not necessary to provide a stopper for restricting an angle with respect to steering of the caster wheels 222 and 224 to a predetermined angle. Because the remaining configuration and actions are the same as in the above described second embodiment, the same reference numerals are assigned to equivalent portions and their description is not repeated.

[Fourth Embodiment]

Figure 42:
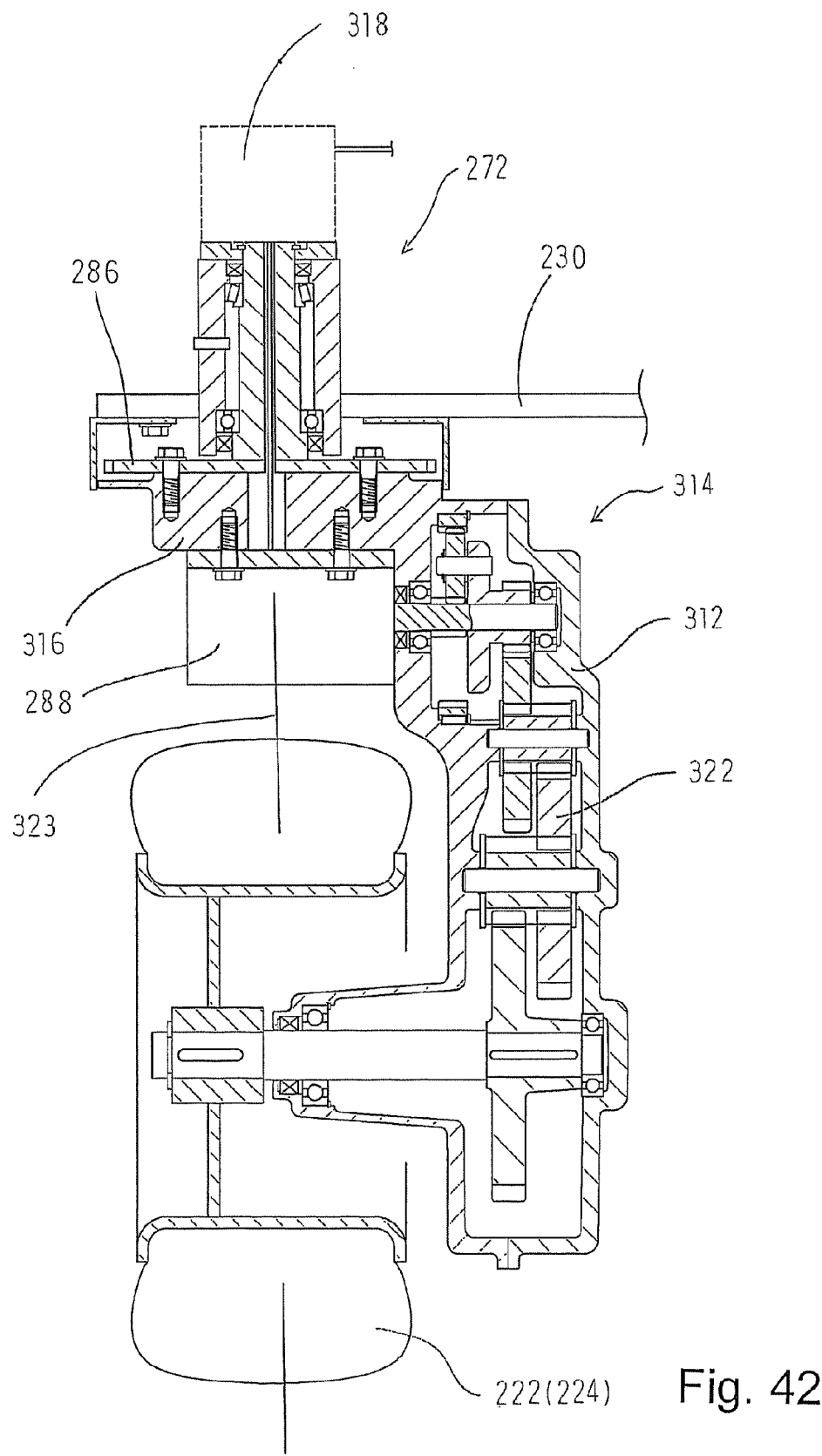
FIG. 42 is a view illustrating a fourth embodiment described herein, and shows a cross section that corresponds to FIG. 33.

FIG. 42 is a view that illustrates a fourth embodiment of the present invention. In the present embodiment, electric motors 288 for driving the caster wheels 222 and 224 to travel are disposed on a portion positioned away from the caster wheels on the upper side of the caster wheels 222 and 224. More specifically, each electric motor 288 is fixed together with the gear wheel 286 to the tube portion 316 that is supported in a manner in which it can rotate around axis in the vertical direction with respect to the main frame 230. The configuration is such that rotation of rotary shafts of the electric motors 288 is transmitted to the caster wheels 222 and 224 through a gear mechanism 322 that comprises a plurality of spur gears. The plurality of spur gears constituting the gear mechanism 322 are also configured to rotate together with the electric motor 288 and the gear wheel 286 accompanying rotation around the steering axis 323 as the pivot of the caster wheels 222 and 224 that is axis in the vertical direction. Further, a pinion that is fixed to a rotary shaft of an electric motor for turning the caster wheels 222 and 224 (not shown) is meshed with the gear wheel 286. Here, FIG. 42 illustrates a state in which the steering axis 323 and the tire center of the caster wheels 222 and 224 are matching. By adopting this configuration it is possible to reduce resistance to steering (steering resistance). Because the remaining configuration and actions are the same as in the above described second embodiment illustrated from FIG. 30 to FIG. 40 or the above described third embodiment illustrated in FIG. 41, the same reference numerals are assigned to equivalent portions and a duplicate illustration and description thereof is omitted.

[Fifth Embodiment]

Figure 43:
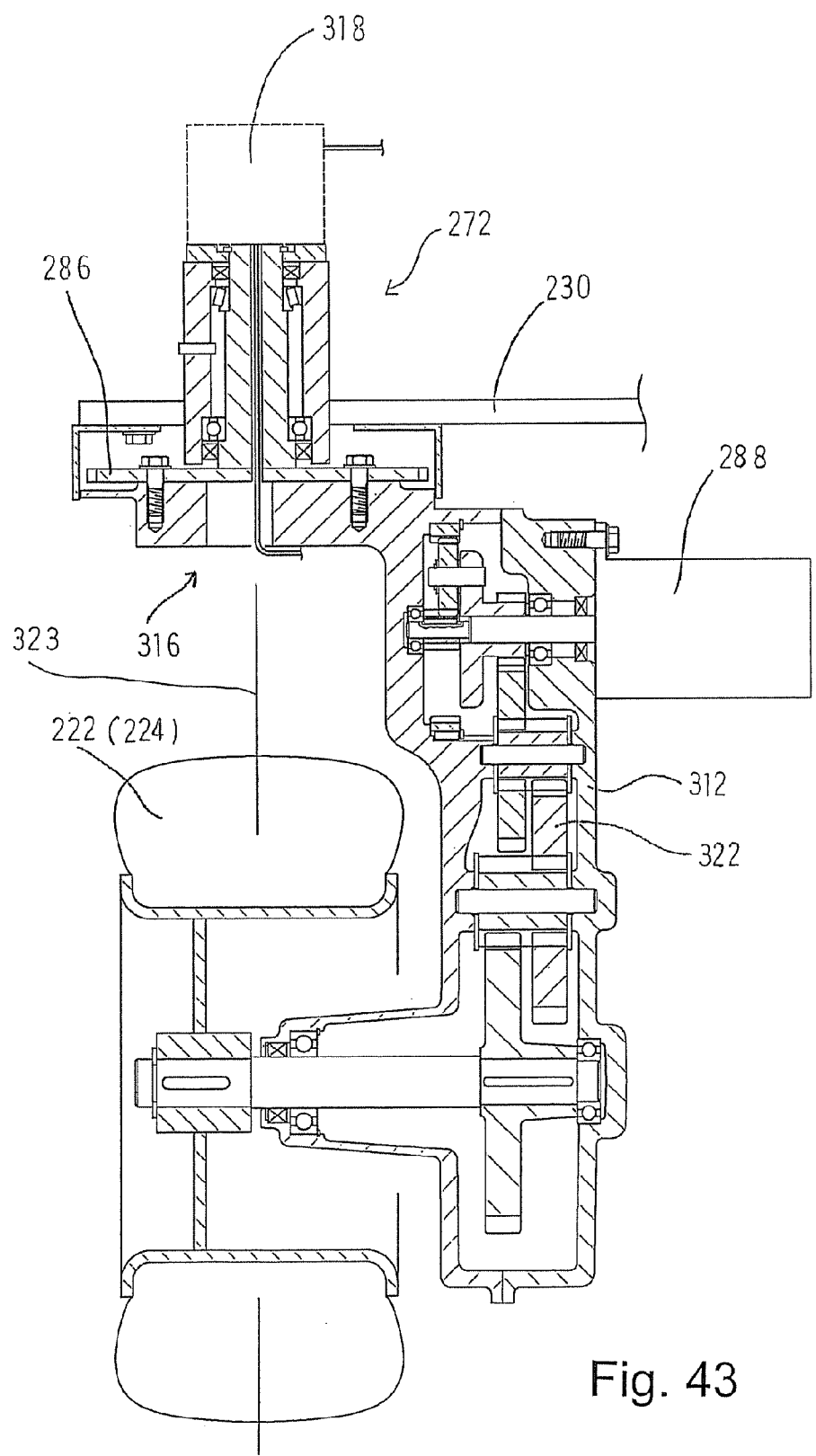
FIG. 43 is a view illustrating a fifth embodiment described herein, and shows a cross section that corresponds to FIG. 33.

FIG. 43 is a view illustrating a fifth embodiment of the present invention. In the present embodiment, the configuration adopted in the above described fourth embodiment illustrated in FIG. 42 is modified such that the electric motors 288 for driving the caster wheels 222 and 224 to travel are attached in the opposite direction in the right to left direction of FIG. 43 in relation to the gear mechanism 322. The remaining configuration and actions are the same as in the fourth embodiment illustrated in FIG. 42. In FIG. 43 also, similarly to FIG. 42, a state is shown in which the steering axis 323 and the tire center of caster wheels 222 and 224 match.

[Sixth Embodiment]

Figure 44:
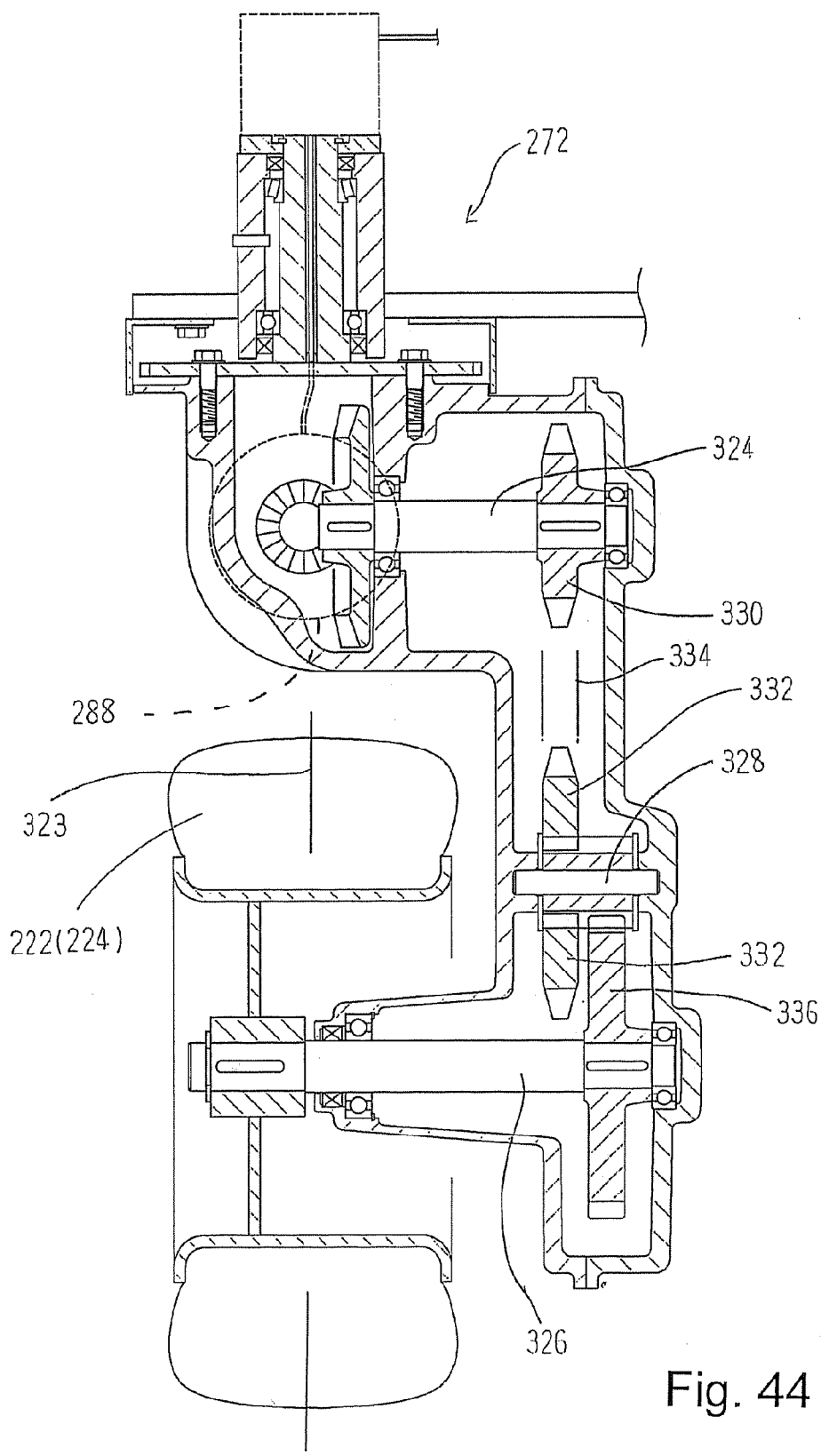
FIG. 44 is a view illustrating a sixth embodiment described herein, and shows a cross section that corresponds to FIG. 33.
Figure 45:
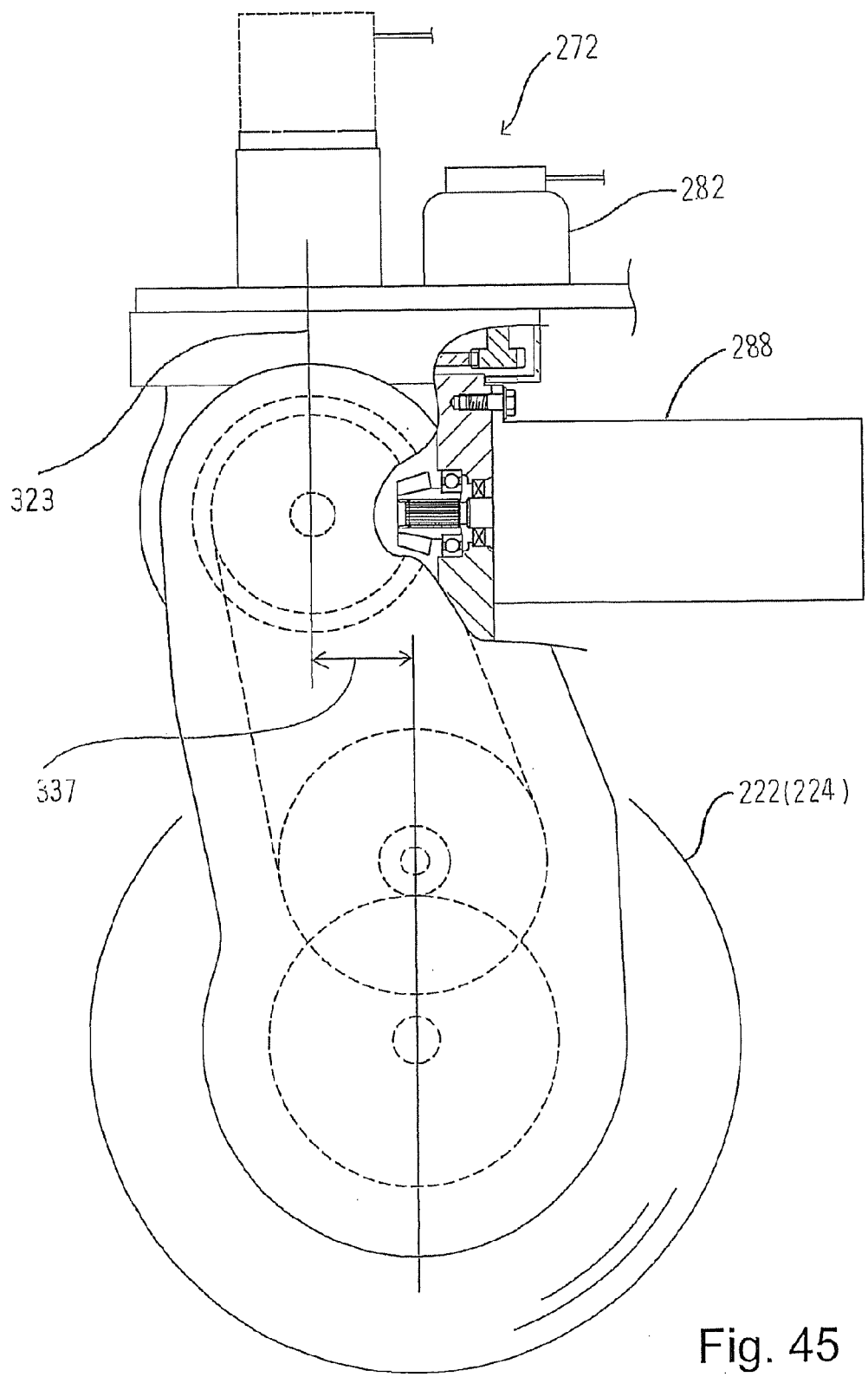
FIG. 45 is a view illustrating a sectional view of one portion of FIG. 44 when

FIG. 44 and FIG. 45 are views illustrating a sixth embodiment of the present invention. FIG. 44 is a cross section corresponding to FIG. 33, and FIG. 45 is a view showing a cross section of one portion of FIG. 44 as viewed from the right side to the left side of FIG. 44. In the present embodiment, the configuration of the above described fourth embodiment illustrated in FIG. 42 is modified such that the electric motors 288 for driving the caster wheels 222 and 224 are provided in positions that are rotated 90 degrees when taking axis in the vertical direction as a center, and an upper side rotary shaft 324 is operatively coupled to a rotary shaft of the electric motors 288 by a bevel gear mechanism. An intermediate rotary shaft 328 is disposed between the upper side rotary shaft 324 and the lower side rotary shaft 326 that is fixed to the caster wheels 222 and 224, and a chain 334 is suspended between a driving side gear 330 that is fixed to the upper side rotary shaft 324 and a driven side gear 332 that is fixed to the intermediate rotary shaft 328. The intermediate rotary shaft 328 and the lower side rotary shaft 326 are operatively coupled by a spur gear mechanism 336. As a result, the rotary shafts of the electric motors 288 and the lower side rotary shafts 326 that are fixed to the caster wheels 222 and 224 are operatively coupled. Further, although in FIG. 44, similarly to FIG. 42 and FIG. 43, a state is shown in which the steering axis 323 and the tire center of the caster wheels 222 and 224 match, in FIG. 45 it is shown that an offset is provided between the steering axis 323 and the tire center of the caster wheels 222 and 224. This offset is referred to as a caster trail 337, and provision of this caster trail 337 facilitates determination of a steering angle corresponding to the traveling of the main drive wheels when the steering is in a free rotating state. The remaining configuration and actions are the same as in the above described fourth embodiment illustrated in FIG. 42.

[Seventh Embodiment]

Figure 46:
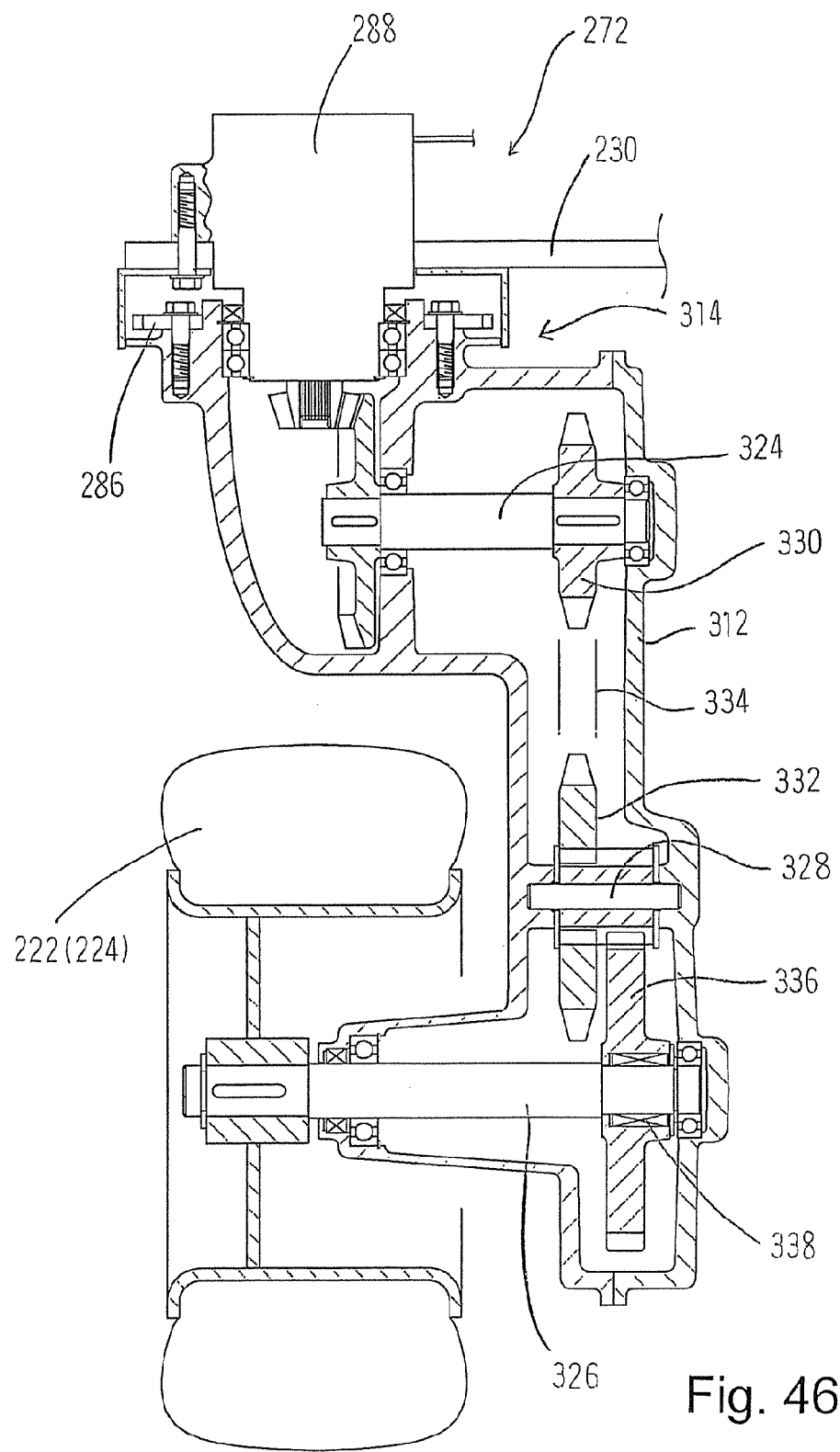
FIG. 46 is a view illustrating a seventh embodiment according to the present invention, and shows a cross section that corresponds to FIG. 33.

FIG. 46 is a view illustrating a seventh embodiment of the present invention. In the present embodiment, the configuration described above for the sixth embodiment illustrated in the FIG. 44 and FIG. 45 is modified such that a case of the electric motors 288 for driving the caster wheels 222 and 224 to travel is fixed in the vertical direction with respect to the main frame 230. At the periphery of the lower side of the case of the electric motor 288, the upper part of the support housing 312 is supported together with the gear wheel 286 in a condition in which it can rotate around axis in the vertical direction. Further, the rotary shaft of the electric motor 288 and the upper side rotary shaft 324 are operatively coupled by a bevel gear mechanism. Further, in the periphery of one end (right end in FIG. 46) of the lower side rotary shaft 326, a spur gear comprising the spur gear mechanism 336 is supported through a one way clutch 338. Thus, when the number of revolutions of the electric motor 288 per unit time becomes lower than a predetermined ratio with respect to the vehicle speed, i.e. the rotational speed of the caster wheels 222 and 224, that is, when the rotational speed of the spur gear that is fixed to each of the caster wheels 222 and 224 tends to become slower than the rotational speed of the caster wheels 222 and 224, the transmission of power from the electric motor 288 to the lower side rotary shaft 326 is cut off to suppress the occurrence of a state in which the electric motors 288 act as a resistance to the rotation of the caster wheels 222 and 224. The remaining configuration and actions are the same as in the above described sixth embodiment illustrated in FIG. 44 to FIG. 45.

[Eighth Embodiment]

Figure 47:
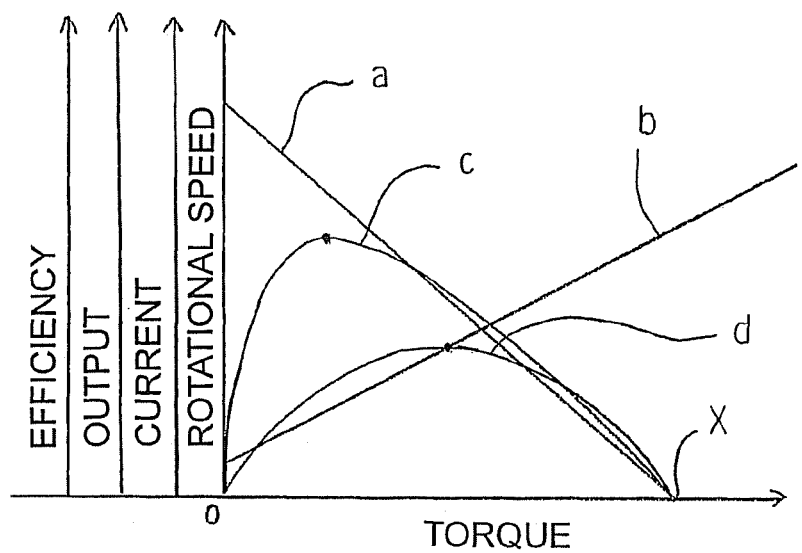
FIG. 47 is a characteristic line view of an electric motor for main drive wheel driving that is used in an eighth embodiment described herein.

FIG. 47 is a view that shows a characteristic line diagram of the first electric motor 216 and the second electric motor 218 (see FIG. 31 etc.) for driving the main drive wheels 212 and 214 that are used in an eighth embodiment of the present invention. Here, because the basic configuration of the lawnmower vehicle is the same as in the above described second embodiment illustrated in FIG. 30 to FIG. 40, the same reference numerals are assigned to equivalent portions in the following description. In the present embodiment, the configuration of the above described second embodiment is modified such that the controllers 244, 246, and 248 comprise an electric motor control module as electric motor control unit. When the lawnmower vehicle 210 is stopped on a sloping surface, the electric motor control module controls the electric motors 216 and 218 so as to generate torque, i.e. starting torque, when the number of revolutions of the electric motors 216 and 218 per unit time is near 0, to perform control that prevents the vehicle from slipping downward and the like. More specifically, in the aforementioned second embodiment, when the vehicle is positioned on a sloping surface, in a state in which the parking brake is released and the brake pedal is not depressed, there is a tendency for the lawnmower vehicle 210 to slip downward along the sloping surface due to its own weight.

In contrast, according to the present embodiment, DC brushless motors are used as the electric motors 216 and 218 and, further, the slope angle of a sloping surface on which the lawnmower vehicle 210 is positioned is detected by the slope sensor 304 (see FIG. 32) to perform control such that the starting torque increases in accordance with the detected slope angle in comparison to a case in which the lawnmower vehicle 210 is positioned on a horizontal surface. More specifically, for a case in which the electric motors 216 and 218 are DC brushless motors, FIG. 47 represents the relationship between the rotational speeds of the electric motors 216 and 218 and the torque with a solid line a, and represents the relationship between the current of the electric motors 216 and 218 and the torque with a solid line b. Further, FIG. 47 represents the relationship between the output of the electric motors 216 and 218 and the torque with a solid line c, and represents the relationship between the efficiency of the electric motors 216 and 218 and the torque with a solid line d. Furthermore, a mean starting torque $T_0$ (Nm) that takes into consideration a ripple when the rotational speed is 0 is obtained by the following formula:

$$T_0 = (Vs/Ra) \times Kt - Td \tag{1}$$

Here, Vs denotes a voltage (V) applied to the electric motors 216 and 218, and Ra denotes wire-wound resistance (Ω). Further, Kt denotes a torque constant (Nm/A), and Td denotes no-load loss (Nm). In this case, when the no-load loss is sufficiently small, relatively, the starting torque $T_0$ becomes proportionate to the voltage. Accordingly, by controlling the size of a voltage to be applied to the electric motors 216 and 218, the starting torque of the electric motors 216 and 218 can be controlled. More specifically, by reducing the resistance of a variable resistor connected to the electric motors 216 and 218 in order to increase the voltage to be applied to the electric motors 216 and 218, for example, the starting torque can be shifted further to the right side than the point X shown in FIG. 47, that is, the starting torque can be increased.

Thus, in the present embodiment, in order to perform control to prevent downward slipping and the like of the lawnmower vehicle 210 on a sloping surface, the electric motor control module controls a starting torque that is generated when the rotational speed of the electric motors 216 and 218 is near 0 in accordance with a slope angle of the sloping surface that is represented by a detection signal from the slope sensor 304, by using a voltage that is applied to the electric motors 216 and 218 as a parameter. More specifically, the electric motor control module controls the voltage to be applied to the electric motors 216 and 218 so as to generate a starting torque of the electric motors 216 and 218 to act as a balance against a force acting on the lawnmower vehicle 210 in the direction of descent down the sloping surface in accordance with the slope angle of the sloping surface. Here, when a vehicle speed sensor is provided on the lawnmower vehicle 210 and a speed command of the lawnmower vehicle 210 that is issued by an operation section such as the operating levers 228 is zero, the starting torque of the electric motors 216 and 218 can also be controlled such that the vehicle speed detected by the vehicle speed sensor remains zero.

According to the present embodiment, an electric motor control module is provided that suppresses downward slipping of the lawnmower vehicle 210 when the lawnmower vehicle 210 is stopped on a sloping surface, by controlling the electric motors 216 and 218 so as to generate a torque with the rotational speed of the electric motors 216 and 218 near zero. Therefore, when the lawnmower vehicle 210 is stopped on a sloping surface, after releasing both a parking brake that is a mechanical brake and an activated braking device by depressing an accelerator pedal, even before the lawnmower vehicle 210 starts to drive off under the power of the electric motors for vehicle driving 216 and 218, the downward slipping of the lawnmower vehicle 210 on the sloping surface can be suppressed and a situation that causes the driver to feel a sense of discomfort can be prevented. The remaining configuration and actions are the same as in the above described second embodiment illustrated in FIG. 30 to FIG. 40. Here, although FIG. 47 shows a characteristic line diagram of a DC brushless motor and a configuration is adopted according to the present embodiment which controls the electric motors for vehicle driving 216 and 218 that are DC brushless motor, a configuration can also be adopted that employs an AC motor as the electric motors 216 and 218 and controls the electric motors 216 and 218 in a similar manner using a characteristic line diagram for an AC motor to suppress downward slipping of the lawnmower vehicle 210 on a sloping surface.

Here, although not illustrated in the drawings, according to the present embodiment a configuration can also be adopted in which the controllers 244, 246, and 248 comprise, instead of the electric motor control module, a brake section control module as brake section control unit. In such a case, when the lawnmower vehicle 210 starts to drive off on the sloping surface even though the parking brake lever, as a braking operation section, is in an off state, the brake section control module controls the braking state of the parking brake so as to release a braking action by the parking brake as the brake section only when the torque of the electric motors 216 and 218 exceeds a predetermined torque that corresponds to the angle of the sloping surface. In this case, the sloping surface angle is detected by the slope sensor 304 (see FIG. 32). Also according to this configuration, after the parking brake is released when the lawnmower vehicle 210 is stopped on a sloping surface, even before the lawnmower vehicle 210 starts to drive off under the power of the electric motors for vehicle driving 216 and 218, the downward slipping of the lawnmower vehicle 210 on the sloping surface can be suppressed, and situations that cause the driver concern or discomfort can be prevented. In this case, for example, a brake lever that is linked with a brake shoe constituting the parking brake can have a configuration in which it is pushed and pulled by an electrically-driven actuator such as a linear actuator or a linear motor that receives a control signal from the controllers 244, 246, and 248.

[Ninth Embodiment]

Figure 48:
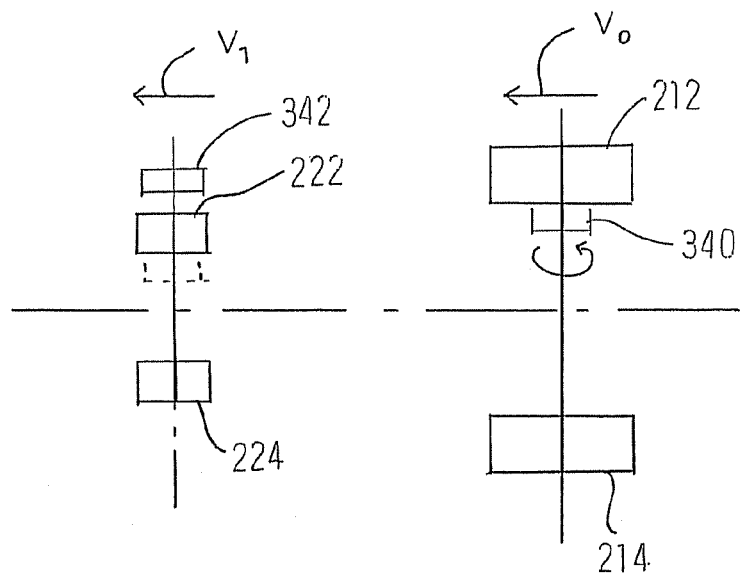
FIG. 48 is a schematic diagram that represents the speed of main drive wheels and caster wheels according to a ninth embodiment described herein.

FIG. 48 is a schematic diagram that represents the speeds of the main drive wheels 212 and 214 and the caster wheels 222 and 224 according to a ninth embodiment of the present invention. Here, because the basic configuration of the lawnmower vehicle is the same as that of the above described second embodiment illustrated in FIG. 30 to FIG. 40, the same reference numerals and symbols are assigned to equivalent parts in the following description. In the present embodiment, the configuration of the above described second embodiment illustrated in FIG. 30 to FIG. 40 is modified such that the controllers 244, 246, and 248 comprise a switching module as switching unit. The switching module is configured to switch from a first drive mode that drives only the main drive wheels 212 and 214 to a second drive mode that drives both the main drive wheels 212 and 214 and the caster wheels 222 and 224 when the slip ratio of the main drive wheels 212 and 214 is equal to or greater than 5% as a predetermined value, is preferably 5% or more and 15% or less, and is more preferably approximately 10%.

For example, when the slip ratio of the main drive wheels 212 and 214 is less than 5%, the switching module stops the electric power supply to the electric motors 288 (see FIG. 33 etc.) for driving the caster wheels 222 and 224 to travel to thereby stop power generation of the electric motors 288 so as to implement the first drive mode that drives only the main drive wheels 212 and 214. The "slip ratio" is obtained by comparing a target movement speed $V_0$ of the main drive wheels 212 and 214 that is obtained based on the rotational speed of the electric motors 216 and 218 for driving the main drive wheels 212 and 214 with a movement speed $V_1$ of the caster wheels 222 and 224 that is obtained based on the rotational speed of the electric motors 288 for driving the caster wheels 222 and 224 to travel. When the target movement speed $V_0$ is greater than the movement speed $V_1$, the switching module determines that the lawnmower vehicle is slipping and obtains the slip ratio, that is, $\{(V_0-V_1)/V_0\} \times 100$ (%). The slip ratio can also be obtained by determining the target movement speed $V_0$ of the main drive wheels 212 and 214 and the movement speed $V_1$ of the caster wheels 222 and 224 based on detection signals from a rotational speed detection device including encoders 340 and 342 that are fixed to the main drive wheels 212 and 214 and the caster wheels 222 and 224, respectively. When switching from the first drive mode to the second drive mode, the switching module starts the electric power supply to the electric motors 288 for driving the caster wheels 222 and 224 to thereby drive the caster wheels 222 and 224 and the main drive wheels 212 and 214 using the electric motors 216, 218, and 288.

According to the present embodiment configured in this manner, when the slip ratio of the main drive wheels 212 and 214 is 5% or more, a switching module is provided that switches from a first drive mode that drives only the main drive wheels 212 and 214 to a second drive mode that drives both the main drive wheels 212 and 214 and the caster wheels 222 and 224. Therefore, in a situation in which the lawnmower vehicle 210 is traveling uphill on a sloping surface, if the main drive wheels 212 and 214 slip on the lawn grass to a degree that is equal to or greater than a predetermined slip ratio, both the main drive wheels 212 and 214 and the caster wheels 222 and 224 drive. Therefore, because the driving force increases so that the main drive wheels 212 and 214 no longer slip on the lawn grass, damage to the lawn grass by the main drive wheels 212 and 214 can be suppressed. Because the remaining configuration and actions are the same as in the above described second embodiment illustrated in FIG. 30 to FIG. 40, a description and illustration relating to equivalent parts is omitted. Here, as the configuration for driving the caster wheels 222 and 224 to travel, a configuration according to the above described third embodiment to seventh embodiment as illustrated in FIG. 41 to FIG. 46 can also be adopted.

According to the present embodiment, although a configuration is adopted in which, to implement the first drive mode, the electric power supply to the electric motors 288 for driving the caster wheels 222 and 224 to travel is stopped to stop power generation of the electric motors 288, in order to implement the first drive mode it is also possible to cut off the transmission of power from the two electric motors 288 corresponding to the caster wheels 222 and 224 to the two caster wheels 222 and 224. For example, a clutch mechanism can be provided in a power transmission section between the electric motors 288 and the drive section of the caster wheels 222 and 224 so that the transmission of power can be cut off or connected by disconnecting or connecting the clutch mechanism. Further, according to the present embodiment a configuration can also be adopted in which, after switching from the first drive mode that drives only the main drive wheels 212 and 214 to the second drive mode that drives both the main drive wheels 212 and 214 and the caster wheels 222 and 224, the switching module switches from the second drive mode to the first drive mode when a size of an assist torque that is a torque that drives the caster wheels 222 and 224 or the proportion of the assist torque relative to the torque that drives the main drive wheels 212 and 214 falls below a predetermined value due to the assist torque decreasing in accordance with an increase in the torque that drives the main drive wheels 212 and 214.

[Tenth Embodiment]

Although a corresponding illustration is omitted from the drawings, as an embodiment according to a tenth invention, the above described ninth embodiment illustrated in FIG. 48 can be configured so that the controllers 244, 246, and 248 (see FIG. 32) comprise a speed control module as speed control unit, wherein in a case in which an overrun ratio of the lawnmower vehicle 210 is equal to or greater than a predetermined value when the lawnmower vehicle 210 is descending over a sloping surface, the speed control module controls a power source for traveling of the main drive wheels 212 and 214 so as to restrict the speed of the lawnmower vehicle 210. In this case, the term "overrun ratio" refers to a ration whereby a target movement speed of the main drive wheels 212 and 214 becomes low with respect to the movement speed of the caster wheels 222 and 224 in a case in which the main drive wheels 212 and 214 enter a state in which they rotate slowly with respect to the ground surface when the lawnmower vehicle 210 is descending over a sloping surface. For example, a target movement speed $V_0$ of the main drive wheels 212 and 214 that is obtained based on the rotational speed of the electric motors 216 and 218 for driving the main drive wheels 212 and 214 is compared with a movement speed $V_1$ of the caster wheels 222 and 224 that is obtained based on the rotational speed of the electric motors 288 (see FIG. 33 etc.) for driving the caster wheels 222 and 224, and when the movement speed $V_1$ is higher than the target movement speed $V_0$, it is determined that the lawnmower vehicle 210 is overrunning, and the overrun ratio is obtained as $\{(V_1-V_0)/V_0\}\times 100(\%)$. Further, the overrun ratio can also be obtained by determining the target movement speed $V_0$ of the main drive wheels 212 and 214 and the movement speed $V_1$ of the caster wheels 222 and 224 based on detection signals from a rotational speed detection device including encoders 340 and 342 (see FIG. 48) that are fixed to the main drive wheels 212 and 214 and the caster wheels 222 and 224, respectively.

When the overrun ratio is equal to or greater than a predetermined value, the speed control unit controls the electric motors 216 and 218 for traveling of the main drive wheels 212 and 214 to lower the rotational speed of the electric motors 216 and 218 so as to suppress the speed of the lawnmower vehicle 210.

According to the present embodiment configured in this manner, a speed control module is provided that controls the electric motors 216 and 218 for traveling of the main drive wheels 212 and 214 so as to suppress the speed of the lawnmower vehicle 210 when an overrun ratio of the lawnmower vehicle 210 is greater than or equal to a predetermined value when the lawnmower vehicle 210 descends over a sloping surface. Consequently, when the lawnmower vehicle 210 is traveling downhill on a sloping surface, even if the main drive wheels 212 and 214 slip on the surface, by suppressing the speed of the lawnmower vehicle 210 it is possible to prevent excessive slipping and thereby suppress the occurrence of damage to the lawn grass by the main drive wheels 212 and 214. In this connection, in order to suppress the speed of the lawnmower vehicle 210, a traction power source such as an electric motor for driving the caster wheels 222 and 224 can be controlled together with, or independently from, the electric motors 216 and 218 for traveling of the main drive wheels 212 and 214.

[Eleventh Embodiment]

Although not illustrated in the drawings, as an embodiment according to an eleventh invention, the configuration of the tenth embodiment as described above can also be modified so that the controllers 244, 246, and 248 (see FIG. 32) comprise a switching module as switching unit, wherein when the lawnmower vehicle 210 is descending over a sloping surface, the switching module switches from a first drive mode that drives only the main drive wheels 212 and 214 (see FIG. 48 etc.) to a second drive mode that drives both the main drive wheels 212 and 214 and the caster wheels 222 and 224 (see FIG. 48 etc.). For example, whether or not the lawnmower vehicle 210 is descending over a sloping surface is determined using the slope angle of the sloping surface that is detected by the slope sensor 304 (see FIG. 32) or the like and the rotational direction of the electric motors 216 and 218 for driving the main drive wheels 212 and 214 and the like. When it is determined that the lawnmower vehicle 210 is descending over a sloping surface, similarly to the above described ninth embodiment illustrated in FIG. 48, the switching module switches from a first drive mode that drives only the main drive wheels 212 and 214 to a second drive mode that drives both the main drive wheels 212 and 214 and the caster wheels 222 and 224.

The present embodiment configured in this manner comprises a module switching that switches from a first drive mode that drives only the main drive wheels 212 and 214 to a second drive mode that drives both the main drive wheels 212 and 214 and the caster wheels 222 and 224 when the lawnmower vehicle 210 is descending over a sloping surface. Therefore, when the lawnmower vehicle 210 is traveling downhill on a sloping surface, because a gripping force of the main drive wheels 212 and 214 and the caster wheels 222 and 224 with respect to the sloping surface increases, it is possible to prevent excessive slipping by the main drive wheels 212 and 214 and thereby suppress damage to the lawn by the main drive wheels 212 and 214. Because the configuration and actions are otherwise the same as in the above described ninth embodiment, their description is not duplicated here.

Additionally, although not illustrated in the drawings, for each embodiment from the above described second embodiment to eleventh embodiment, a configuration may be adopted in which an electric motor is used as a power source for driving the mower 220 (see FIG. 30 and FIG. 31), and at least any one member of the group consisting of the electricity generator 234 (see FIG. 30, FIG. 31, and FIG. 32) that is driven by the engine 232 that is an internal combustion engine, and unshown fuel cell, and an accumulator section that is a secondary battery or a capacitor is employed as a power supply source that supplies electric power to the electric motor. Further, an operation section for vehicle steering is not limited to the operating levers 228 or the steering operation section 264 such as a steering wheel as described above and, for example, may be any one member of the group consisting of a steering wheel, a joy stick, a foot pedal, and the operating levers 228, or can be any one member selectable from that group. Further, an internal combustion engine or an oil hydraulic motor can be used as a power source for driving the mower 220.

Furthermore, for each embodiment from the above described second embodiment to eleventh embodiment, a configuration may also be adopted in which the controllers 244, 246, and 248 have a steering traveling control section that controls a driving state for steering and for traveling of the caster wheels 222 and 224, wherein when a steering angle of the caster wheels 222 and 224 is greater than or equal to an arbitrary predetermined steering angle that takes a steering axis of the caster wheels 222 and 224 as a center, the steering traveling control section executes control so as to cut off transmission of power to the caster wheels 222 and 224 from the electric motors 288 (see FIG. 33 etc.) for driving the caster wheels 222 and 224 as the driving source for traveling of the caster wheels 222 and 224 or to stop power generation of the electric motors 288 so that the caster wheels 222 and 224 enter a free traveling state. According to this configuration, because the electric motors 288 need not be driven, for example, in a case in which a tractive force is not relatively required, such as when executing a spin turn, downsizing of the electric motors 288 is facilitated.

What is claimed is:

1. A riding lawnmower, comprising:
    left and right wheels as main drive wheels that are each independently driven by an electric rotary machine;
    at least one caster wheel as a steering control wheel;
    a lawnmower blade or a lawnmower reel that is driven for lawn mowing; and
    a control section that controls driving force of the left and right wheels when turning;
    wherein a turn center position of the left and right wheels is acquired based on a turn instruction input from a turn operator; and wherein, when the acquired turn center position of the left and right wheels is the ground-contact position of the left wheel or the ground-contact position of the right wheel, the control section controls the wheel on the turn center position to be placed in a freely rotating state around an axle and controls driving and braking of the wheel on the turn center position not to be executed; and the left and right wheels are caused to turn around the acquired turn center position.

2. The riding lawnmower according to claim 1, wherein the turn operator comprises a left lever and a right lever which are respectively placed on the left and right sides of a seat, the left lever instructing a speed of the left wheel, the right lever instructing a speed of the right wheel, and each of the left and right wheel speeds instructed by the left and right levers being used as a turn instruction input; and when the acquired turn center position of the left and right wheels is the ground-contact position of the left wheel or the ground-contact position of the right wheel, the control section controls the left and right wheels to turn when the turn instruction input of the operator with respect to the wheel on the turn center position is an instruction to enter a state in which a connection between the electric rotary machine and the wheel on the turn center position is released.

3. A riding lawnmower, comprising:

left and right wheels as main drive wheels that are each independently driven by an electric rotary machine;

at least one caster wheel as a steering control wheel;

a lawnmower blade or a lawnmower reel that is driven for lawn mowing;

a control section that controls driving force of the left and right wheels when turning in accordance with whether a first condition or a second condition is satisfied;

wherein a turn center position of the left and right wheels is acquired based on a turn instruction input from a turn operator;

the first condition is that the acquired turn center position of the left and right wheels does not enter a region on an inner side of the left and right wheels, the second condition is that the acquired turn center position enters the region on the inner side of the left and right wheels;

when the first condition is satisfied, the driving force of each of the left and right wheels is controlled such that the left and right wheels turn around the acquired turn center position;

when the second condition is satisfied, the turn center position is returned to a ground-contact position of either the left wheel or the right wheel; and the left and right wheels are caused to turn around the acquired turn center position in correspondence with the condition of the first condition and the second condition that is satisfied.

4. The riding lawnmower according to claim 3, further comprising:

a slope sensor that detects a slope-to-horizontal plane angle of the riding lawnmower;

wherein the control section:

when a detection value of the slope sensor exceeds a predetermined threshold slope angle and the second condition is satisfied, controls driving force of each of the left and right wheels such that the turn center position is returned to the ground-contact position of either the left wheel or the right wheel.

5. A riding lawnmower, comprising:

two main drive wheels, and a caster wheel as a steering control wheel;

wherein, at least the two main drive wheels are driven by a traction power source; and further comprising a switching unit;

wherein the switching unit executes switching to either a forced steering mode that forcefully steers the caster wheel using a steering power source different from the traction power source or a free steering mode that enables free steering of the caster wheel by stopping power generation of the steering power source or cutting off a transmission of power for steering to the caster wheel from the steering power source, and the switching unit receives detection signals that are respectively input from an operation amount detection section that detects an operation amount of a steering operation section that is operated by a driver and a caster wheel direction detection section that detects a direction of the caster wheel, and, when a caster wheel direction corresponding to a detection signal from the operation amount detection section is deviated in excess of a preset allowable range from a caster wheel direction corresponding to a detection signal from the caster wheel direction detection section, the switching unit switches from the free steering mode to the forced steering mode.

6. The riding lawnmower according to claim 5, further comprising:

a caster wheel driving power source for driving the caster wheel to travel, wherein in at least the forced steering mode, the caster wheel is driven by the caster wheel driving power source.

7. A riding lawnmower comprising:

two main drive wheels;

a caster wheel as a steering control wheel;

a traction power source that drives at least the two main drive wheels;

a caster wheel driving power source that is provided separately from the traction power source and that drives the caster wheel according to switching of a mode;

a switching unit; and a steering traveling control section that controls a driving state for steering and traveling of the caster wheel;

wherein, when the riding lawnmower is descending over a sloping surface, the switching unit switches from a first drive mode that drives only the main drive wheels by the traction power source to a second drive mode that drives both the main drive wheels and the caster wheel by the traction power source and the caster wheel driving power source; and wherein, when a steering angle of the caster wheel is greater than or equal to a predetermined steering angle, the steering traveling control section executes control to cut off transmission of power to the caster wheel from the power source for caster wheel traveling or to stop power generation of the power source for caster wheel traveling so that the caster wheel enters a free traveling state.

8. A riding lawnmower, comprising:

two main drive wheels, and a caster wheel as a steering control wheel;

a traction power source which drives at least the two drive wheels;

a steering power source which steers the caster wheel; and a caster wheel driving power source which drives the caster wheel to travel;

further comprising a switching unit; and a steering traveling control section that controls a driving state for steering and traveling of the caster wheel;

wherein the switching unit executes switching to either a forced steering mode that forcefully steers the caster wheel using the steering power source or a free steering mode that enables free steering of the caster wheel by stopping power generation of the steering power source or cutting off a transmission of power for steering to the caster wheel from the steering power source; and when a steering angle of the caster wheel is greater than or equal to a predetermined steering angle, the steering traveling control section executes control to cut off transmission of power to the caster wheel from the caster wheel driving power source or to stop power generation of the caster wheel driving power source so that the caster wheel enters a free traveling state.

9. A riding lawnmower, comprising:

two main drive wheels and a caster wheel as a steering control wheel, at least the two main drive wheels being driven by a traction power source; and a switching unit that executes switching to either a forced steering mode that forcefully steers the caster wheel using a steering power source different from the traction power source or a free steering mode that enables free steering of the caster wheel by stopping power generation of the steering power source or cutting off transmission of power for steering to the caster wheel from the steering power source, receives detection signals that are respectively input from an operation amount detection section that detects an operation amount of a steering operation section that is operated by a driver and a caster wheel direction detection section that detects a direction of the caster wheel, wherein the switching unit switches from the free steering mode to the forced steering mode when a caster wheel direction corresponding to a detection signal from the operation amount detection section is different from caster wheel direction corresponding to a detection signal from the caster wheel direction detection section.

* * * * *